(12) United States Patent
Tsuchiya et al.

(10) Patent No.: US 8,071,205 B2
(45) Date of Patent: Dec. 6, 2011

(54) PREPREG, PREFORM, MOLDED PRODUCT, AND METHOD FOR MANUFACTURING PREPREG

(75) Inventors: Atsuki Tsuchiya, Ehime (JP); Masato Honma, Ehime (JP); Hideaki Sasaki, Ehime (JP); Shoji Murai, Nagoya (JP)

(73) Assignee: Toray Industries, Inc., Tokyo (JP)

( * ) Notice: Subject to any disclaimer, the term of this patent is extended or adjusted under 35 U.S.C. 154(b) by 0 days.

(21) Appl. No.: 12/737,619

(22) PCT Filed: Jul. 24, 2009

(86) PCT No.: PCT/JP2009/063240
§ 371 (c)(1),
(2), (4) Date: Jan. 31, 2011

(87) PCT Pub. No.: WO2010/013645
PCT Pub. Date: Feb. 4, 2010

(65) Prior Publication Data
US 2011/0143110 A1    Jun. 16, 2011

(30) Foreign Application Priority Data

| | | |
|---|---|---|
| Jul. 31, 2008 | (JP) | 2008-197812 |
| Jul. 31, 2008 | (JP) | 2008-198456 |
| Jul. 31, 2008 | (JP) | 2008-198457 |
| Jul. 31, 2008 | (JP) | 2008-198458 |
| Mar. 31, 2009 | (JP) | 2008-085469 |

(51) Int. Cl.
*B32B 27/04* (2006.01)
(52) U.S. Cl. ..................... 428/297.4; 264/320
(58) Field of Classification Search .............. 428/297.4, 428/213, 220; 264/128, 216, 320
See application file for complete search history.

(56) References Cited

U.S. PATENT DOCUMENTS

| | | | | | |
|---|---|---|---|---|---|
| 5,198,283 | A | * | 3/1993 | Hausler et al. | 428/195.1 |
| 5,674,590 | A | * | 10/1997 | Anderson et al. | 428/154 |
| 5,770,313 | A | * | 6/1998 | Furumoto et al. | 428/411.1 |
| 5,904,971 | A | * | 5/1999 | Anderson et al. | 428/112 |
| 6,277,771 | B1 | * | 8/2001 | Nishimura et al. | 442/229 |
| 6,334,973 | B1 | * | 1/2002 | Fukazaki et al. | 264/320 |
| 6,558,512 | B2 | * | 5/2003 | Ueno et al. | 162/123 |
| 7,334,667 | B2 | * | 2/2008 | Marcacci | 188/156 |

(Continued)

FOREIGN PATENT DOCUMENTS

JP         6-114869 A         4/1994

(Continued)

*Primary Examiner* — N. Edwards
(74) *Attorney, Agent, or Firm* — Kubovcik & Kubovcik

(57) ABSTRACT

This invention is A prepreg comprising a reinforcing fiber base material impregnated with a thermoplastic resin, wherein the reinforcing fiber base material comprises from 0 to 50% by mass of reinforcing fibers each having a fiber length of more than 10 mm, from 50 to 100% by mass of reinforcing fibers each having a fiber length of from 2 to 10 mm, and from 0 to 50% by mass of reinforcing fibers each having a fiber length of less than 2 mm, the average of two-dimensional orientation angles each formed by a reinforcing filament (a) and a reinforcing filament (b) intersecting the reinforcing filament (a) is from 10 to 80°, the thickness h0 (mm) at 23° C. is 0.03 to 1 mm, and the tensile strength σ is 0.01 MPa or more.

The prepreg can be applied for thin molded products which have been considered unsuitable as a laminated molded product and can provide molded products that have a complicated shape and have isotropically high mechanical properties.

25 Claims, 15 Drawing Sheets

U.S. PATENT DOCUMENTS

| | | | |
|---|---|---|---|
| 7,754,323 B2 * | 7/2010 | Murai et al. | 428/297.4 |
| 7,927,708 B2 * | 4/2011 | Mizrahi | 428/457 |
| 2006/0020074 A1 * | 1/2006 | Asada et al. | 524/494 |
| 2007/0243343 A1 | 10/2007 | Imaizumi et al. | 428/31 |
| 2009/0004453 A1 | 1/2009 | Murai et al. | 428/299.1 |
| 2010/0092770 A1 * | 4/2010 | Wadahara et al. | 428/339 |
| 2010/0266827 A1 * | 10/2010 | Oyama et al. | 428/219 |
| 2011/0143110 A1 * | 6/2011 | Tsuchiya et al. | 428/213 |

FOREIGN PATENT DOCUMENTS

| | | |
|---|---|---|
| JP | 9-155862 A | 6/1997 |
| JP | 2004-143226 A | 5/2004 |
| JP | 2006-083227 A | 3/2006 |
| WO | 2007/097436 A1 | 8/2007 |

* cited by examiner

PREPREG, PREFORM, MOLDED PRODUCT, AND METHOD FOR MANUFACTURING PREPREG

This application is a 371 of international application PCT/JP2009/063240, filed Jul. 24, 2009, which claims priority based on Japanese patent application Nos. 2008-197812, 2008-198456, 2008-198457 and 2008-198458 filed Jul. 31, 2008, and 2009-085469 filed Mar. 31, 2009, which are incorporated herein by reference.

TECHNICAL FIELD

The present invention relates to prepregs in which a reinforcing fiber base material has been impregnated with a resin, and a preform produced by laminating them. Particularly, it relates to prepregs in which reinforcing fibers have a specific two-dimensional orientation angle and which have a specific thickness, and to a preform produced by laminating them. Moreover, the present invention relates to a method for manufacturing a prepreg.

BACKGROUND ART

Fiber reinforced plastics (FRP) are light in weight and have superior mechanical properties and therefore are used widely for electrical or electric instrument applications, civil engineering or building applications, machine or mechanical component applications, robot applications, motorcycle or automobile applications, universal or aerial applications, etc. As reinforcing fibers to be used for such FRP, there have been used metal fibers, such as aluminum fibers and stainless steel fibers, organic fibers, such as aramid fibers and PBO fibers, inorganic fibers, such as silicon carbide fibers, and carbon fibers. Among these, carbon fiber is preferably used from the viewpoint of being excellent in specific strength and specific rigidity and being capable of affording excellent lightness.

Here, one example of representative FRP like carbon fiber-reinforced plastics (CFRP) is a molded product produced by subjecting a preform obtained by laminating prepregs to press molding (a molding method comprising defoaming and shaping performed under pressurization). Prepregs are commonly produced by a method comprising impregnating a reinforcing fiber base material prepared by arraying in one direction or weaving continuous reinforcing fibers with a resin.

Superior mechanical properties can be obtained with molded products prepared by using such prepregs. On the other hand, since reinforcing fibers are used in their original continuous form, they are unsuitable for shaping into a complicated shape. Moreover, since the lamination angle of prepregs has a great influence on properties, it is necessary to laminate prepregs by paying attention of the lamination angle. In other words, since a lamination step requires time and effort and the cost increases accordingly (i.e., an economic burden caused by the lamination step will increase), usage is restricted.

Patent document 1 proposes a prepreg that is effective for shaping into a complicated shape by cutting reinforcing fibers into a specific length. However, since a lamination step requires time and effort like that mentioned above, an economic burden has not been eliminated.

On the other hand, FRPs using discontinuous reinforcing fibers have also been proposed. Sheet molding compounds (SMC) and glass mat base materials (GMT) are materials suitable for press molding. However, their usage is restricted because their mechanical properties, such as specific strength and specific rigidity, are poor, they are difficult to be applied to thin molded products, and isotropic mechanical properties are hardly obtained because resin flows very much at the time of molding, and their characteristics vary widely.

Patent documents 2, 3 each propose a sheet material in which more isotropic properties can be obtained by dispersing reinforcing fibers in a bundle form. In patent document 4 is proposed a sheet material with superior mechanical properties caused by uniform dispersion of carbon fibers. However, since all of them cannot be processed to be thin like a prepreg and resin flows greatly at the time of shaping, an isotropic property may be impaired, and mechanical properties may also decline.

Moreover, in patent document 5 is proposed a molded product in which carbon fibers have been fixed while being randomly dispersed in the form of single yarn. Also in this method, there is a limit in processing it to be thin and therefore the degree of freedom of lamination of a preform is restricted. Furthermore, since it is impossible to produce a large number of preforms, an economic burden has not been eliminated.

PRIOR ART DOCUMENTS

Patent Documents
Patent document 1: JP 2007-146151 A
Patent document 2: Japan Patent No. 2507565
Patent document 3: Japan Patent No. 1761874
Patent document 4: JP 6-99431 A
Patent document 5: WO2007/097436

SUMMARY OF THE INVENTION

Problem to be Solved by the Invention

In considering the background of the conventional technologies, an object of the present invention is to provide a prepreg that can be applied to a thin molded product for which laminated molded products have been unsuitable and is superior in isotropic mechanical properties and that can afford a molded product with a complicated shape, and a preform.

Means for Solving the Problems

The prepreg of the present invention is a prepreg comprising a reinforcing fiber base material impregnated with a thermoplastic resin, wherein the reinforcing fiber base material comprises from 0 to 50% by mass of reinforcing fibers each having a fiber length of more than 10 mm, from 50 to 100% by mass of reinforcing fibers each having a fiber length of from 2 to 10 mm, and from 0 to 50% by mass of reinforcing fibers each having a fiber length of less than 2 mm, and the average of two-dimensional orientation angles each formed by a reinforcing filament (a) contained in the prepreg and a reinforcing filament (b) intersecting the reinforcing filament (a) is from 10 to 80°, the thickness $h_0$ (mm) at 23° C. is 0.03 to 1 mm, and the tensile strength $\sigma$ is 0.01 MPa or more.

Moreover, the preform of the present invention is a preform comprising at least, as a lamination unit, a prepreg which comprises a reinforcing fiber base material impregnated with a thermoplastic resin and in which the average of two-dimensional orientation angles each formed by a reinforcing filament (a) and a reinforcing filament (b) intersecting the reinforcing filament (a) is from 10 to 80°, the thickness $h_0$ (mm) at 23° C. is 0.03 to 1 mm, and the tensile strength $\sigma$ is 0.01 MPa or more.

EFFECT OF THE INVENTION

Since reinforcing fibers have a specific fiber length and a specific two-dimensional orientation angle in the prepreg of the present invention, no great restriction due to a lamination angle is caused in laminating prepregs and a molded product that is isotropically superior in mechanical properties can be obtained. The prepreg of the present invention can be applied to thin molded products for which conventional laminated molded products have been unsuitable by making it to have a specific thickness and, in addition, it can reduce the proportion of reinforcing fibers in the in-layer thickness direction, so that it can enhance an in-plane reinforcing effect. Moreover, the prepreg of the present invention is superior in workability at the time of lamination and is effective in application to a wide variety of uses because of its possession of a specific tensile strength.

Moreover, since reinforcing fibers contained in prepregs have specific two-dimensional orientation angles and the prepregs are made to have a specific thickness, the preform of the present invention can reduce the proportion of reinforcing fibers in the thickness direction, can reduce the interference between layers, and can increase the shapability in press molding. Thereby, it is possible to obtain a molded product that satisfies moldability of a complicated shape and mechanical properties, which was unsuitable for conventional laminated molded products.

MODE FOR CARRYING OUT THE INVENTION

Figure 1:
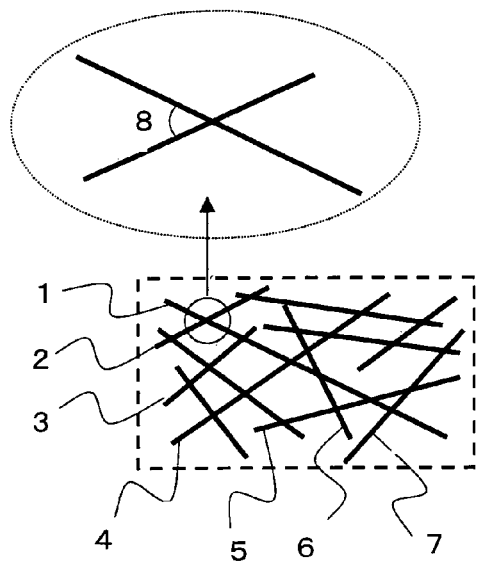
FIG. 1 is a schematic diagram illustrating one example of the dispersion state of reinforcing fibers in the prepreg of the present invention.

The prepreg of the present invention is a prepreg comprising a reinforcing fiber base material impregnated with a thermoplastic resin, wherein the reinforcing fiber base material comprises from 0 to 50% by mass of reinforcing fibers each having a fiber length of more than 10 mm, from 50 to 100% by mass of reinforcing fibers each having a fiber length of from 2 to 10 mm, and from 0 to 50% by mass of reinforcing fibers each having a fiber length of less than 2 mm, and the average of two-dimensional orientation angles each formed by a reinforcing filament (a) and a reinforcing filament (b) intersecting the reinforcing filament (a) is from 10 to 80°, the thickness $h_0$ (mm) at 23° C. is 0.03 to 1 mm, and the tensile strength $\sigma$ is 0.01 MPa or more. First, these constituents are explained.

[Reinforcing Fiber Base Material]

The reinforcing fiber base material in the present invention means a precursor which has been processed into the form of sheet, fabric, or web. The reinforcing fiber base material is not particularly limited with respect to its form or shape if it has, between reinforcing fibers, voids into which resin penetrates. For example, it is permissible that the reinforcing fibers have been mixed with organic fibers, an organic compound, or an inorganic compound, that the reinforcing fibers have been sealed with another component, or that the reinforcing fibers have been bonded to a resin component. From the standpoint of easily manufacturing the two-dimensional orientation of reinforcing fibers in the present invention, a base which is in a nonwoven fabric form obtainable by a dry process or a wet process and in which reinforcing fibers have been opened and the reinforcing fibers have been sealed together with an organic compound can be provided as an example of a preferable shape of the reinforcing fiber base material.

Moreover, it is preferable that the reinforcing fiber base material to be used in the present invention hold voids sufficient for making a resin component, which will become a matrix, to penetrate thereinto, and for this reason, it is preferable to make the reinforcing fiber base material to secure gas permeability. The gas permeability can be measured, for example, by the Gurley type tester method based on JIS P8117 or the Frazier type method based on ASTM D737. Of these, it is preferred to use the amount of air (cm$^3$/cm$^2$·s) determined by the Frazier type method based on ASTM D737 as a measure for the purpose of evaluating a material that is better in gas permeability. A preferable amount of air to be determined by the Frazier type method based on ASTM D737 is 50 or more, more preferably 70 or more, and particularly preferably 100 or more. Although the upper limit of the amount of air is not particularly restricted, an amount of 1000 or less can generally be provided as an example.

[Reinforcing Fiber]

The reinforcing fibers to be used for the prepreg of the present invention are not particularly restricted and, for example, carbon fibers, glass fibers, aramid fibers, alumina fibers, silicon carbide fibers, boron fibers, metal fibers, natural fibers, and mineral fibers can be used. These kinds of fiber may be used singly or two or more kinds of fibers may be used in combination. In particular, from the viewpoint of weight reduction, carbon fibers of PAN type, pitch type, rayon type, or the like are preferably used because they are high in strength and specific rigidity. From the viewpoint of increasing the economical efficiency of a molded product to be obtained, glass fibers are preferably used, and it is preferable to use carbon fibers and glass fibers together in combination from the viewpoint of the balance between mechanical properties and economical efficiency. From the viewpoint of increasing the impact absorbability or the shapability of a molded product to be obtained, aramid fibers are preferably used, and it is preferable to use carbon fibers and aramid fibers together in combination from the viewpoint of the balance between mechanical properties and impact absorbability. Moreover, from the viewpoint of increasing the electroconductivity of a molded product to be obtained, it is also permissible to use reinforcing fibers coated with metal, such as nickel, copper, and ytterbium.

[Carbon Fiber]

Carbon fibers are preferably those with a surface oxygen concentration ratio O/C measured by the X-ray photoelectron spectroscopy of from 0.05 to 0.5, more preferably from 0.06 to 0.3, and even more preferably from 0.07 to 0.2. When the surface oxygen concentration ratio is 0.05 or more, the amount of polar functional groups of the surface of carbon fibers is secured and the affinity with a thermoplastic resin composition becomes high and, therefore, stronger adhesion can be achieved. When the surface oxygen concentration ratio is 0.5 or less, it is possible to reduce the fall of the strength of carbon fibers caused by surface oxidation.

The surface oxygen concentration ratio means the atomic number ratio of oxygen (O) to carbon (C) of the fiber surface. The procedure in which the surface oxygen concentration ratio is determined by X-ray photoelectron spectroscopy is explained below with reference to one example. First, a seizing agent or the like sticking on the carbon fiber surface is removed. Subsequently, the carbon fibers are cut into 20 mm and are spread and arranged on a copper sample support. Then, the inside of a sample chamber is held at $1 \times 10^8$-Torr by the use of AlKα1, 2 as an X-ray source. The kinetic energy value (K.E.) of the primary peak of $C_{1s}$ is adjusted to 1202 eV as a correction value of a peak accompanying the electrification at the time of measurement. The area of the $C_{1s}$ peak is determined by drawing a straight baseline within a range of from 1191 to 1205 eV in K.E. The area of the $O_{1s}$ peak is determined by drawing a straight baseline within a range of from 947 to 959 eV in K.E.

The surface oxygen concentration ratio is a value calculated as an atomic number ratio from the ratio of the $O_{1s}$ peak area and the $C_{1s}$ peak area using a sensitivity correction value that is inherent to an instrument. It can be calculated by using Model ES-200 manufactured by International Electric Co., Ltd., as an X-ray photoelectron spectrometer and using 1.74 as a sensitivity correction value.

The means for controlling the surface oxygen concentration O/C of carbon fibers to be from 0.05 to 0.5 is not particularly restricted and examples thereof include such techniques as electric field oxidation treatment, chemical solution oxidation treatment, and vapor phase oxidation treatment. Among these, the electric field oxidation treatment is preferred because it is easy to handle.

As an electrolytic solution to be used for electric field oxidation treatment, aqueous solutions of compounds listed below are suitably used. The compounds include inorganic acids, such as sulfuric acid, nitric acid, and hydrochloric acid, inorganic hydroxides, such as sodium hydroxide, potassium hydroxide, and barium hydroxide, ammonia, inorganic metal salts, such as sodium carbonate and sodium hydrogen carbonate, organic salts, such as sodium acetate and sodium benzoate, potassium salt, barium salts, other metal salts, and ammonium salts instead of these sodium salts, and organic compounds such as hydrazine. Among these, inorganic acids are preferred as an electrolytic solution, and sulfuric acid and nitric acid are used particularly preferably. Regarding the degree of electric field treatment, the O/C of the carbon fiber surface can be controlled by determining the amount of electricity which flows during the electric field treatment.

[Prepreg]

The prepreg of the present invention can hold its shape as a prepreg by the penetration of a resin into the voids of the aforementioned reinforcing fiber base material. In addition, a preform can be produced by laminating the prepregs with stability while the reinforcing fibers are fixed. That is, the time and effort in a lamination process can be reduced and thereby an economic burden can be reduced. Particularly from the viewpoint of improving the handling performance of prepregs in the lamination of the prepregs and further reducing the time and effort for work, it is important to adjust the orientation of the reinforcing fibers to within a specific range. This can prevent interference in the thickness direction and therefore can secure the isotropy of a molded product even if prepregs are laminated simply. Moreover, the adjustment of the length of reinforcing fibers to within a specific range not only results in that a molded product to be obtained is superior in mechanical properties, but it also makes it possible to inhibit the thickness expansion of prepregs or a preform obtained by laminating the prepregs and allow them to be transferred without any size or shape limitations and be subjected to a molding process.

The "isotropy" as referred to herein means that when a prepreg or a preform produced by laminating prepregs is processed into a molded product, the molded product exhibits uniform characteristics, such as specific strength, specific rigidity, and coefficient of linear expansion, regardless of the direction in the plane of the molded product.

Here, it is important that the reinforcing fiber base material in the present invention is composed of from 0 to 50% by mass of reinforcing fibers having a fiber length exceeding 10 mm, from 50 to 100% by mass of reinforcing fibers having a fiber length of from 2 to 10 mm, and from 0 to 50% by mass of reinforcing fibers having a fiber length of less than 2 mm. If the amount of the reinforcing fibers having a fiber length exceeding 10 mm exceeds 50% by mass, the thickness expansion in a lamination process or a molding process may become large and the handling performance may be impaired. If the amount of reinforcing fibers having a fiber length of less than 2 mm exceeds 50% by mass, not only the mechanical properties of a molded product to be obtained may deteriorate, but also a prepreg or a preform to be obtained by laminating prepregs cannot secure sufficient strength and, as a result, the moldability may be impaired. From these viewpoints, it is preferable that the reinforcing fiber base material comprise from 80 to 100% by mass of reinforcing fibers having a fiber length of from 3 to 8 mm. Moreover, it is more preferable that the distribution of the fiber length of the reinforcing fiber base material have at least two peaks and at least one peak be within a fiber length range of from 5 to 10 mm and at least one peak be within a fiber length range of from 2 to 5 mm. By bringing the distribution of the fiber length into such a more preferable range, it is possible to use reinforcing fibers for securing mechanical properties and reinforcing fibers for securing handling performance of a preform in a lamination process or a molding process together and to easily reconcile the characteristics of both types of reinforcing fibers. The mass percentage of reinforcing fiber referred to herein indicates the percentage of the fiber length in number average when the amount of all the reinforcing fibers forming the reinforcing fiber base material is 100% by mass.

Examples of the method for measuring the fiber length of reinforcing fibers include a method in which reinforcing fibers are removed directly from a reinforcing fiber base material, and a method in which the resin of a prepreg is dissolved by using a solvent which can dissolve only the resin and the remaining reinforcing fibers are collected by filtration and measured by microscopic observation (a dissolution method). In a case where no solvent can dissolve the resin, a method is available which comprises burning off only the resin within a temperature range where reinforcing fibers do not lose their weight due to oxidation to isolate the reinforcing fibers and measuring them by microscopic observations (a burning off method). The measurement can be done by selecting 400 reinforcing fibers at random, measuring the length thereof down to 1 μm by using an optical microscope, and then measuring the fiber lengths and the proportions thereof. When comparing a method of extracting reinforcing fibers directly from a reinforcing fiber base material to a method of extracting reinforcing fibers from a prepreg by a burning off method or a dissolving method, no particular difference will occur between the results to be obtained if conditions are selected appropriately.

Moreover, the orientation of the reinforcing fibers in the present invention can be defined by a two-dimensional orientation angle. Generally, a reinforcing fiber base material is often composed of reinforcing fibers in the form of a bundle, and therefore it is difficult to secure isotropy as a prepreg, and the penetration of resin into a bundle is insufficient and this may cause decrease in strength of a molded product. Even if a reinforcing fibers bundle is disperses into single yarns, a similar result will be produced if the single yarns of reinforcing fibers come into contact with each other in parallel. Moreover, the fiber orientation in the thickness direction may cause the expansion of the thickness of a prepreg or a preform to be obtained by laminating prepregs and it may remarkably impair handling performance and moldability.

Here, the two-dimensional orientation angle formed by a reinforcing filament (a) and a reinforcing filament (b) that intersects the reinforcing filament (a) in the present invention is explained with reference to a drawing. FIG. 1 is a schematic diagram illustrating a dispersion state of reinforcing fibers observed when only reinforcing fibers of one example of the prepreg of the present invention are observed from the plane direction. When reinforcing filament 1 is selected, reinforcing filament 1 intersects reinforcing filaments 2 to 7. The intersection as referred to herein means a state where a particular reinforcing filament (a) is observed to intersect another reinforcing filament (b) in a two-dimensional plane observed. In an actual prepreg, reinforcing fiber 1 is not necessarily required to be in contact with reinforcing fibers 2 to 7. The two-dimensional orientation angle is defined as an angle 8 measuring from 0 to 90° of the two angles formed by two crossed reinforcing filaments.

Although there is no restriction with the method for concretely measuring the average value of two-dimensional orientation angles from a prepreg, a method that comprises observing the orientation of reinforcing fibers from the surface of a prepreg can be provided as an example. In this case, it is preferable to grind the surface of the prepreg to expose fibers because it becomes easier to observe the reinforcing fibers. Another example is a method that comprises observing the orientation of reinforcing fibers by applying transmitted light to a prepreg. In this case, it is preferable to slice the prepreg because it becomes easier to observe the reinforcing fibers. Still another example is a method that comprises observing a prepreg by X-ray CT transmission to photographing an image of the orientation of reinforcing fibers. In the case of reinforcing fibers with high transparency to X-ray, it is preferable to mix fibers for a tracer with the reinforcing fibers or to apply a chemical agent to the reinforcing fibers because it becomes easier to observe the reinforcing fibers.

When it is difficult to perform measurement by the aforementioned methods, a method that comprises removing a resin while not destroying the structure of reinforcing fibers and then observing the orientation of the reinforcing fibers can be provided as an example. For example, as illustrated in FIG. 2(a), measurement can be performed by sandwiching a prepreg between two sheets of stainless steel mesh, fixing them with screws or the like so that the prepreg might be prevented from moving, then burning resin components off, and observing the resulting reinforcing fiber base material (FIG. 2(b)) with an optical microscope or an electron microscope.

The average of two-dimensional orientation angles in the present invention is measured in the following procedures I and II.

I. Two-dimensional orientation angles formed by a reinforcing filament (a) selected at random (reinforcing filament 1 in FIG. 1) and each of all reinforcing filaments (b) intersecting the reinforcing filament (a), all the reinforcing filaments (b) that intersect this reinforcing filament (a) (reinforcing filaments 2 to 7 in FIG. 1) are measured, and their average value is calculated. When there are a large number of reinforcing filaments (b) intersecting the reinforcing filament (a), an average value measured by selecting 20 intersecting reinforcing filaments (b) at random may be as a substitution.

II. The measurement of I., is repeated for other reinforcing filaments (a) five times in total and the average of the measurements is calculated as the average of two-dimensional orientation angle.

The average of the two-dimensional orientation angles of the reinforcing fibers in the present invention is from 10 to 80°, preferably from 20 to 70°, and more preferably from 30 to 60°, and it is better that the average is closer to 45°, which is the ideal angle. That the average of two-dimensional orientation angles is smaller than 10° or larger than 80° means that many reinforcing fibers remain in the form of a bundle, and it results in deterioration of mechanical properties. Moreover, when two-dimensional isotropy is impaired, it is necessary to laminate many prepregs so that the orientation of reinforcing fibers are arranged in respective directions in order to secure the isotropy of the properties of a molded product. When reinforcing fibers of the thickness direction cannot be ignored, it becomes difficult to handle, for example, arrange or transfer, prepregs in laminating them, so that the economic burden in a lamination process may increase.

The two-dimensional orientation angle can be made closer to an ideal angle by dispersing reinforcing fibers and arranging them planarly when manufacturing a reinforcing fiber base material. In order to increase the degree of the dispersion of the reinforcing fibers, a dry process or a wet process can be used. The dry process is a method in the dispersion of a reinforcing fiber bundle is performed in the air. The wet process is a method in the dispersion of a reinforcing fiber bundle is performed in water. As to the dry process, a method of providing a filamentation bar, a method of vibrating a filamentation bar, a method of making openings of a card smaller, and a method of adjusting the rate of rotation of a card can be provided as examples. As to the wet process, a method of adjusting stirring conditions in dispersing reinforcing fibers, a method of reducing the concentration, a method of adjusting the viscosity of a solution, and a method of inhibiting a whirlpool in transferring a dispersion liquid can be provided as examples.

In order to arrange reinforcing fibers planarly, a method of using static electricity in when accumulating reinforcing fibers, a method of using a regulated air flow, and a method of adjusting the hauling rate of a conveyor can be provided as examples of the dry process. As to the wet process as well, a method of preventing reflocculation of reinforcing fibers dispersed using an ultrasonic wave or the like, a method of adjusting the filtration rate, a method of adjusting the mesh diameter of a conveyor, a method of adjusting the hauling rate of a conveyor can be provided as examples. These methods are not particularly limited and can be achieved also by controlling other manufacture conditions while checking the state of a reinforcing fiber base material.

Figure 3:
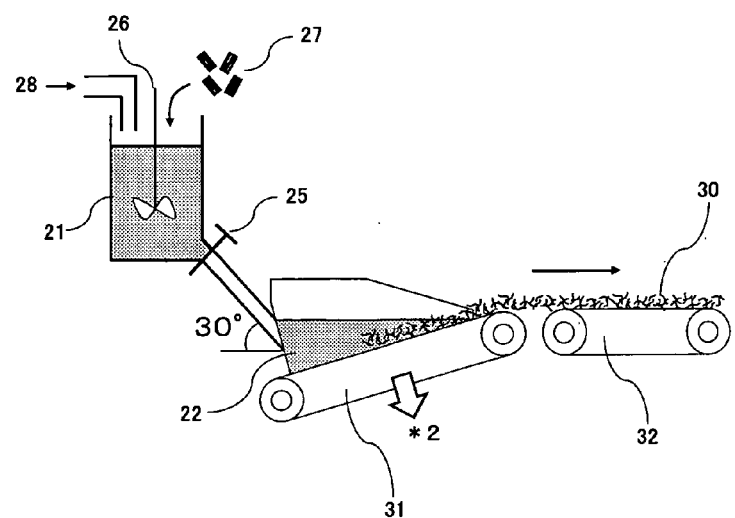
FIG. 3 is a schematic diagram illustrating one example of the apparatus for manufacturing a reinforcing fiber base material (papermaking base material).

Particularly when the manufacture is performed by the wet process, a method of using an apparatus for manufacturing a papermaking base material as illustrated in FIG. 3 can be provided as an example. The basis weight of the reinforcing fiber base material to be obtained can be increased by increasing the concentration of fibers to be charged. Moreover, the basis weight can be adjusted also by adjusting the rate of flow (flow rate) of a dispersion liquid and the speed of a mesh conveyor. For example, the basis weight of a reinforcing fiber base material to be obtained can be increased by increasing the rate of flow of the dispersion liquid while fixing the speed of the mesh conveyor. The basis weight of the reinforcing fiber base material to be obtained can be obtains conversely by reducing the rate of flow of the dispersion liquid while fixing the speed of the mesh conveyor. Furthermore, it is also possible to control the orientation of fibers by adjusting the speed of the mesh conveyor relative to the rate of flow of the dispersion liquid. For example, if the speed of a mesh conveyor is increased relative to the rate of flow of a dispersion liquid, the orientation of the fibers in a reinforcing fiber base material to be obtained becomes prone to match the hauling direction of the mesh conveyor. As mentioned above, the manufacture of a reinforcing fiber base material can be performed by adjusting various parameters.

From the viewpoint of reconciling the physical characteristics and moldability, the mass percentage of the reinforcing fiber base materials in the prepreg of the present invention is preferably from 5 to 60% by mass relative to 100% by mass of the prepreg, more preferably from 10 to 60% by mass, even more preferably from 10 to 50% by mass, and particularly preferably from 15 to 40% by mass. In the prepreg of the present invention, although the resin is required to be penetrated into voids of the reinforcing fiber substrate, the impregnation ratio is preferably from 30 to 100%, more preferably from 40 to 100%, and even more preferably from 50 to 100%. If the impregnation ratio is within the preferable range, it can be used without impairing the handleability and the moldability of the prepreg, which are the effects of the present invention. From the viewpoint of improving the weight reduction of the molded product to be obtained by using the prepreg of the present invention, the volume ratio of the reinforcing fibers determined when the impregnation ratio of the resin is converted to 100% is preferably up to 50%, more preferably up to 40%, and even more preferably from 10 to 30%.

The impregnation ratio is not particularly restricted with respect to its measuring method and can be measured by, for example, simple methods that are provided below. Examples include a method that comprises observing a section of a prepreg first, calculating the total area of voids on the basis of a microscopic photograph, and dividing it by the area of the reinforcing fiber base material, a method that comprises determining it from the ratio (hc0/h0) of the thickness h0 of a prepreg at 23° C. to the thickness hc0 at 23° C. after press molding it, and a method that comprises determining it from the ratio of the theoretical density calculated from the used ratios of respective materials to the bulk density of the prepreg. Here, the method of calculating by observing a section of a prepreg in the thickness direction and measuring the area of void portions in the section and the area of the entire section is explained concretely. Namely, it is a method that comprises wrapping a prepreg with a thermosetting resin such as epoxy, polishing a surface that is a sectional end of the prepreg, observing a range of from about 500 to about 1000 µm in width with an optical microscope or an electron microscope, measuring, in contrast ratio, the area of the sites where the resin has penetrated and the area of the sites where no resin has penetrated, and calculating the resin impregnation ratio by the following formula.

Resin impregnation ratio (%)=100×(the total area of sites where the resin has penetrated)/(the total cross sectional area of the observed site of the prepreg exclusive of reinforcing fiber portions)

The bulk density of a prepreg can be calculated from the volume at 23° C. and the mass of the prepreg. The bulk density of the prepreg of the present invention is preferably from 0.8 to 1.5, more preferably from 0.9 to 1.4, and even more preferably from 1.0 to 1.3. If the bulk density is a preferable range, a molded product using the prepreg of the present invention can secure sufficient lightness. For the same reason, the basis weight of the prepreg is preferably from 10 to 500 g/m$^2$, more preferably from 30 to 400 g/m$^2$, and even more preferably from 100 to 300 g/m$^2$.

As to the thickness of the prepreg of the present invention, from the viewpoint of the handleability in a step of laminating to produce a preform, the thickness $h0$ at 23° C. is from 0.03 to 1 mm, preferably from 0.05 to 0.8 mm, and more preferably from 0.1 to 0.6 mm. If $h0$ is less than 0.03 mm, the prepreg may rupture, whereas if it exceeds 1 mm, the shapability may be impaired.

The prepreg of the present invention is desirable because it can be transferred to a mold with stability by inhibiting the thickness expansion in molding when having been processed into a preform. In a step of laminating prepregs and a step of molding a preform, it is necessary to perform preheating from the viewpoint of control shapability or adhesiveness. Therefore, it is preferable that the thickness $hn$ (mm) of the prepreg at $(n \times 100)°$ C. be $h0 \leq hn \leq h0 \times (2n+1)$ (n is at least one natural number selected from among 1, 2, 3, and 4), more preferably $h0 \leq hn \leq h0 \times 2n$, and particularly preferably $h0 \leq hn \leq h0 \times (2n-1)$. The thickness of the prepreg at $(n \times 100)°$ C. can be measured by using an existing measuring means, such as a caliper, a laser displacement meter and measurement of the thickness by photographing, after leaving at rest the prepreg for 10 minutes in an atmosphere of a temperature at which the measurement is to be conducted.

Here, it is meant that the larger the n is, the higher the ambient temperature is, and the prepreg has a tendency that its thickness expansion increases as the ambient temperature becomes higher. This is interference of reinforcing fibers in the thickness direction in addition to simple volume expansion, and since this phenomenon becomes more noticeable as the viscosity of the resin is lowered, it is higher in ambient temperature dependency. Moreover, thickness expansion caused by the decomposition or foaming of the resin to be used is also mentioned. Therefore, as to the n, a suitable number can be chosen depending on the materials to be used.

n=1 (ambient temperature: 100° C.) is a drying temperature and a general temperature to be used at the time of a lamination step. From the viewpoint of reduction in load of the lamination step, it is preferable that the thickness at this temperature be up to three times $h0$ because if so, it is possible to stably adjust the thickness of the preform to be small. Moreover, n=2 (ambient temperature: 200° C.) is a curing temperature of common thermosetting resins and a processing temperature of low-melting thermoplastic resins. From the viewpoint of securing handleability in transfer to a mold or stable shapability in a molding step, it is preferable that the thickness at that temperature be up to five times $h0$. Moreover, n=3 (ambient temperature: 300° C.) corresponds to the upper limit of a processing temperature of common general-purpose engineering plastics. From the viewpoint that less resin decomposition occurs and a prepreg or a preform can be handled safely and stably, it is preferable that the thickness at that temperature is up to seven times $h0$. Finally, n=4 (ambient temperature: 400° C.) is a processing temperature of common super engineering plastics, where other thermoplastic resins and thermosetting resins are promoted to decompose and the thickness expansion of a reinforcing fiber base material becomes close to a maximum point. Therefore, from the viewpoint of reducing the arranged proportion of reinforcing fibers in the thickness direction and stable handleability of a prepreg, it is preferable that the thickness at that temperature be up to nine times $h0$.

As the method of reducing the arranged proportion of reinforcing fibers in the thickness direction, the reduction can be achieved by dispersing the reinforcing fibers and arranging them planarly as described above when manufacturing a reinforcing fiber base material. In order to arrange reinforcing fibers planarly, a method of using static electricity when accumulating reinforcing fibers, a method of using a regulated air flow, and a method of adjusting the hauling rate of a conveyor can be provided as examples of the dry process. As to the wet process as well, a method of preventing reflocculation of reinforcing fibers dispersed using an ultrasonic wave or the like, a method of adjusting the filtration rate, a method of adjusting the mesh diameter of a conveyor, a method of adjusting the hauling rate of a conveyor can be provided as examples. A method of continuously hauling a reinforcing fiber base material while sucking it with a conveyor with maintenance of a particularly favorable dispersion state is preferable as a method for reducing the arranged proportion of reinforcing fibers in the thickness direction because it is possible to produce a reinforcing fiber base material by forcibly pushing down the reinforcing fibers on the conveyor in synchronization with the flow of the conveyor to a direction parallel to the conveyor plane.

When the temperature of the atmosphere where measurement is to be done is very high and it is difficult to measure directly, the measurement may be conducted after doing treatment so as to keep a state that the thickness is stable and adjusting the temperature to a temperature at which the measurement can be done. For example, if the prepreg is one made of a thermoplastic resin, the resin flows under an atmosphere of a high temperature that is equal to or higher than the melting point or the softening point, but by cooling to room temperature, measurement can be done in a state where the resin of the prepreg has been solidified and the thickness has been fixed.

As to the sites for measuring the thickness, two points X and Y in a prepreg are determined so the straight distance XY might be the longest in the plane of the prepreg.

Next, the straight line XY is divided into ten or more equal parts and the respective dividing points except both ends X, Y are determined to be points for measuring the thickness. The average of the thicknesses at the respective measuring points is defined as the thickness of the prepreg.

[Resin]

The resin to be used for a prepreg is not particularly restricted if it is a resin that has an ability of penetrating into a reinforcing fiber base material and can achieve a tensile strength sufficient for securing handleability in a lamination step, and thermoplastic resins and uncured thermosetting resins described below can be used. Among these, a thermoplastic resin is used for the prepreg of the present invention.

As to the tensile strength σ for securing handleability in a lamination step, the higher the value is, the more suitably it can be subjected to a lamination step and a molding step of high speed and high economical efficiency. The tensile strength σ of a prepreg is required to be at least 0.01 MPa. If it is less than 0.01 MPa, problems, such as rupture of a prepreg, may occur during operations of lamination or molding. As an index of the isotropy of a prepreg, the tensile strength σ, in the relationship between the maximum tensile strength σMax and the minimum tensile strength σMin in the measuring direction, is preferably σMax≦σMin×2, more preferably σMax≦σMin×1.8, and even more preferably σMax≦σMin×1.5. It is preferable that the isotropy of σ be as high as possible because the higher the isotropy of σ is, the more the economic burden in the lamination step can be reduced.

The tensile strength of a prepreg is determined by cutting specimens out from the prepreg, and measuring the tensile characteristic thereof in accordance with the ISO 527-3 method (1995). Specimens were measured for four directions, i.e., 0°, which is an arbitrary direction, +45°, −45°, and 90° directions. The number of measurements for each direction is determined to be n=5 or more, and the average value of all the measurements is defined as a tensile strength. Among the tensile strengths of the respective measuring directions, the maximum value is expressed by σMax and the minimum value is expressed by σMin.

The thermoplastic resin to be used for the prepreg of the present invention may be a thermoplastic resin selected from, for example, crystalline resins including "polyesters, such as polyethylene terephthalate (PET), polybutylene terephthalate (PBT), polytrimethylene terephthalate (PTT), polyethylene naphthalate (PEN) and liquid crystal polyester, polyolefins, such as polyethylene (PE), polypropylene (PP) and polybutylene, polyoxymethylene (POM), polyamide (PA), polyarylene sulfides, such as polyphenylene sulfide (PPS), polyketone (PK), polyetherketone (PEK), polyetheretherketone (PEEK), polyetherketoneketone (PEKK), polyether nitrile (PEN), fluororesin, such as polytetrafluoroethylene, and liquid crystal polymers (LCP)," non-crystalline resins including "styrene-based resins, polycarbonate (PC), polymethyl methacrylate (PMMA), polyvinyl chloride (PVC), polyphenylene ether (PPE), polyimide (PI), polyamideimide (PAI), polyetherimide (PEI), polysulfone (PSU), polyether sulfone, and polyarylate (PAR)," phenol-based resins, phenoxy resins, polystyrene resins, polyolefin resins, polyurethane resins, polyester resins, polyamide resins, polybutadiene resins, polyisoprene resins, fluororesins, and thermoplastic elastomers, such as acrylonitrile-based thermoplastic elastomers, and their copolymers or modified products. In particular, polyolefin are preferable from the viewpoint of the lightness of a molded product to be obtained, polyamide is preferred from the viewpoint of strength, a non-crystalline resin, such as polycarbonate and styrene-based resins, is preferred from the viewpoint of surface appearance, polyarylene sulfide is preferred from the viewpoint of heat resistant, polyetheretherketone is preferred from the viewpoint of continuous use temperature, and fluororesins are preferably used from the viewpoint of chemical resistance.

The use of a thermoplastic resin for the prepreg of the present invention is advantageous with respect to the economical efficiency in a lamination step and a molding step because it will result in a high tensile strength σ. In this case, σ is preferably 1 MPa or more, more preferably 10 MPa or more, and even more preferably 50 MPa or more. There is no particular limitations with respect to the upper limit of σ, but a general example thereof is 1000 MPa or less.

Examples of the thermosetting resin to be used for the prepreg of the present invention include unsaturated polyester, vinyl ester, epoxy, phenol (resol type), urea-melamine, polyimide, copolymers thereof, modified products thereof, and resins resulting from blending of two or more of them. Particularly, epoxy resins are preferably used from the viewpoint of the mechanical properties of a molded product to be obtained. Since a prepreg is cured during a molding step, the glass transition temperature of the thermosetting resin to be used is preferably up to 80° C., more preferably up to 70° C., and even more preferably up to 60° C.

If a thermosetting resin is used for a prepreg, it will become more difficult to secure a tensile strength σ. In this case, σ is preferably 0.05 MPa or more, more preferably 0.1 MPa or more, and even more preferably 1 MPa or more. There are no particular limitations with respect to the upper limit of σ, but a general example thereof is 10 MPa or less. The means for securing a tensile strength σ is not particularly restricted, and it can be achieved, for example, by a method in which a high viscosity type thermosetting resin is used, a method in which a highly adhesive type thermosetting resin is used, or a method in which a fiber reinforced base is sealed in advance with an organic compound or the like.

As a resin component to be used for the present invention, a blend prepared by mixing a thermosetting resin to the aforementioned thermoplastic resin matrix. Furthermore, to the resin component may further be added, according to the application, a filler, a conductivity-imparting agent, a flame retardant, a flame retardant aid, a pigment, a dye, a lubricant, a release agent, a compatibilizer, a dispersing agent, a nucleating agent, a plasticizer, a heat stabilizer, an antioxidant, a coloring inhibitor, a UV absorber, a flowability modifier, a foaming agent, an antibacterial agent, a damping agent, a deodorizer, a sliding property modifier, an antistatic agent, and the like. Particularly, when the application is an electrical or electric instrument, a car, an airplane, or the like, flame retardancy may be required, and a phosphorus-based flame retardant, a nitrogen-based flame retardant, and an inorganic flame retardants are preferably added. Thus, when a component other than a thermoplastic resin is contained in the resin component, the content of the thermoplastic resin in the resin component is adjusted to be 60% by mass or more in order that the effect derived from the use of the thermoplastic resin may not be impaired.

From the viewpoint of economical efficiency, the prepreg of the present invention is long, and the length thereof in the longitudinal direction is preferably 500 mm or more, more preferably 800 mm or more, and even more preferably 1000 mm or more. There are no particular limitations with respect to the length in the longitudinal direction, but a general example thereof is 4000 m or less.

[Method for Manufacturing of a Prepreg]

Various investigations have been done about the method for manufacturing a prepreg in which reinforcing fibers have been dispersed uniformly like the prepreg of the present invention.

For example, WO 2007/97436, previously cited, discloses that when carbon fibers which are in the form of filaments, have a mass-average fiber length of from 0.5 to 10 mm, and have a orientation parameter of from −0.25 to 0.25 are used as reinforcing fibers of a fiber-reinforced thermoplastic resin molded product, a molded product that is superior in mechanical properties and has isotropic mechanical properties can be obtained. This fiber-reinforced thermoplastic resin molded product is produced via (1) a step of heating and melting a thermoplastic resin contained in a molding composition, (2) a step of disposing the molding composition in a mold, (3) a step of pressurizing the molding composition with the mold, (4) a step of solidifying the molding composition within the mold, and (5) a step of opening the mold and removing a fiber-reinforced thermoplastic resin molded product from the mold.

JP 9-94826 A discloses that in manufacturing a fiber-reinforced resin sheet, it is possible to randomize fibers in a web and obtain a randomly oriented fiber-reinforced resin sheet that is light in weight, has isotropically high mechanical strength in respective directions, and demonstrates superior moldability of a thin, large molded product by controlling the direction of the flow of a dispersion liquid containing discontinuous reinforcing fibers and a thermoplastic resin in processing the dispersion liquid by papermaking.

Moreover, JP 2004-217879 A discloses, as a method for manufacturing a stampable sheet, a manufacture method in which (1) reinforcing fibers and a thermoplastic resin are processed by papermaking into a sheet form by a wet dispersion process, and then they are dried to produce a web having a matrix structure in which the reinforcing fibers arranged in an approximately planar direction of the sheet have been bound with the thermoplastic resin, (2) the resulting web is needled to orient some of the reinforcing fibers in the matrix, forming a needled mat, and (3) one side of the needled mat is heated and pressurized at a temperature that is equal to or higher than the melting point of the thermoplastic resin in the matrix.

In all of the methods for the manufacture of a prepreg of these patent documents, reinforcing fibers are processed by papermaking together with a resin, and washing of an apparatus and increasing the number of apparatuses are needed in order to increase the number of the kind of resin. Moreover, it is necessary to control the orientation of carbon fibers and therefore it is necessary to set up detailed conditions for every step. Therefore, manufacture takes time and labor and there is a problem in application to efficient manufacture of a prepreg.

Moreover, in the methods for manufacturing a prepreg disclosed in JP 9-94826 A and JP 2004-217879 A, it is necessary to mix reinforcing fibers with a thermoplastic resin and it is also necessary to conduct papermaking while changing resins in order to produce molding bases of changed thermoplastic resins, so that much time and labor, including washing of a stirring vessel or a papermaking vessel or building manufacture lines, will be required and therefore there are problems with the application of these methods to efficient manufacture.

Then, it is preferable in the present invention to produce a prepreg by the following method. That is, the method is a method for manufacturing a prepreg, the method comprising step (I) of dispersing a reinforcing fiber bundle to obtain a reinforcing fiber base material, step (II) of providing a binder to the reinforcing fiber base material to be produced in the step (I), and step (III) of hybridizing a matrix resin composed of a thermoplastic resin with the reinforcing fiber base material provided with the binder to be produced in the step (II), wherein the steps (I) to (II) are carried out online and the prepreg is one such that the content of the reinforcing fiber bundle relative to the whole portion of the prepreg is from 10 to 80% by mass, the content relative to the whole portion of the prepreg of the binder is from 0.1 to 10% by mass, and the content relative to the whole portion of the prepreg of the matrix resin is from 10 to 80% by mass. According to the method of the present invention for manufacturing of a prepreg, it is possible to obtain in a short time a prepreg that is superior in the dispersion state of reinforcing fibers and will demonstrate superior mechanical properties when being processed into a molded product.

In step (I), a reinforcing fiber bundle is dispersed to obtain a reinforcing fiber base material.

The reinforcing fiber bundle means a fiber bundle that is composed of reinforcing fibers. Although the reinforcing fiber bundle may be either one composed of continuous reinforcing fibers or one composed of discontinuous reinforcing fibers, a discontinuous reinforcing fiber bundle is preferred for achieving a better dispersion state, and a chopped fiber produced by cutting a continuous reinforcing fiber bundle are more preferable.

The reinforcing fiber bundle is preferably a fiber bundle composed of carbon fibers (i.e., carbon fiber bundle) and more preferably a chopped carbon fiber.

Although there is no particular limitations with respect to the number of filaments constituting the reinforcing fiber bundle, it is preferably 24,000 or more and it is more preferably 48,000 or more, from the viewpoint of manufacture efficiency. Although there is no particular limitations with respect to the upper limit of the number of filaments, about 300,000 filaments are much enough for keeping manufacture efficiency, dispersibility, and handling performance satisfactory in consideration of the balance between the dispersibility and the handling performance.

The length of the reinforcing fiber bundle that is a raw material of a reinforcing fiber base material is preferably from 1 to 50 mm, and more preferably from 3 to 30 mm. If the length of the reinforcing fiber bundle is less than 1 mm, it may become difficult to efficiently demonstrate the reinforcing effect caused by the reinforcing fibers. If the length of the reinforcing fiber bundle exceeds 50 mm, it may become difficult to keep dispersion satisfactory. The length of a reinforcing fiber bundle means the length of the filaments constituting the reinforcing fiber bundle, and it can be measured by measuring the length of the reinforcing fiber bundle with a caliper or by taking filaments out from the reinforcing fiber bundle and observing them with a microscope. Moreover, in order to measure a reinforcing fiber length in a reinforcing fiber base material, it can be measured by separating carbon fibers from a prepreg in the following procedure. A part of the prepreg is cut out and an attached thermoplastic resin is dissolved completely by using a solvent that can dissolve the thermoplastic resin. Then, carbon fibers are separated from the thermoplastic resin by known operations, such as filtration. Alternatively, a part of a prepreg is cut out and then heated at a temperature of 500° C. for two hours to burn off the thermoplastic resin, thereby separating carbon fibers from the thermoplastic resin. Four hundred carbon fibers separated are selected at random, the length thereof is measured down to 10 μm with an optical microscope or a scanning electron microscope, and then the average of the measurements is defined as a fiber length.

In the step (I), either a wet process or a dry process, may be used in obtaining a reinforcing fiber base material by dispersing a reinforcing fiber bundle.

When conducting the step (I) by a wet process, a reinforcing fiber base material can be obtained by conducting the dispersion of the reinforcing fiber bundle in water and the resulting slurry is processed by papermaking.

As the water (dispersing water) in which the reinforcing fiber bundle is to be dispersed, waters such as normal tap water, distilled water and purified water, can be used. If necessary, a surfactant may be mixed with water. Although the surfactant is classified into a cationic type, an anionic type, a nonionic type, and an amphoteric type, a nonionic surfactant is used preferably among them, and particularly polyoxyethylene lauryl ether is used more preferably. The concentration of the surfactant to be used when the surfactant is mixed with water is usually from 0.0001 to 0.1% by mass, and preferably from 0.0005 to 0.05% by mass.

The amount of the reinforcing fiber bundle to be added to water (dispersion liquid), which is expressed in the amount per liter of water (dispersion liquid), can be adjusted to within the range of usually from 0.1 to 10 g, and preferably from 0.3 to 5 g. By adjusting to from 0.1 to 10 g, the reinforcing fiber bundle is dispersed in water (dispersion liquid) efficiently and a slurry with uniform dispersion can be obtained in a short time. When dispersing the reinforcing fiber bundle in the water (dispersion liquid), stirring may be conducted, if necessary.

The slurry means a suspension in which solid particles have been dispersed. The solid concentration in the slurry (i.e., the mass content of the reinforcing fibers in the slurry) is preferably from 0.01 to 1% by mass and more preferably from 0.03 to 0.5% by mass. Because of the fact that it is from 0.01 to 1% by mass, processing by papermaking can be conducted efficiently.

The processing of the slurry by papermaking can be performed by aspirating water from the slurry. The processing of the slurry by papermaking can be performed following a so-called papermaking process. In an explanation by way of an example, the processing can be performed by pouring a slurry into a vessel having in its bottom a papermaking surface through which water can be aspirated and then aspirating water. One example of the vessel is No. 2553-I (commercial name) manufactured by Kumagai Riki Kogyo Co., Ltd., which is a vessel equipped in its bottom with a mesh conveyor having a papermaking surface of 200 mm in width. Thus, a reinforcing fiber base material is obtained.

The water content of the reinforcing fiber base material to be obtained after dispersion is preferably adjusted to 10% by mass or less, more preferably to 5% by mass or less before providing a binder in the step (II), i.e., the step of providing a binder. Because of this, the time required for the step (II) can be shortened and a prepreg can be obtained in a short time.

When the step (I) is performed by the dry process, a reinforcing fiber base material can be obtained by dispersing a reinforcing fiber bundle in a gaseous phase. That is, a reinforcing fiber base material can be obtained by dispersing a reinforcing fiber bundle in a gaseous phase and accumulating the reinforcing fiber bundle after the dispersion.

The dispersion of the reinforcing fiber bundle in the gaseous phase includes three methods, i.e., a method that is performed by opening the reinforcing fiber bundle by a non-contact system and accumulating the opened reinforcing fiber bundle (a non-contact method), a method that is performed by opening the reinforcing fiber bundle by applying an air flow thereto and accumulating the opened reinforcing fiber bundle (a method of using an air flow), and a method that is performed by opening the reinforcing fiber bundle by a contact system and accumulating the opened reinforcing fiber bundle (a contact method).

The non-contact method is a method of opening a reinforcing fiber bundle without failing to bring it into contact with a solid or an opening machine. For example, a method of spraying gas, such as air and inert gas, to a reinforcing fiber bundle, especially a method of pressurizing and spraying the air, which is advantageous in the cost aspect is preferably used.

In the method of using an air flow, the conditions for applying the air flow to the reinforcing fiber bundle are not particularly restricted. In one example, compressed air (air flow capable of applying a pressure of normally from 0.1 to 10 MPa, preferably from 0.5 to 5 MPa) is applied until the reinforcing fiber bundle is opened. In the method of using an air flow, the apparatus that can be used is not particularly restricted, and a container that is equipped with an air tube, is capable of sucking the air, and can contain a reinforcing fiber bundle can be provided as an example. By the use of such a container, the opening and the accumulation of a reinforcing fiber bundle can be performed in one container.

The contact method is a method in which a solid or an opening machine is brought into physical contact with a reinforcing fiber bundle to open it. Examples of the contact method include carding, needle punching, and roller opening. Among these, the use of carding or needle punching is preferred, and the use of carding is more preferred. The conditions for practicing the contact method are not particularly restricted and conditions under which a reinforcing fiber bundle is successfully opened may be determined appropriately.

The proportion accounted for by the reinforcing fibers in the reinforcing fiber base material is from 80 to 100% by mass, and more preferably from 90 to 100% by mass. Because of the fact that it is from 80 to 100% by mass, the reinforcing effect can be demonstrated efficiently when using a reinforcing fiber base material and hybridizing it with a matrix resin.

The basis weight of the reinforcing fiber base material is preferably from 10 to 500 $g/m^2$, and more preferably from 50 to 300 $g/m^2$. If it is less than 10 $g/m^2$, troubles in handleability, such as rupture of a base, may occur, whereas if it exceeds 500 $g/m^2$, a long time may be taken for drying a base in the wet process or a web may be thick in the dry process, so that it may become difficult to handle the base in the following process.

In the step (II), a binder is provided to the reinforcing fiber base material to be obtained in the step (I).

The binder means a binder which intervenes between a reinforcing fiber base material and a matrix resin to connect them. The binder is usually a thermoplastic resin. Examples of the thermoplastic resin include acrylic polymers; vinyl polymers, polyurethanes, polyamides, and polyesters. In the present invention, one or two or more selected from among these examples are preferably used. Moreover, the thermoplastic resin preferably has at least one kind of functional group selected from among an amino group, an epoxy group, a carboxyl group, an oxazoline group, a carboxylic acid base group, and an acid anhydride group and it may have two or more kinds of functional groups. Particularly, a thermoplastic resin having an amino group is more preferred.

The provision of the binder to the reinforcing fiber base material is preferably conducted in the form of an aqueous solution, an emulsion, or a suspension of the binder (for example, the aforementioned thermoplastic resin). The aqueous solution means a solution in a state of having been dissolved in water almost completely, an emulsion means a solution (emulsion) in a state where two liquids which do not dissolve completely have formed fine particles in a liquid, and the suspension means a solution (suspension) in a state of having been suspended in water. The size of the component particle diameter in the liquid is in the order, aqueous solution<emulsion<suspension. Although the system of impartation is not particularly restricted, a system in which a carbon fiber base is immersed in an aqueous solution, an emulsion or a suspension of a thermoplastic resin, a shower system, and so on are available, for example. After the contact, it is preferable to remove excessive binder before the drying step, for example, by aspirating it or forcing is to be absorbed by an absorber, such as absorbent paper.

In the aforementioned step (II), the reinforcing fiber base material is preferably heated after the impartation of the binder. Thereby, the time required for the step (III) can be shortened and a prepreg can be obtained in a short time. As to the heating temperature, the temperature at which the reinforcing fiber base material after the impartation of the binder is dried can determined appropriately and it is preferably from 100 to 300° C., and more preferably from 120 to 250° C.

In the step (III), a binder-imparted reinforcing fiber base material to be obtained in the step (II) is impregnated with a matrix resin, so that the reinforcing fiber base material and the matrix resin are hybridized together.

The hybridization of the matrix resin to the binder-imparted reinforcing fiber base material can be performed by bringing the matrix resin into contact with the reinforcing fiber base material. Although the matrix resin in this case is not particularly restricted with respect to its form, when the matrix resin is, for example, a thermoplastic resin, it is preferably in at least one form selected from among fabric, non-woven fabric and film, and it is preferable that the matrix resin be in the form of non-woven fabric. The system of contact is not particularly restricted, and an example thereof is a method in which two sheets of fabric, non-woven fabric or film of the matrix resin are prepared and they are disposed on both sides of a binder-imparted reinforcing fiber base material.

The hybridization is preferably performed by pressurization and/or heating, and it is more preferable that both pressurization and heating be carried out simultaneously. The condition of the pressurization is preferably from 0.01 to 10 MPa, and more preferably from 0.05 to 5 MPa. The condition of heating is preferably a temperature at which the matrix resin to be used can melt and flow, and the temperature range is preferably from 50 to 400° C. and more preferably from 80 to 350° C. Pressurization and/or heating can be performed while the matrix resin is kept in contact with the reinforcing fiber base material having been provided with the binder. An example is a method in which two sheets of fabric, non-woven fabric, or film of the matrix resin are prepared, followed by disposing them on both sides of the binder-imparted reinforcing fiber base material and then applying heating and/or heating from both sides (e.g., a method of sandwiching with a double-belt pressing machine).

A prepreg is obtained by the step (III).

In the present invention, the step (IV) may further be possessed in addition to the aforementioned steps (I) to (III). The step (IV) is a step of hauling the prepreg obtained by the aforementioned step (III). The hauling of a prepreg can be conducted by winding it into a roll. The hauling rate is preferably 10 m/min or more. The upper limit of the hauling rate is usually 100 m/min or less.

Among the steps (I) to (III), and the step (IV) which is carried out if necessary, the steps (I) and (II) are preferably carried out online. Moreover, it is more preferable that all the steps (I) to (III) and the step (IV) which is carried out if necessary be performed online. Online is a system in which the respective steps are performed continuously and it is an antonym of offline. That is, online means a process in which the respective steps are carried out as a series of procedures and differs from a process in which the respective steps are independent. By performing the steps (I) and (II) online, it is possible to obtain a prepreg in a short time.

As to the blended amounts of the reinforcing fiber bundle, the binder and the matrix resin to the whole prepreg, that of the reinforcing fiber bundle is preferably from 10 to 80% by mass, that of the binder is from 0.1 to 10% by mass, and that of the matrix resin is from 10 to 80% by mass. The adjustment to these ranges makes it easy to obtain a molding base that can efficiently demonstrate the reinforcement by reinforcing fibers. More preferably, that of the reinforcing fiber bundle is from 10 to 60% by mass, that of the binder is from 0.5 to 10% by mass, and that of the matrix resin is from 30 to 80% by mass. Even more preferably, that of the reinforcing fiber bundle is from 20 to 60% by mass, that of the binder is from 1 to 8% by mass, and that of the matrix resin is from 32 to 79% by mass.

[Method for Manufacturing a Reinforcing Fiber Base Material by a Wet Process]

In the step (I) in which the aforementioned reinforcing fiber bundle is dispersed to obtain a reinforcing fiber base material, it is preferable to obtain a reinforcing fiber base material by a wet process. Particularly, it is preferable to obtain a reinforcing fiber base material by the following steps (i) to (iv). That is, the method is a method for manufacturing a reinforcing fiber base material, the method comprising step (i) of charging a reinforcing fiber bundle to a dispersion medium, step (ii) of preparing a slurry in which reinforcing fibers forming the reinforcing fiber bundle are dispersed in the dispersion medium, step (iii) of transporting the slurry, and step (iv) of removing the dispersion medium from the slurry to produce a papermaking base material containing reinforcing fibers.

In the step (i), a reinforcing fiber bundle is charged into a dispersion medium.

The dispersion medium (dispersion liquid) means a medium that can disperse a reinforcing fiber bundle. Examples of the dispersion medium include so-called solvents, such as water and alcohol, and water is preferred. As the water, waters such as normal tap water, distilled water and purified water, can be used. If necessary, a surfactant may be mixed with water. Although the surfactant is classified into a cationic type, an anionic type, a nonionic type, and an amphoteric type, a nonionic surfactant is used preferably among them, and particularly polyoxyethylene lauryl ether is used more preferably. The concentration of the surfactant to be used when the surfactant is mixed with water is usually from 0.0001 to 0.1% by mass, and preferably from 0.0005 to 0.05% by mass. The viscosity of the dispersion medium can be adjusted by, if necessary, dissolving a macromolecular compound in the dispersion medium. As the macromolecular compound, a water-soluble macromolecule or an organic-soluble macromolecule can be used suitably according to the kind of a solvent. When the dispersion medium is water, starch, polyvinyl alcohol, and polyethylene oxide are used more preferably. When a macromolecular compound is dissolved in a dispersion medium, the concentration of the macromolecular compound is preferably from 0.01 to 5% by mass, and more preferably from 0.05 to 1% by mass.

As each of the solvent, the surfactant, and the macromolecular compound which constitute the dispersion medium, one kind of substance may be used or alternatively two or more kinds of substances may be used.

As to the dispersion medium, its viscosity measured by using a B type viscometer is preferably from 2 to 100 mPa·s, more preferably from 2 to 80 mPa·s, and even more preferably from 3 to 50 mPa·s. When the viscosity is 1 mPa·s or more, it is possible to inhibit the reflocculation of reinforcing fibers and obtain a fiber reinforced base with superior dispersibility. When the surface oxygen concentration ratio is 100 mPa·s or less, adhesion of the surfactant or macromolecular compound contained in the dispersion medium will decrease and strong adhesion to a thermoplastic resin composition can be obtained.

In the step (ii) is prepare a slurry in which reinforcing fibers which constitute a reinforcing fiber bundle have been dispersed in a dispersion medium. In the present invention, an aqueous slurry is preferred.

The step (ii) is usually carried out in a dispersion vessel. The dispersion vessel is a vessel (container) that can contain a slurry. When using a dispersion vessel, it is preferable to charge the dispersion medium and the reinforcing fiber bundle in the step (i) directly to the dispersion vessel. Of course, it is also permissible to charge the dispersion medium and the reinforcing fiber bundle to a vessel other than the dispersion vessel in advance and then transfer the content of the vessel to the dispersion vessel and carry out the step (ii). When dispersing the reinforcing fiber bender in the dispersion medium (dispersion liquid), stirring may be conducted, if necessary. That is, the dispersion vessel may be one provided with a stirring device, if necessary.

In the step (iii), the slurry to be obtained in the step (ii) is transported.

The step (iii) is usually performed in the transport portion that connects the dispersion vessel where the step (ii) is performed to the papermaking vessel where the step (iv) is performed.

Although the width of the transport portion is not particularly limited, it is preferred that the ratio of the width W1 of the transport portion to the width W2 of the reinforcing fiber base material, W1/W2, be 0.5 to 1.0, and more preferably 0.7 to 1.0. If W1/W2 is less than 0.5, a long time may be needed for the transportation in the step (iii) or the dispersion state may become insufficient because when a slurry flows from the transport portion to the step (iv), the width of a slurry flow portion becomes large and therefore a load is applied to the slurry. If W1/W2 exceeds 1.0, the dispersion state of the slurry in the step (iv) may become insufficient. The "width of a transport portion" as referred to herein means the major axis of the section of the transport portion; for example, when the section of a transport portion is a rectangle, it means the length of the longer sides. The "width of a reinforcing fiber base material" means the width, which is shorter than the length, among the length the width, and the thickness of a reinforcing fiber base material to be used in the step (iv). If the width varies from site to site, it means the average thereof.

The width of the transport portion usually falls within the range of from 0.1 to 2 m. The width of the reinforcing fiber base material is usually from 0.2 to 2 m.

The shape of the transport portion is not particularly limited if it is a shape such that a slurry can be transported and usually is a tubular shape. According to need, the transport portion may be provided with a liquid transfer pump in the middle thereof. The liquid transfer pump is preferably a low shear pump, such as a diaphragm pump and a snake pump.

The step (iii) may be a step that is performed by an overflow system. This can prevent the reinforcing fibers in a slurry to be transported from sedimenting or agglomerating through the application of shearing force to the reinforcing fibers, so that the dispersibility in slurry can be maintained. Moreover, the transportation can be achieved economically without using power, such as a pump.

The overflow system means a system to send a liquid overflowing from a vessel (tub) to a next vessel (tub) by using the force of gravity. That is, it is a system to send a liquid substantially without using power, such as a liquid transfer pump.

In using the overflow system, it is preferable that the transport portion incline. That is, in viewing the transport portion horizontally, it is preferable that the joint between the dispersion vessel and the transport portion be located at a position that is higher than the joint between the papermaking vessel and the transport portion. The inclination angle is preferably from 30 to 60° and more preferably from 40 to 55°. If the inclination angle is smaller than 30°, the transportation in the step (iii) may take a long time. If the inclination angle exceeds 60°, the flow rate of a slurry in its transportation becomes high in the use of the overflow system, and therefore an excessive shear will be applied to the slurry at its arrival at the step (iv), so that the state of dispersion of the slurry in the step (iv) may become insufficient.

The inclination angle referred to herein means the degree of an angle located on the vertically downward side of a point where the center line of the tube of the transport portion intersects a line that is parallel to the gravity direction.

When the step (iii) is performed in the overflow system, the joint of the transport portion with the dispersion vessel is preferably located on the wall of the dispersion vessel, particularly in its upper part.

In the use of the overflow system, it is preferable that the transport portion be in a straight shape, in other words, it be in a shape having no direction turning point such as a curved portion or a bent portion in the middle.

In the use of the overflow system, the height of the transport portion is preferably 60 mm or more, and more preferably 100 mm or more. Because of the fact that it is 60 mm or more, it is possible to render the contact area of the wall of the transport portion with the slurry relatively small for the amount of the slurry to be transported and it is possible to reduce reflocculation of dispersed fibers due to the generation of shear force to the slurry at the time of contact with the wall. The height of a transport portion referred to herein means the length of the diameter of the transport portion when viewing the transport portion horizontally. When the transport portion is a rectangle (the longer sides are in the base width direction and the shorter sides are in the base thickness direction), the length of the shorter sides corresponds to the "height of the transport portion." The upper limit of the height of the transport portion is not particularly limited and it is usually 500 mm or less. If the height of the transport portion differs position by position, it shall mean the average.

The shape of the transport portion is explained by taking FIG. 13 to FIG. 20 as examples. FIG. 13 to FIG. 20 are drawings that schematically illustrate the horizontally viewed locational relationship between the dispersion vessel, the papermaking vessel, and the transport portion in a case where the steps (i) and (ii) are carried out in the dispersion vessel, the step (iv) is performed in the papermaking vessel, and the step (iii) is carried out in the transport portion connecting the dispersion vessel with the papermaking vessel. The transport portion 213 depicted in each of FIG. 13 to FIG. 18 and FIG. 20 is straight.

The inclination angle of the transport portion means an angle r which is formed vertically downward by the central line q of the transport portion 213 and the line p that extends in the direction gravity in each diagram. The transport portion 213 in each of FIG. 13, FIG. 17 and FIG. 18 inclines from the dispersion vessel 211 towards the papermaking vessel 212 and the inclination angle thereof is from 30 to 60°. The transport portion 213 in FIG. 14 connects the dispersion vessel 211 and the papermaking vessel 212 horizontally and the inclination angle thereof is about 90°. The transport portion 213 in FIG. 15 inclines from the dispersion vessel 211 towards the papermaking vessel 212 and the inclination angle thereof is from 30 to 60°. The transport portion 213 in FIG. 16 connects the dispersion vessel 211 and the papermaking vessel 212 vertically and the inclination angle thereof is about 0°. The transport portion 213 in FIG. 20 also has an inclination angle of about 0° like that in FIG. 16, and a pump 225 is mounted in the middle of the transport portion 213.

Figure 13:
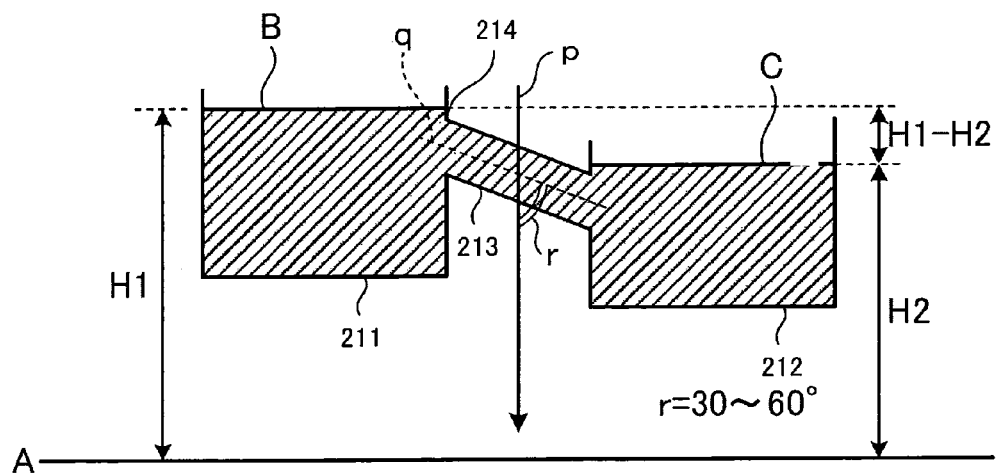
FIG. 13 is a schematic diagram illustrating one example of the horizontally-viewed positional relationship of a dispersion vessel, a papermaking vessel, and a transport portion.
Figure 17:
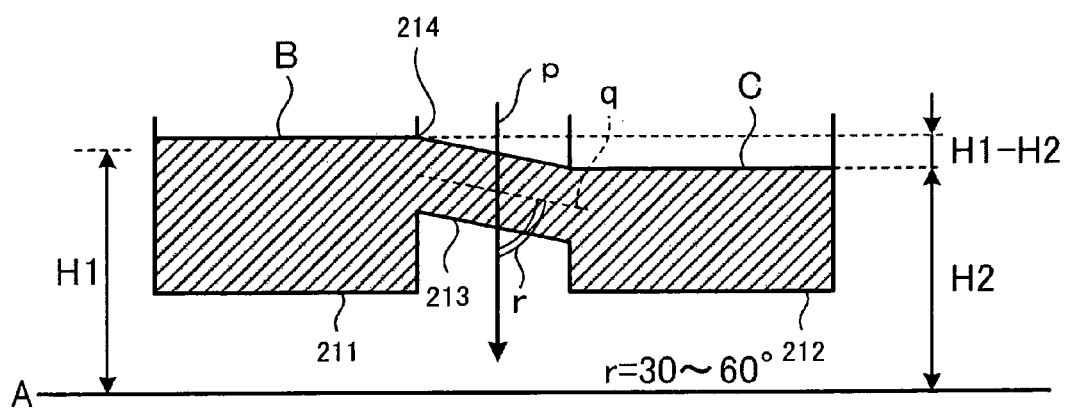
FIG. 17 is a schematic diagram illustrating one example of the horizontally-viewed positional relationship of a dispersion vessel, a papermaking vessel, and a transport portion.
Figure 18:
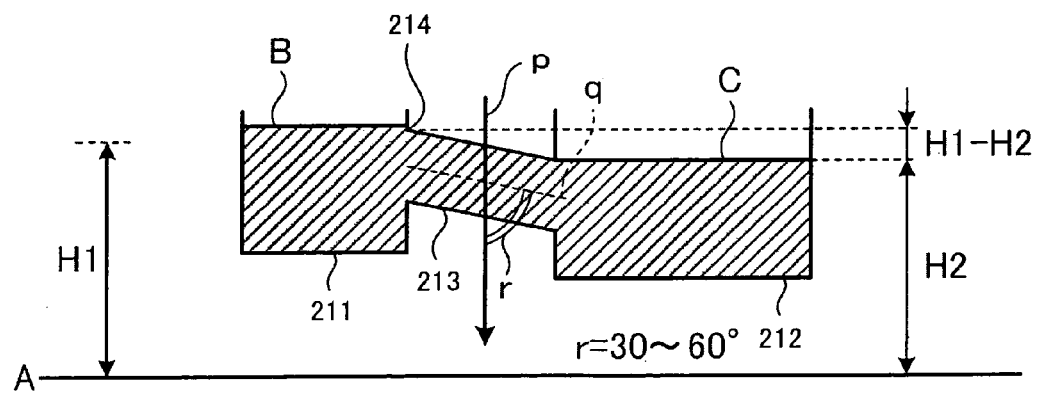
FIG. 18 is a schematic diagram illustrating one example of the horizontally-viewed positional relationship of a dispersion vessel, a papermaking vessel, and a transport portion.
Figure 19:
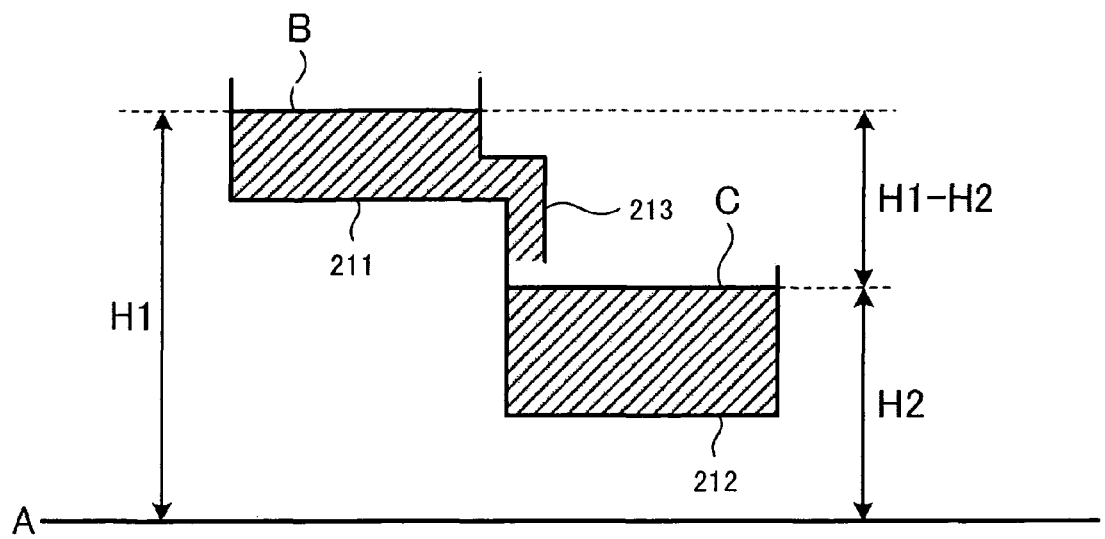
FIG. 19 is a schematic diagram illustrating one example of the horizontally-viewed positional relationship of a dispersion vessel, a papermaking vessel, and a transport portion.
Figure 20:
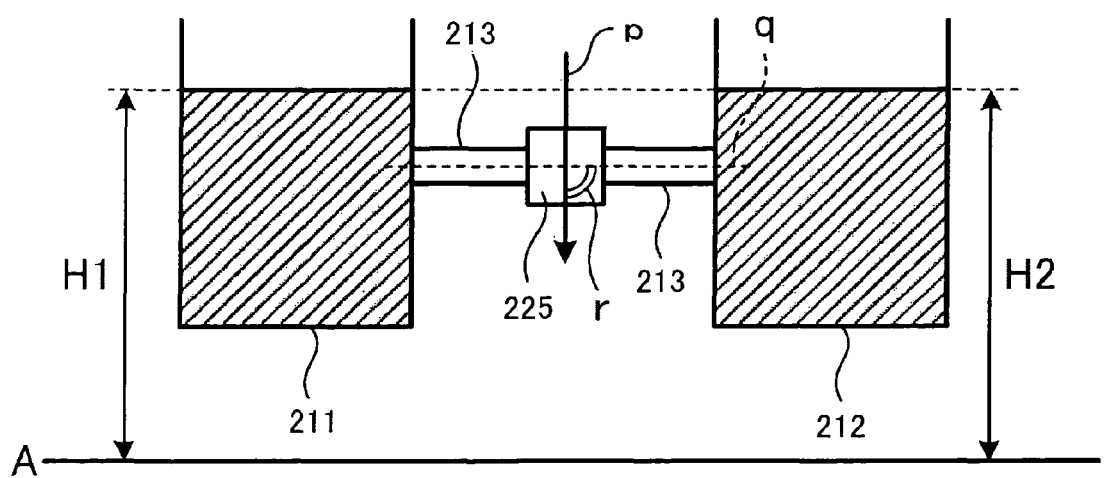
FIG. 20 is a schematic diagram illustrating one example of the horizontally-viewed positional relationship of a dispersion vessel, a papermaking vessel, and a transport portion.

In FIG. 13, FIG. 17, and FIG. 18, the connecting part 214 of the transport portion 213 to the dispersion vessel 211 is located at an upper part of the wall of the dispersion vessel 211. Therefore, a positional relationship of a dispersion vessel, a papermaking vessel and a transport portion like that illustrated in FIG. 13 makes it possible to perform the step (iii) in an overflow system.

In the step (iv), a papermaking base material containing reinforcing fibers, that is, a reinforcing fiber base material is obtained by removing the dispersion medium from the slurry.

The step (iv) is usually carried out in a papermaking vessel. The papermaking vessel is a vessel (container) that can contain a slurry and has a papermaking surface through which moisture can be aspirated. The papermaking surface is generally provided near the bottom and examples of the material thereof include a mesh sheet.

In the present invention, the reinforcing fiber base material to be obtained in the step (iv) can be hauled. The hauling of a reinforcing fiber base material can be conducted by winding the reinforcing fiber base material into a roll. The hauling rate is preferably 10 m/min or more. The upper limit of the hauling rate is usually 100 m/min or less.

It is preferable that the steps (i) to (iv) be performed online.

It is preferable that the level H1 of the surface of the slurry in the step (ii) be at a position that is higher than the level H2 of the surface of the slurry in the step (iv). The "level of the surface of a slurry" means the position of the surface in viewing the slurry horizontally. "To be at a position that is higher" means that when the levels of the two surfaces are each expressed by a measured value of a distance from a standard that is located vertically below the level, one level is located at a higher position than the other, in other words, one of the levels of the two surfaces is located vertically below the other.

In particular, it is preferable that the difference H1–H2 between the level H1 of the surface of the slurry in the step (ii) and the level H2 of the surface of the slurry in the step (iv) be from 0.1 to 5 m, more preferably from 0.5 to 2 m. If it is less than 0.1 m, the transportation in the step (iii) may require a long time. On the other hand, if it exceeds 5 m, the state of dispersion of the slurry in the step (iv) may become insufficient.

Figure 14:
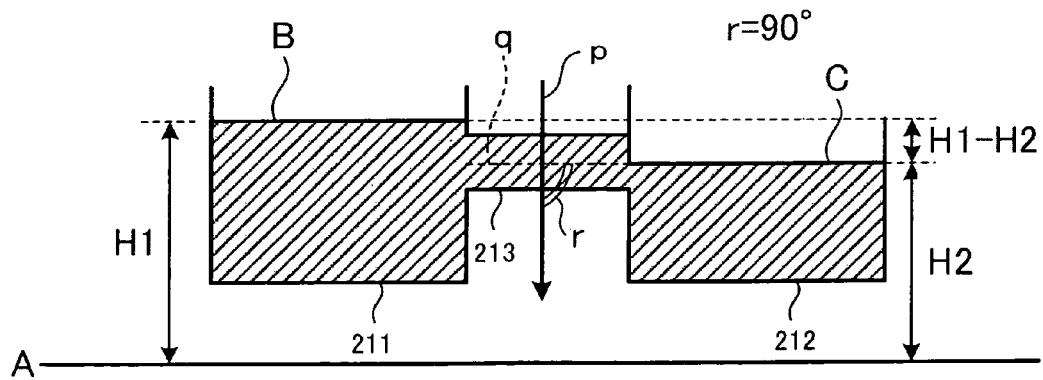
FIG. 14 is a schematic, diagram illustrating one example of the horizontally-viewed positional relationship of a dispersion vessel, a papermaking vessel, and a transport portion.
Figure 15:
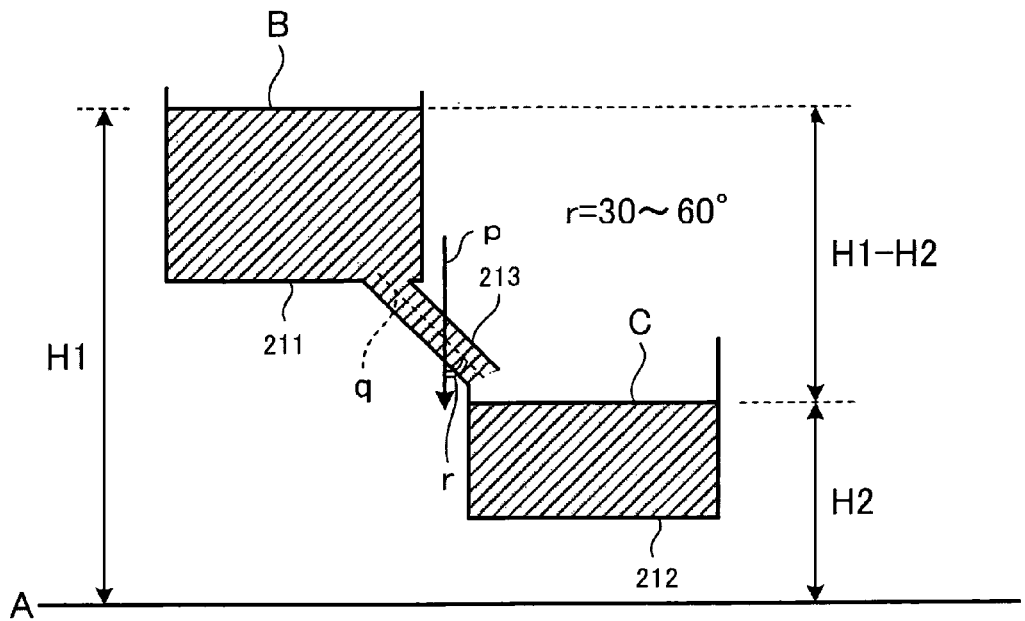
FIG. 15 is a schematic diagram illustrating one example of the horizontally-viewed positional relationship of a dispersion vessel, a papermaking vessel, and a transport portion.
Figure 16:
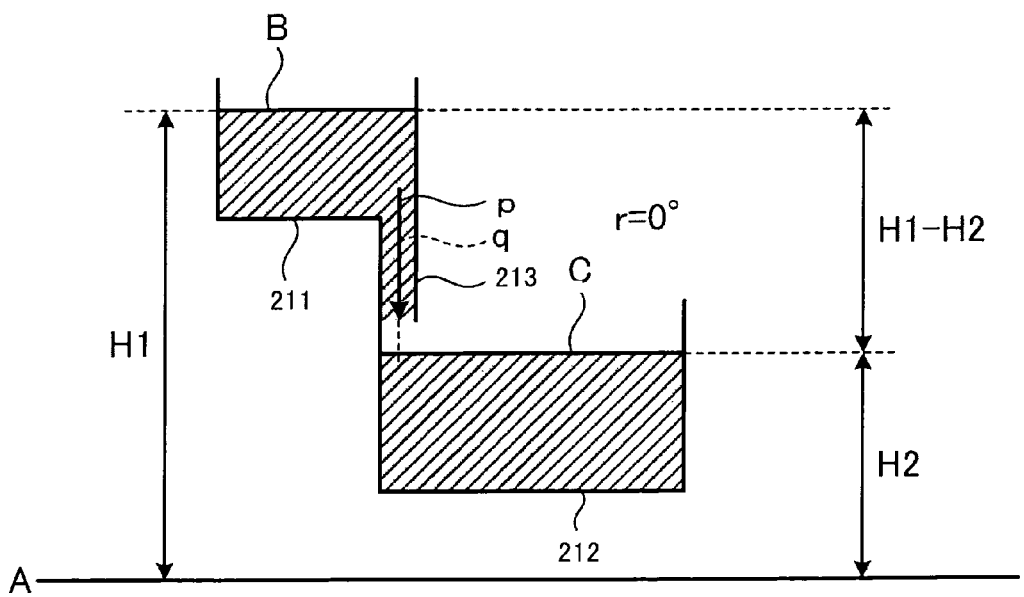
FIG. 16 is a schematic diagram illustrating one example of the horizontally-viewed positional relationship of a dispersion vessel, a papermaking vessel, and a transport portion.

The level H1 of the surface of the slurry in the step (ii) and the level H2 of the surface of the slurry in the step (iv) are explained on the basis of FIG. 13 to FIG. 20. The level H1 of the surface of the slurry (shadow area) in the dispersion vessel 211 is represented by the distance H1 of position B of a surface relative to a standard A located vertically below H1 and H2. The level H2 of the surface of the slurry (shadow area) in the papermaking vessel 212 is represented by the distance H2 of position C of a surface relative to a surface standard A. In order to maintain the difference between the levels H1 and H2 of the surfaces of the slurries, it is preferable that the dispersion vessel 211 and the papermaking vessel 212 be positioned with a gap in the gravity direction as illustrated in FIG. 13, FIG. 15, FIG. 16, and FIG. 19, but it is also permissible that the positions of the dispersion vessel 211 and the papermaking vessel 212 in the gravity direction may be level if the levels of the surfaces of the slurries in the respective vessels are adjusted by the amounts of the slurries and the size of the vessels as illustrated in FIG. 14, FIG. 17, and FIG. 18.

In order to maintain the level H1 of the surface of the slurry in the step (ii) at a position higher than the level H2 of the surface of the slurry in the step (iv), it is preferable that, for example, when the step (ii) is performed in the dispersion vessel and the step (iv) is performed in the papermaking vessel, these two vessels be mounted so that the position of the bottom of the dispersion vessel may be located vertically above the position of the top of the papermaking vessel.

It is preferable that the time taken from the step (i) to the start of the step (iv) be up to 10 minutes. If it exceeds 10 minutes, the reinforcing fibers dispersed in the slurry may reflocculate according to the kind of the reinforcing fibers. The lower limit of the time to be taken from the step (i) to the start of the step (iv), which is not particularly limited, is usually one minute or more.

It is preferable that a dispersion medium and a reinforcing fiber bundle be charged continuously in the step (i) and the steps (i) to (iv) be executed continuously. Thereby, a reinforcing fiber base material can be obtained in a shorter time. If a large amount of slurry is charged in one portion, along time may be taken before part of the slurry is processed and, as a result, the dispersion state may become defective; however, continuous charging and execution makes it possible to perform papermaking a slurry little by little efficiently while maintaining the dispersion state. "To charge continuously" and "to execute continuously" mean to charge continuously and to execute the steps (ii) to (iv) for the raw materials charged in the step (i) one after another or continuously. In other words, they mean a state that the charging of the raw materials of a dispersed slurry and the charging of the slurry are executed continuously in a series of steps and mean a process with more consideration for mass manufacture than a process in which a certain amount of slurry is produced first. Examples of the methods for the continuous charging or execution include methods of other than a batch system, a method of charging at a fixed rate, and a method of charging in almost equal portions at prescribed intervals. One example of the conditions for charging at a fixed rate is such a condition that a dispersion medium is charged at a rate of from $1 \times 10^3$ to $1 \times 10^7$ g/min and a reinforcing fiber bundle at a rate of from 0.1 to $1 \times 10^5$ g/min. One example of the conditions for charging in almost equal portions in prescribed intervals is such a condition that a dispersion medium is charged at every 1 to 5 minutes in an amount of from $1 \times 10^3$ to $1 \times 10^7$ g and a reinforcing fiber bundle at every 1 to 5 minutes in an amount of from 0.1 to $1 \times 10^5$ g.

The level H1 of the surface of the slurry in the step (ii) is preferably kept at substantially the same level throughout the step (ii). Especially when the steps (i) to (iv) are executed continuously, the level H1 of the surface of the slurry in the step (ii) is preferably kept at substantially the same level throughout the step (ii).

"To be kept at substantially the same level throughout the step (ii)" means that the variation of the level during the execution of the step (ii) is within 100 mm, preferably within 50 mm, and more preferably no variation (0 mm). In order to keep the level H1 of the surface of the slurry in the step (ii) at substantially the same level throughout the step (ii), it is preferable to execute the step (i) continuously. For example, when performing step (ii) in the dispersion vessel, it is preferable to perform the charging of the dispersion medium and the reinforcing fibers to the dispersion vessel continuously and perform the steps (i) to (iv) continuously.

Moreover, in the method for manufacturing a reinforcing fiber base material by a wet process in the present invention, any of the following manufacture methods a, b, and c or a combination of these is preferred.

[Evaluation of the Method a for Manufacturing a Reinforcing Fiber Base Material by a Wet Process]

In methods for manufacturing a papermaking-processed body in which a solid component has been mixed uniformly, it has been proposed to dilute a slurry concentration before charging a raw material slurry to a papermaking step (JP 2006-104608A). Specifically, it has been proposed to prepare a slurry with a high reinforcing fiber concentration and then diluting this to produce a slurry with a low reinforcing fiber concentration in order to keep the dispersibility of reinforcing fibers in a slurry. However, there is a problem that the work becomes more complicated due to the execution of two stages and, in the case of reinforcing fibers which are low in affinity to the dispersion medium of a slurry, it is very difficult to produce a slurry with a high reinforcing fiber concentration.

Then, in the method for manufacturing a reinforcing fiber base material by a wet process in the present invention, it is preferable to produce the product by the following method. That is, the method is a method for manufacturing a reinforcing fiber base material, the method comprising step (i-a) of charging a reinforcing fiber bundle to a dispersion medium, step (ii-a) of preparing a slurry in which reinforcing fibers forming the reinforcing fiber bundle are dispersed in the dispersion medium, step (iii-a) of transporting the slurry, and step (iv-a) of removing the dispersion medium from the slurry to produce a papermaking base material containing reinforcing fibers, wherein C1/C2 is within a range of from 0.8 to 1.2 where the mass content of the reinforcing fibers in the slurry to be prepared in the step (ii-a) is expressed by C1 and the mass content of the reinforcing fibers in the slurry at the time of the commencement of the step (iv-a) is expressed by C2. According to this method for manufacturing a reinforcing fiber base material, the method can be applied to reinforcing fibers with low affinity to a dispersion medium in slurry preparation and can keep fiber dispersibility of reinforcing fibers in papermaking, and it is possible to obtain, in a short time, a reinforcing fiber base material which will afford a molded product superior in mechanical properties if being processed into a molded product with incorporation of a resin or the like. Henceforth, this method for manufacturing a reinforcing fiber base material is referred to as manufacturing method a.

In manufacture method a, C1/C2 is adjusted to within a range of from 0.8 to 1.2 where the mass content of the reinforcing fibers in the slurry to be prepared in the step (ii-a) is expressed by C1 and the mass content of the reinforcing fibers in the slurry at the time of the commencement of the step (iv-a) is expressed by C2. C1/C2 is preferably within a range of from 0.9 to 1.1. If C1/C2 is less than 0.8, it is necessary to remove only the dispersion medium or add only reinforcing fibers in order to increase C2, the process becomes complicated, and the dispersion state of the slurry may become insufficient. If C1/C2 exceeds 1.2, the dispersion state of the slurry in the step (iv-a) may become insufficient.

The time to be taken by the step (ii-a) is preferably up to 10 minutes, more preferably up to 5 minutes, and even more preferably up to 3 minutes. If it exceeds 10 minutes, the reinforcing fibers dispersed in the slurry may reflocculate according to the kind of the reinforcing fibers. The lower limit of the time to be taken by the step (ii-a), which is not particularly limited, is usually one minute or more.

The rate of charging of a slurry in the step (iii-a), that is, the flow rate of a slurry to the step (iv-a) is preferably from 0.001 to 0.1 $m^3$/sec, and more preferably from 0.005 to 0.05 $m^3$/sec. If it is less than 0.001 $m^3$/sec, the charging rate is small and a long time will be required for a process, so that the manufacture efficiency may lower; whereas if it exceeds 0.1 $m^3$/sec, shear is prone to be applied to a slurry because of a high flow rate of the slurry and therefore the dispersion state may become insufficient.

In the steps (ii-a) to (iv-a), it is preferable to perform papermaking while adjusting a fiber concentration parameter $nL^3$ to within a range of $(0<)nL^3<L/D$. Here, the respective parameters are as follows.

n: The number of the reinforcing fibers contained per unit volume of a slurry
L: Length of a reinforcing fiber
D: Diameter of a reinforcing fiber.

Figure 30:
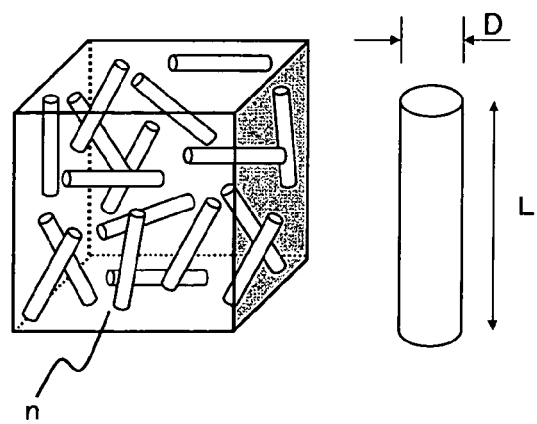
FIG. 30 is a schematic diagram of a slurry containing reinforcing fibers.

A schematic diagram of a slurry containing reinforcing fibers is shown in FIG. 30. Doi, M. and Edwards, S. F., The Theory of Polymer Dynamics 324 (1986) discloses that a rarefied state is produced when the fiber concentration parameter $nL^3$ satisfies $nL^3<1$ and a quasi-rarefied state is produced when $1<nL^3<L/D$. That the fiber concentration parameter $nL^3$ is less than L/D is preferred for inhibiting reflocculation of reinforcing fibers and increasing the dispersibility of reinforcing fibers in a slurry because if so, the reinforcing fibers dispersed in the slurry become difficult to dynamically interfere with each other. It is preferable that the concentration of reinforcing fibers be as low as possible because the lower the concentration, the more the dispersibility of the reinforcing fibers can be increased. However, when wishing to secure the basis weight or the thickness of a reinforcing fiber base material to be obtained or when wishing to increase the manufacture efficiency of a reinforcing fiber base material, it is preferable to increase the concentration of the reinforcing fibers and it is preferable to perform papermaking at a reinforcing fiber concentration of $1<nL^3<L/D$, which is a quasi-rarefied state.

[Evaluation of the Method b for Manufacturing a Reinforcing Fiber Base Material by a Wet Process]

It has been disclosed that a wet-system method for manufacturing a fiber-reinforced thermoplastic resin sheet includes controlling the structure in a headbox through which a dispersion liquid passes and the condition to be used in charging the dispersion liquid onto a mesh belt from the headbox (JP 8-232187 A and JP 9-136969 A). It has been disclosed that it is thereby possible to obtain a fiber-reinforced thermoplastic resin sheet without local unevenness with respect to basis weight or without abnormal orientation of reinforcing fibers and that it is possible to obtain a fiber-reinforced thermoplastic resin sheet with no variation of basis weight distribution in the width direction.

However, the methods of JP 8-232187 A and JP 9-136969 A is required to use a liquid transfer pump as power for transporting a slurry. Therefore, shear is prone to occur, so that it was difficult to maintain a dispersion state for a long time.

Then, in the method for manufacturing a reinforcing fiber base material by a wet process in the present invention, it is preferable also to produce the product by the following method. That is, the method is a method for manufacturing a reinforcing fiber base material, the method comprising step (i-b) of charging a reinforcing fiber bundle to a dispersion medium, step (ii-b) of preparing a slurry in which reinforcing fibers forming the reinforcing fiber bundle are dispersed in the dispersion medium, step (iii-b) of transporting the slurry, and step (iv-b) of removing the dispersion medium from the slurry to produce a papermaking base material containing reinforcing fibers, wherein the steps (i-b) to (iv-b) are carried out online and the level H1 of the surface of the slurry in the step (ii-b) is higher than the level H2 of the surface of the slurry in the step (iv-b). According to this method for manufacturing of a reinforcing fiber base material, it is not necessary to use a liquid transfer pump as power for transporting a slurry in the step (iii-b). Therefore, shear of a slurry becomes harder to occur and a dispersion state can be kept for a long time. Moreover, flocculation of fibers is inhibited and it is possible to obtain, in a short time, a reinforcing fiber base material which will afford a molded product superior in mechanical properties if being processed into a molded product with incorporation of a thermoplastic resin. Henceforth, this method for manufacturing a reinforcing fiber base material is referred to as manufacturing method b.

In manufacture method b, the level H1 of the surface of the slurry in the step (ii-b) is rendered higher than the level H2 of the surface of the slurry in the step (iv-b). Rendering H1 higher than H2 eliminates the necessity of using a liquid transfer pump in order to transfer the slurry in the step (iii-b). That is, it is not necessary to install a liquid transfer pump in a transport portion as shown in FIG. 30B.

[Evaluation of the Method c for Manufacturing a Reinforcing Fiber Base Material by a Wet Process]

In the methods of JP 8-232187 A and JP 9-136969 A, it is necessary to use a liquid transfer pump as power for transporting a slurry containing reinforcing fibers and a thermoplastic resin when transporting the slurry and there was a problem that reinforcing fibers dispersed once in a dispersion vessel reflocculated due to a turbulent flow generated in the liquid transfer pump part and, as a result, the dispersion state of the reinforcing fibers in a papermaking base material got worse.

Moreover, in the methods of JP 8-232187 A and JP 9-136969 A, since a slurry containing reinforcing fibers and a thermoplastic resin is transported using a transport portion with a branched structure as a passage when transporting the slurry to a papermaking vessel, there was a problem that a turbulent flow was generated at a branch point of the branched structure and reinforcing fibers dispersed once in a dispersion liquid reflocculated, so that the dispersion state of the reinforcing fibers in a papermaking base material got worse.

Then, in the method for manufacturing a reinforcing fiber base material by a wet process in the present invention, it is preferable also to produce the product by the following method. That is, the method is a method for manufacturing a reinforcing fiber base material, the method comprising step (i-c) of charging a reinforcing fiber bundle to a dispersion medium, step (ii-c) of preparing a slurry in which reinforcing fibers forming the reinforcing fiber bundle are dispersed in the dispersion medium, step (iii-c) of transporting the slurry, and step (iv-c) of removing the dispersion medium from the slurry to produce a papermaking base material containing reinforcing fibers, wherein the steps (i-c) and (ii-c) are carried out in a dispersion vessel, the step (iv-c) is carried out in a papermaking vessel, the step (iii-c) is carried out in a transport portion that connects the dispersion vessel and the papermaking vessel, and the slurry is transported in a laminar flow state or in a transition region state from a laminar flow to a turbulent flow in the transport portion. According to this method for manufacturing a reinforcing fiber base material, by transporting a slurry in a laminar flow state or in a state of a transition region from a laminar flow to a turbulent flow, in a prescribed step of the manufacture process, reflocculation of reinforcing fibers is inhibited and a fiber-reinforced base with a superior dispersion state can be obtained. Henceforth, this method for manufacturing a reinforcing fiber base material is referred to as manufacturing method c.

In manufacture method c, in a transport portion of the step (iii-c), a slurry is transported in a laminar flow state or in a state of a transition region from a laminar flow to a turbulent flow. The laminar flow is a state that the slurry flowing in a transport portion flows in parallel with the tube axis of the passage of the transport portion. The turbulent flow is a state that the slurry flowing in a transport portion forms whirlpools of various sizes irregularly in the transport portion. The transition region from a laminar flow to a turbulent flow is a state that a laminar flow state and a turbulent flow state of the slurry flowing in a transport portion are mixed in the transport portion. If the slurry is transported in a laminar flow state or in a state of a transition region from a laminar flow to a turbulent flow in the transport portion, it is possible to transport a slurry that contains dispersed reinforcing fibers and that was obtained in a dispersion vessel to a papermaking vessel while maintaining the dispersion state of the reinforcing fibers, and reflocculation of the reinforcing fibers can be inhibited, and a fiber-reinforced base with superior dispersibility can be obtained. From the viewpoint of inhibiting the reflocculation of reinforcing fibers, it is preferable that a slurry be transported in a laminar flow state in a transport portion.

It is preferable that the flow rate of a slurry in the transport portion be from 0.01 to 10 m/s. It is preferable that the flow rate of the slurry be within this range because if so, the flow rate distribution in a passage of the transport portion is small and a slurry that contains dispersed reinforcing fibers and that is obtained in a dispersion vessel can be transported to a papermaking vessel while maintaining the dispersion state of the reinforcing fibers. The slurry flow rate of the transport portion can be determined from the following formula using the time T (second) taken for transporting 0.01 m³ of slurry, the amount of the slurry transported (0.01 m³), and the cross-sectional area S (m²) of the transport portion.

$$\text{Slurry flow rate (m/s)} = 0.01/(S \times T). \quad \text{(Formula)}$$

Figure 21:
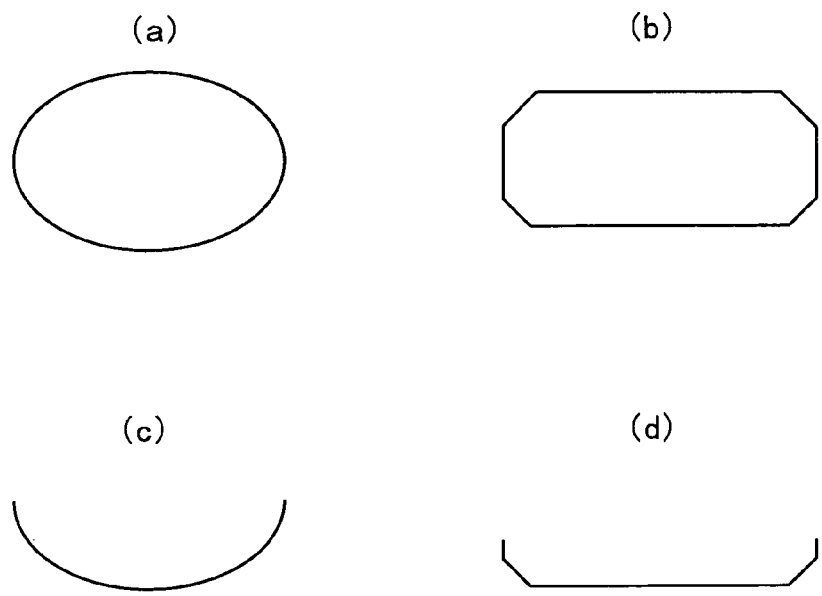
FIG. 21 is a schematic diagram illustrating one example of the sectional shape of a transport portion.

The cross-sectional shape of the transport portion, which is not particularly restricted, is preferably a circle or a polygon (triangle to decagon) from the viewpoint of preventing reflocculation of reinforcing fibers in the step (iii-c) of transporting the slurry to the step (iv-c), and examples include the cross-sectional shapes illustrated in FIG. 21(a) and FIG. 21(b). The cross-sectional shape of the transport portion also may be an open passage as illustrated in FIG. 21(c) or FIG. 21(d). Here, FIG. 21(a) through FIG. 21(d) are figures schematically illustrating the cross-sectional shape of the transport portion. From the viewpoint of contamination of foreign substances at the transport portion, the cross-sectional shape of the transport portion is more preferably a circle or a polygon.

From the viewpoint of preventing reflocculation of reinforcing fibers, the cross-sectional shape of the transport portion is preferably a regular shape so as not to generate a whirlpool in the passage of the transport portion. From the viewpoint of preventing the reflocculation of reinforcing fibers, it is preferable that the transport portion have, in its middle, no direction turning point, such as a curved portion and a bent portion, where whirlpools readily occur in the tube of the transport portion.

When the cross-sectional shape of a transport portion in the transport portion is a circular shape of a polygonal shape as illustrated in FIG. 21(a) and FIG. 21(b), the Reynolds number, which indicates the state of flow of a slurry, is preferably up to 4000, more preferably up to 3000, and even more preferably up to 2000 from the viewpoint of preventing the reflocculation of reinforcing fibers. When the cross-sectional shape of a transport portion in the transport portion is an open passage as illustrated in FIG. 403 and FIG. 404, the Reynolds number, which indicates the state of flow of a slurry, is preferably up to 500000, more preferably up to 300000, and even more preferably up to 100000 from the viewpoint of preventing the reflocculation of reinforcing fibers. Here, the Reynolds number Re in the transport portion was determined from the following formula by using a specific gravity $\rho$ (kg/m³) of a dispersion liquid, the maximum length L (m) of the cross-section of the transport portion, the slurry flow rate (m/s) at the transport portion, and the viscosity $\eta$ (Pa·s) of the dispersion medium.

$$Re = \rho L U / \eta. \quad \text{(Formula)}$$

Although the method for transporting a slurry in a laminar flow state or in a state of a transition region from a laminar flow to a turbulent flow, in the transport portion is not particularly restricted, examples thereof include a method in which a slurry is transported from a dispersion vessel to a papermaking vessel via a transport portion by using a potential energy by placing the dispersion vessel at a position higher than the papermaking vessel, and a method in which a slurry is transported from a dispersion vessel to a papermaking vessel via a transport portion by increasing the pressure in the dispersion vessel by injecting gas into the dispersion vessel containing the slurry. Such a transportation method failing to use a liquid transfer pump are preferable because they can reduce the generation of a turbulent flow in the transport portion, can prevent the reflocculation of reinforcing fibers, and can maintain the dispersibility of a slurry.

When it is necessary to transport a large amount of slurry from a dispersion vessel to a papermaking vessel while the slurry is in a laminar flow state or in a state of a transition region from a laminar flow to a turbulent flow by mounting a plurality of transport portions, it is permissible to increase the amount of the slurry to be transported from the dispersion vessel to the papermaking vessel by mounting a plurality of transport portions.

[Preform]

The preform of the present invention is a preform that contains, as a lamination unit, a prepreg in which at least a reinforcing fiber base material has been impregnated with a thermoplastic resin, wherein the prepreg has an average of two-dimensional orientation angles each formed by a reinforcing filament (a) contained in the prepreg and a reinforcing filament (b) that intersects the reinforcing filament (a) of from 10 to 80°, a thickness h0 (mm) at 23° C. of 0.03 to 1 mm, and a tensile strength σ of 0.01 MPa or more.

These constituents are explained below.

The preform of the present invention comprises at least two molding materials having been laminated and is to be subjected to a molding step directly or via a secondary processing step, and it means a state before being processed into a molded product. The secondary processing step is not particularly restricted, and examples thereof include a cutting step of cutting a preform into a prescribed size or shape, a bonding step of improving the handling performance of a preform by adhering prepregs together, a degassing step of removing air from a preform, and a surface treatment step of activating a preform by plasma treatment or the like.

It is important to use a prepreg in which at least a reinforcing fiber base material has been impregnated with a resin for the preform of the present invention from the viewpoint of the lightness and the mechanical properties of a molded product to be obtained. Moreover, from the viewpoint of the handling performance of a preform, it is important that the average of two-dimensional orientation angles each formed by a reinforcing filament (a) contained in the prepreg and a reinforcing filament (b) that intersects the reinforcing filament (a) is from 10 to 80°. Here, as to the two-dimensional orientation angle, the definition used in the explanation of the aforementioned prepreg can be applied. If the average of two-dimensional orientation angles is smaller than 10°, unidirectional reinforcing fibers or the like have no resistance to a stress of a direction that is perpendicular to the fiber longitudinal direction and a preform may rupture during a process of conveying or molding the preform at a high speed. If the average of two-dimensional orientation angles exceeds 80°, since reinforcing fibers stretch in two directions in a bidirectional reinforcing fiber fabric or the like, sufficient stretchability may not be obtained in a molding step and, therefore, molding may be achieved defectively or the quality of a molded product may be impaired. Moreover, in such a unidirectional reinforcing fiber or a bidirectional reinforcing fiber fabric, the gap between reinforcing fibers is small and, therefore, the penetration of a resin may become insufficient in a molding step and, as a result, the mechanical properties may lower. Furthermore, that the prepreg is closer to isotropic is preferred because if so, the labor in a lamination step will be reduced and the preform can be processed into a preform at a high speed and a reduced amount of loss of materials will be generated, so that an economic burden can be reduced. The two-dimensional orientation angle of the reinforcing fibers to be used in the present invention is preferably from 20 to 70°, more preferably from 30 to 60°, and it is better that the average is closer to 45°, which is the ideal angle.

From the viewpoint of the handling performance of the preform of the present invention, it is also important that the thickness h0 (mm) of a prepreg at 23° C. be from 0.03 to 1 mm. If h0 is less than 0.03 mm, the preform may rupture during a process of conveying or molding the preform at a high speed. If h0 exceeds 1 mm, the fiber orientation in the thickness direction becomes greater and a preform develops thickness expansion in a step of molding, so that the quality of a molded product may be impaired due to deformation or conveyance to a mold may be obstructed. The thickness h0 at 23° C. of the prepreg to be used in the present invention is preferably from 0.05 to 0.8 mm, and preferably from 0.1 to 0.6 mm.

From the viewpoint of the handling performance of the preform of the present invention, the tensile strength σ of the prepreg is 0.01 MPa or more, preferably 0.1 MPa or more, and more preferably 1 MPa or more. There are no particular limitations with respect to the upper limit of σ, but a general example thereof is 1000 MPa or less. If the tensile strength σ is less than 0.01 MPa, problems, such as rupture of a prepreg, may occur during operations of molding.

Although there are no particular restrictions with respect to the reinforcing fibers and the resin to constitute the prepregs to be used for the preform of the present invention, it is preferable to use the aforementioned prepreg (henceforth, referred to as prepreg (A)) from the viewpoint of obtaining a molded product that can satisfy moldability into a complicated shape and mechanical properties.

In the preform of the present invention, for the purpose of satisfying the specifications of a molded product to be obtained, it is preferable that a prepreg (A) constitute a plurality of lamination units and at least two kinds of prepregs (A) such that at least one factor among the factors of the prepregs is substantially different be used for the preform. Here, the respective factors of the aforementioned prepreg are explained.

The first factor is the volume ratio of reinforcing fibers. The elastic modulus, the strength, and the dimensional stability of a molded product to be obtained will be improved as the volume ratio of reinforcing fibers increases. On the other hand, the appearance quality of a molded product tends to deteriorate as the volume ratio of reinforcing fibers increases. Then, it is preferable, from the viewpoint of reconciling the lightness and the appearance quality of a molded product, to laminate a prepreg that is higher in reinforcing fiber proportion and a prepreg that is lower in reinforcing fiber proportion in combination. For example, there can be mentioned a method in which a prepreg that is higher in reinforcing fiber proportion is laminated outside and a prepreg that is lower in reinforcing fiber proportion is laminated inside for the purpose of increasing the rigidity of a molded product, and a method in which a prepreg that is lower in reinforcing fiber proportion is laminated further outside for the purpose of increasing the appearance quality of a molded product. Here, that the volume proportion of reinforcing fibers is substantially different means that the difference with respect to volume proportion between a prepreg that is higher in volume proportion of reinforcing fibers and a prepreg that is lower in volume proportion of reinforcing fibers is 5% by volume or more.

The next factor is the length of reinforcing fibers. The elastic modulus, the strength, and the dimensional stability of a molded product to be obtained will be improved as the length of reinforcing fibers increases. On the other hand, the handling performance of a preform or the appearance quality of a molded product tends to deteriorate as the length of reinforcing fibers becomes longer. Then, it is preferable, from the viewpoint of reconciling the handling performance of a preform and the mechanical properties and the appearance quality of a molded product, to laminate a prepreg that is larger in reinforcing fiber length and a prepreg that is smaller in reinforcing fiber length in combination. For example, there can be mentioned a method in which a prepreg that is larger in reinforcing fiber length is laminated outside and a prepreg that is smaller in reinforcing fiber length is laminated inside for the purpose of increasing the rigidity of a molded product, and a method in which a prepreg that is smaller in reinforcing fiber length is laminated further outside for the purpose of increasing the appearance quality of a molded product. That reinforcing fibers are substantially different in length means that the fiber length ratio of a longer reinforcing fiber and a shorter reinforcing fiber (the length of a longer reinforcing fiber)/(the length of a shorter reinforcing fiber) is 1.5 or more.

The next factor is the tensile modulus of reinforcing fibers. The elastic modulus of a molded product to be obtained increases as the tensile modulus becomes higher. On the other hand, the processability of fibers deteriorates as the tensile modulus becomes higher, and, as a result, the handling performance of a preform may deteriorate or it may become more disadvantageous with respect to economical efficiency. Then, it is preferable, from the viewpoint of reconciling the handling performance of a preform and the rigidity of a molded product, to laminate a prepreg that is higher in tensile modulus and a prepreg that is lower in tensile modulus in combination. For example, there can be mentioned a method in which a prepreg that is higher in tensile modulus containing carbon fibers or the like is laminated outside and a prepreg that is lower in tensile modulus containing glass fibers or the like is laminated inside for the purpose of reconciling the rigidity of a molded product and the economic efficiency, and a method in which a prepreg that uses carbon fibers higher in tensile modulus is laminated further outside and a prepreg that uses carbon fibers lower in tensile modulus is laminated inside. That reinforcing fibers are substantially different in tensile modulus means that the tensile modulus ratios of a tensile modulus of a reinforcing fiber with a higher tensile modulus and a reinforcing fiber with a lower tensile modulus (higher tensile modulus of a reinforcing fiber)/(lower tensile modulus of a reinforcing fiber) is 1.2 or more.

Next, the basis weight of a prepreg is explained. The larger the basis weight is, the thicker the prepreg tends to be and, therefore, the more the number of lamination or the labor for the lamination can be reduced. On the other hand, the larger the basis weight is, the more the followability to the thickness or the shape of a molded product lowers. Then, from the viewpoint of reconciling the handling performance or shape followability of a preform with an economical efficiency, it is preferable to laminate a prepreg with a larger basis weight and a prepreg with a smaller basis weight in combination. For the same reason, also as to the thickness of a prepreg, it is preferable to laminate a prepreg with a larger thickness $h0$ at 23° C. and a prepreg with a smaller $h0$ in combination. That the basis weight is substantially different means that the basis weight ratio of the prepreg with a basis weight and the prepreg with a smaller basis weight (i.e., (basis weight of the prepreg with a larger basis weight)/(basis weight of the prepreg with a smaller basis weight)) is 1.2 or more. That the thickness $h0$ at 23° C. is substantially different means that the $h0$ ratio of the prepreg with a larger $h0$ and the prepreg with a smaller $h0$ (i.e., ($h0$ of the prepreg with a larger $h0$)/($h0$ of the prepreg with a smaller $h0$)) is 1.2 or more.

From the viewpoint of moldability, it is preferable for the preform of the present invention that the interlayer shear strength between a prepreg and a lamination unit adjoining the prepreg be from 0 to 50 MPa, and more preferably from 0 to 40 MPa. If the interlayer shear strength is within a preferable range, it is possible to increase the shapability to an uneven form through stretching and shrinking of a preform accompanied by interlayer shift in a molding step. The interlayer shear strength of a preform can be measured by cutting a specimen from a preform and conducting a three-point bending test in accordance with ASTM-D-2344. When the preform has been adhered partially or sealed, measurement may be done by preparing a specimen so that the adhered portion or the sealed portion may be included.

Moreover, it is preferable for the preform of the present invention that a prepreg (A) and another lamination unit (B) have been laminate for the purpose of satisfying specifications of a molded product to be obtained. Here, a preferable embodiment of another lamination unit (B) is explained.

First, from the viewpoint of improving the reinforcing effect of a molded product to be obtained, it is preferable that the above-mentioned lamination unit (B) be a base material containing reinforcing fibers. In particular, continuous reinforcing fibers are preferred from the viewpoint of increasing the impact strength of a molded product. Examples of a form including a unidirectional base material, a textile base material, and a mat base material. On the other hand, discontinuous reinforcing fibers are preferred from the viewpoint of improving the shape followability of a molded product. Examples of a form include a unidirectional base material, i.e., a base material in which cut reinforcing fibers have been arranged in one direction, a mat base material, a sheet molding compound (SMC) base material, and an extruded sheet base material.

The reinforcing fibers to constitute this lamination unit (B) are not particularly restricted and can be selected in the same manner as the reinforcing fibers to constitute the aforementioned prepreg. In particular, from the viewpoint of weight reduction, carbon fibers of PAN type, pitch type, rayon type, or the like are preferably used because they are high in strength and specific rigidity. Moreover, from the viewpoint of increasing the handling performance of a preform, it is preferable that the lamination unit (B) have been impregnated with a thermoplastic resin or a thermosetting resin for the purpose of maintaining the form of the reinforcing fibers. Here, the thermoplastic resin and the thermosetting resin to be used are not particularly restricted and can be selected in the same manner as the thermoplastic resin and the thermosetting resin to constitute the aforementioned prepreg. There are not particular limitations with respect to the impregnation ratio of a resin, and like the aforementioned prepreg, it is preferably from 30 to 100% for the purpose of maintaining the form of the reinforcing fibers.

Next, from the viewpoint of securing a prescribed thickness in a molded product and keeping the thickness of a molded product uniform, a sheet-form base material is preferably used as the lamination unit (B). Moreover, from the viewpoint of increasing the stretchability of a preform and increasing the followability to an uneven shape, the use of a non-woven fabric base material is preferred. Furthermore, from the viewpoint of increasing the lightness of a molded product to be obtained, the use of a porous base material is preferred. Although there is no particular restriction as to the material to constitute these base materials, a thermoplastic resin to constitute the aforementioned prepreg is used more preferably from the viewpoint of processability to base materials. Like the thermoplastic resin to constitute the aforementioned prepreg, these thermoplastic resins may, if needed, contain an alloy component, a blended material, and an additive. Moreover, from the viewpoint of improving the lightness of a molded product to be obtained, the bulk density of the sheet-shaped base material, the nonwoven fabric base material or the porous base material is preferably from 0.01 to 1.0, more preferably from 0.05 to 0.9, and particularly preferably from 0.1 to 0.8.

From the viewpoint of easily performing the modification of the surface of a molded product to be obtained and impartation of functions, it is preferable to dispose a film made of resin as the aforementioned lamination unit (B) on the outermost layer of the preform. As to the resin, the use of a thermoplastic resin is preferred because processability to film or adhesiveness with a preform is simple and easy and the use of a thermosetting resin is preferred because it can improve the surface smoothness of a primer, a paint, or a gel coat. When a molded product to be obtained is used for an electronic instrument or the like, the flame retardancy of a film is preferably equal to or more than VTM-1, and more preferably equal to or more than VTM-0, provided in the UL-94 standard. The method for securing the flame retardancy of a film is not particularly restricted, and examples thereof include a method that comprises processing a highly flame retardant resin, such as PPS, PEI, PEEK and phenol resin, into a film, a method that comprises blending a highly flame retardant resin with a thermoplastic resin and then processing them into a film, and a method that comprises mixing a flame retardant with a thermoplastic resin and then processing them into a film.

Moreover, it is preferable to use, as the lamination unit (B), at least one selected from among a decorative, film, a transparent film, and a color tone film, from the viewpoint of improving the design of a molded product to be obtained. As the decorative film is preferred a film having on its surface a design and/or a geometric pattern. As the transparent film is preferred a film whose visible light transmittance is from 80 to 100%. As the color tone film is preferred a film containing an organic and/or inorganic pigment of a colorant. In addition, according to need, a gloss film, a print film, an antistatic film, a light shielding film, a heat-resistant film, and so on can be used as the lamination unit (B).

Other than the examples provided above, a metal plate, a metal foil, a metal mesh, a graphite sheet, a heat radiation sheet, a honeycomb material, a chemical-resistant film, a gas barrier film, a cold-resistant film, an antibacterial sheet and film, a foamed sheet, a rubber sheet, and the like may be used as other lamination units (B). Other lamination units (B) may be used singly or two or more of them may be used in combination, if needed.

An example of a preferable embodiment of a preform composed of the aforementioned prepreg (A) and another lamination unit (B) include a sandwich structure composed of a skin layer and a core layer.

Of such sandwich structures, a case that the skin layer has been constituted by the aforementioned prepreg (A) is preferred because a molded product to be obtained will exhibit isotropic properties and the followability to a complicated shape can be secured. In this case, from the viewpoint of further enhancing these effects, it is more preferable to use, as the core layer, a sheet-like base material, a porous base material, a honeycomb material, and a mat base material containing reinforcing fibers, which are lower in bulk density than the prepreg (A).

Of the sandwich structures, a case that the core layer is composed of the aforementioned prepreg (A) is preferable because the thickness of a molded product to be obtained can be rendered more uniform and impartation of functions can be secured easily. In this case, from the viewpoint of increasing the rigidity effect, it is more preferable to use, as the core layer, a unidirectional base material containing continuous reinforcing fibers, a textile base material, and so on. From the viewpoint of imparting functions to the surface of a molded product, it is more preferable to use a flame-retardant film, a decorative film, and so on.

Here, a molded product that is superior in mechanical properties and is in conformity with a complicated shape can be obtained also by a method in which a preform to be obtained by laminating reinforcing fiber base materials to be used for the prepreg of the present invention is set to a mold, and then RTM molding (resin transfer molding) is performed; and a method in which a preform to be obtained by laminating a reinforcing fiber base material to be used for the prepreg of the present invention with a unidirectional base material, a textile base material, or a mat base material is set to a mold, it is impregnated with a thermosetting resin, and RTM molding is performed. These can be expected to produce the same effect as that of the present invention.

Like the explanation of the handling performance of the prepreg described above, the preform of the present invention secures a stable workability in a lamination step, and from the viewpoint of the handling performance of a preform in a molding step such as stable transfer to a mold, it is preferable to inhibit thickness expansion. The hpn (mm) at (n×100)° C. preferably satisfies $hp0 \leq hpn \leq hp0 \times (2n+1)$ (hp0 (mm) represents the thickness of the preform at 23° C., and n represents at least one natural number selected from among 1, 2, 3 and 4), more preferably satisfies $hp0 \leq hpn \leq hp0 \times 2n$, and particularly preferably satisfies $hp0 \leq hpn \leq hp0 \times (2n-1)$. The selection criterion of n to be used here is the same as that of the prepreg described above, and a proper natural number can be selected depending upon the materials to be used.

Although the thickness hp0 (mm) of the preform of the present invention is not particularly limited, from the viewpoint of handling performance in molding it is preferably from 0.8 to 100 mm, more preferably from 1.2 to 10 mm, and particularly preferably from 1.5 to 5 mm. Although there is no particular limitations with respect to the laminated number of the prepregs to be used for the preform of the present invention and the laminated number of other lamination units, from the viewpoint of the manufacture efficiency and the economical efficiency in the lamination step, the laminated number is preferably from 2 layers to 100 layers, more preferably from 4 layers to 50 layers, and particularly preferably from 8 layers to 30 layers. If the laminated number is increased, the work load in the lamination step increases, but the degree of freedom in design of the molded product of the present invention can be increased if it is within a preferable range.

[Molded Product]

The molded product to be obtained by molding the prepreg or the preform of the present invention can be used for various parts or components, and it is preferable that the molded product be light in weight and also be superior in rigidity and strength in order to increase the range of it applications. Moreover, it is preferable that the molded product be superior also in the coefficient of linear expansion, which is an index of dimensional stability.

As a specific index, it is preferable that the molded product have a specific rigidity of from 1.5 to 5, which is a parameter indicating the degree of lightness and is expressed by $Ec^{1/3} \times \rho^{-1}$ where the flexural modulus and the specific gravity of the molded product are represented by Ec and ρ, respectively. Since steel and aluminum generally have a specific gravity of 1.5 or less, the specific rigidity of the molded product is preferably 1.5 or more in order to fall within a specific rigidity region that is better than that of those metal materials. Moreover, the specific rigidity is more preferably from 2.0 to 5, which exceeds 2.0 over a general specific strength of magnesium, and even more preferably is from 2.5 to 5. Furthermore, in order to make the design of a molded product easier, the specific rigidity preferably has isotropy; as an index of the isotropy of the specific rigidity, the flexural modulus Ec satisfies EcMax≦EcMin×2 in a relationship between a maximum flexural modulus EcMax and a minimum flexural modulus EcMin each in the direction of measurement. It is more preferable that EcMax≦EcMin×1.8, and even more preferable that EcMax≦EcMin×1.5.

As a specific index of the strength of a molded product, it is preferable that σc/ρ be from 100 to 500 where the tensile strength and the specific gravity of the molded product are represented by σc and ρ, respectively. The ratio is more preferably from 200 to 500 and more preferably from 300 to 500. For the same reason as that described as to the aforementioned specific rigidity, the aforementioned tensile strength σc, as an index of the isotropy of the tensile strength, satisfies σcMax≦σcMin×2 in a relationship between a maximum tensile strength σcMax and a minimum tensile strength σcMin each in the direction of measurement. It is more preferable that σcMax≦σcMin×1.8, and even more preferable that σcMax≦σcMin×1.5.

As a concrete index regarding the coefficient of linear expansion, which is a parameter that represents the dimensional stability of a molded product, the coefficient of linear expansion Cc of the aforementioned molded product is preferably from $1 \times 10^{-6}$ to $20 \times 10^{-5}$/K. It is more preferably from $1 \times 10^{-6}$ to $15 \times 10^{-5}$/K, and even more preferably from $1 \times 10^{-6}$ to $10 \times 10^{-5}$/K. For the same reason as that described as to the aforementioned specific rigidity, the aforementioned coefficient of linear expansion, as an index of the isotropy of the coefficient of linear expansion Cc, satisfies CcMax≦CcMin×2 in a relationship between a maximum coefficient of linear expansion CcMax and a minimum coefficient of linear expansion CcMin each in the direction of measurement. It is more preferable that CcMax≦CcMin×1.8, and even more preferable that CcMax≦CcMin×1.5.

In considering the wall thinness and the lightness, a molded product to be obtained by molding the prepreg or preform of the present invention preferably has a maximum thickness of 2 mm or less. The maximum thickness is more preferably 1.5 mm or less, and even more preferably 1.2 mm or less. The maximum thickness explained here means the largest thickness among the thicknesses of the respective flat portions constituting the molded product. The maximum thickness is determined by measuring the thickest part in a flat portion constituting the molded product.

A molded product may vary in thickness because of the degree of freedom in shape design. As to the thickness variation, it is preferable that the thickness vary continuously. The "continuously" as referred to herein means that the thickness varies taperingly.

Moreover, the molded product preferably has an uneven shape in order to enhance the effect of increasing the rigidity by its shape or to impart a design effect caused by its shape. Specifically, it is preferable that the level difference between the standard surface of the molded product and the uneven surface forming the uneven shape be 3 mm or more. The standard surface refers to a flat portion which has the largest area among the flat portions forming the molded product. The uneven surface forming an uneven shape with the standard surface is a flat portion that is substantially parallel to the standard surface and is formed to be separated from the standard surface by one or more flat portions. Here, "to be substantially parallel" means that the degree of an angle formed by the standard surface with a target flat portion is 20° or less. When the standard surface and the uneven surface are parallel to each other, the level difference between the standard surface and the uneven surface can be measured directly. However, when the standard surface and the uneven surface form together a certain angle, the largest difference among the level differences between the standard surface and respective points P on the uneven surface is defined as the level difference between the standard surface and the uneven surface. The level difference between the standard surface and the uneven surface is preferably 5 mm or more.

Considering various applications in addition to those described above, it is preferable to provide a complicated shape to a molded product. For example, when a box-like shape composed of many flat portions is formed, it is a shape in which flat portions have been joined by bent portions. The radius of curvature of the R portion at each of the bent portions, which is used for indicating the degree of bend, is preferably small. From the viewpoint of forming a more complicated shape, the radius of curvature of the R portion is preferably 5 mm or less.

From the viewpoint of forming a complicated shape in a molded product, it is preferable that the number of the bent portions be three or more. A bent shape of a simple molded product has one bent portion, and a C-shape and a simple S-shape each have two bent portions. Usually, most of the complicatedly shaped molded products such as components have many bent portions. An index of a preferred number of bent portions is three or more. A box-like molded product having a simple quadrangled shape has eight bent portions.

From the viewpoint of extending the application range of molded products to various cases, housings, and components from the shape aspect, a molded product preferably has a vertex that is formed by three flat portions separated by bent portions. The vertex that is formed by three flat portions separated by bent portions is a corner that is formed by three flat portions.

Furthermore, from the viewpoint of increasing rigidity, the molded product may be provided with a rib. Although the rib is not particularly restricted with respect to its shape, preferable examples of the rib include a linear rib, a T-shaped rib, and a cross-shaped rib. While the height of the rib will be determined according to need, it is preferably 10 mm or less from the viewpoint of the wall thinness of a molded product. It is more preferably 5 mm or less.

From the viewpoint of securing lightness, the molded product may be a hollow body. In this case, a hollow molded product may be formed by joining some molded products in conformity with the shape of the molded product.

For the purpose of imparting further enhanced mechanical properties to a molded product, the molded product may be united with another molded product. As such another molded product, a fiber-reinforced composite material comprising continuous reinforcing fibers and a resin preferably has been joined in order to enhance the mechanical properties. For example, it becomes possible to impart excellent mechanical properties or rigidity by joining a fiber-reinforced composite material resulting from hybridization of continuous reinforcing fibers with a thermosetting resin, such as epoxy resin, or a thermoplastic resin, such as polypropylene and polyamide, to the surface of a molded product.

It is also permissible to unite molded products to be obtained by molding the prepregs or preforms of the present invention. According to an intended purpose, an example is a product produced by uniting with a high strength while having increased the fiber mass content of another piece.

From the viewpoint of extending the applications of molded products, it is preferable to join complicatedly-shaped molded products. Examples of the complicatedly-shaped molded product include complicatedly-shaped injection molded products, such as edges, frames, bosses, ribs, hinges, and mounts. It is possible to extend applications in which superior mechanical properties of a molded product can be utilized.

The method for uniting is not particularly restricted, and examples thereof include methods using an adhesive, heat welding, vibration welding, ultrasonic welding, and laser welding. In particular, heat welding, vibration welding, ultrasonic welding, and laser welding are preferred because of the ease of the process and the short molding cycle.

Here, the type of the press molding can be selected depending upon the molded product to be obtained. Press molding is a method of obtaining a molded product by applying deformation, such as bend, shear and compression, to the aforementioned laminated preform by using a processing machine, a tool, a jig for molding, or a subsidiary material, and examples of a molding form include deep drawing, flanging, coalgating, edge curling, and die punching. Among various press molding methods, an autoclave method, which is often used for manufacturing molded components for huge airplanes and the like, and a mold pressing method, which has relatively simple and easy steps are preferably used as the method of press molding. From the viewpoint of the facility, the amount of energy to be used in a molding step, the simplification of the jig for molding, the subsidiary materials to be used, the degree of freedom in molding pressure and in molding temperature, the use of mold pressing method in which molding is conducted by using a metal mold is more preferred.

As a mold pressing method can be adopted a hot pressing method that comprises placing in advance the aforementioned prepreg or preform in a mold, performing pressurization and heating together with mold clamping, and cooling the prepreg or preform by cooling the mold while continuing the mold clamping, thereby obtaining a molded product, or when the resin of a prepreg or preform is a thermoplastic resin, stamping molding, which is a method that comprises heating in advance the prepreg or preform to a temperature that is equal to or higher than the melting temperature of the thermoplastic resin by a heating device, such as a far-infrared heater, a hot plate, a high-temperature oven and dielectric heating, placing it on a mold member that is to be a lower surface of the mold while keeping the thermoplastic resin molten and softened, then closing the mold to perform mold clamping, and then pressurizing and cooling. The press molding method, which is not particularly restricted, is preferably stamping molding from the viewpoint of accelerating the molding cycle to increase the manufacture efficiency.

Moreover, in order to bring a prepreg or a preform into a shapeable state, the resin is preferably a thermoplastic resin. The preheating temperature is preferably adjusted to equal to or higher than the melting point or softening point of the thermoplastic resin.

In conveying the preheated prepreg or preform to a mold to be used for press molding, it is preferable to convey it quickly in order to perform press molding while keeping the preheated state sufficiently. Specifically, the time to be taken for preheating a prepreg or a preform, then conveying it to a mold, and starting pressurization by press molding is preferably within 1 minute, more preferably within 30 seconds, and even more preferably within 15 seconds.

The pressurization in a press mold is not particularly restricted, but from the viewpoint of shaping a prepreg or a preform well, the pressurizing force is preferably 0.1 MPa or more. It is more preferably 1 MPa or more, and even more preferably 10 MPa or more. Although the upper limit of the pressurizing force is not particularly limited, 100 MPa or less is a preferable range from the viewpoint of inhibiting the breakage of reinforcing fibers during molding.

There are no particular limitations as to the cooling in a press mold, but when a thermoplastic resin is used as the resin constituting a prepreg or a preform, it is preferable to adjust the surface temperature of the mold to equal to or lower than the melting point or softening point of the thermoplastic resin from the viewpoint of cooling the preheated preform sufficiently. Moreover, from the viewpoint of advancing the release from the mold and shortening the molding cycle, it is preferable to adjust the mold temperature to be lower than the melting point or softening point of the thermoplastic resin by 30° C. or more, more preferably by 50° C. or more.

Next, a step of placing the prepreg or preform of the present invention in a mold and press molding it is described. For the prepreg or preform of the present invention, it is preferable to place it in the mold while adjusting the charge ratio expressed by the following formula to higher than 100%.

Charge ratio (%)=100×(area of prepreg or preform)/ (total area of mold cavity).

By placing, in the mold, a prepreg or preform having a charge ratio that is higher than 100%, in other words, a prepreg or preform that is larger than a size to cover the whole area of the mold cavity, it becomes possible to do molding while keeping fiber orientation without causing excessive flow of the prepreg or preform during molding. Therefore, it is possible to obtain a molded product that makes the most of the fiber orientation of a prepreg or preform while inhibiting, as much as possible, disturbance of fiber orientation during molding or generation of anisotropy in fiber orientation caused by the flow occurring during molding. The charge ratio is adjusted preferably to 105% or more and more preferably to 110% or more. The upper limit of the charge ratio, which is not particularly limited, is preferably up to 150% from the viewpoint of using materials effectively and avoiding waste.

Next, the mold to be used for molding is explained. Molds are classified roughly into two categories; one is a closed mold, which is to be used for casting, injection molding, etc., and another is an open mold, which is to be used for press molding, forging, etc. The closed mold is a mold that performs molding mainly by pouring a material to the inside thereof, whereas the open mold is a mold that performs molding mainly by deforming a material without pouring it. The use of an open mold is preferred in order to obtain a molded product with which the fiber orientation of a prepreg or preform is harnessed while inhibiting the fiber orientation of the prepreg or preform as much as possible from falling into disorder during molding or inhibiting the anisotropy in the fiber orientation as much as possible from being caused by the flow that occurs during the molding without causing excessive flow in a base material during the molding. Moreover, the open mold is preferred also from the viewpoint of removing the gas decomposed or the air entrained during the molding to the outside of the mold.

Furthermore, preferred is a mold that has at least one selected from among a stamping-out mechanism, a punching mechanism, and a tapping mechanism. The molded product produced by press molding may have been press formed with a charge percentage of a prepreg or preform of greater than 100% relative to the total cavity area of the mold or may have both a portion that is necessary as a molded product and an unnecessary portion (edge portion). Therefore, a step of removing the edge portion may become necessary in order to finish the shape of a molded product after molding. A molded product is expected to be processed, depending upon the purpose of the usage thereof, into a molded product having a vent hole or an exhaust hole for generated gas or heat exchange, a grip portion of a molded product, a screwhole for processing or a hole for bolt connection, a hole aiming at imparting design, or a hole portion to be used for punch patterns. It is preferable to have at least one selected from among the aforementioned three mechanisms because if so, a step of removing an edge portion after press molding or a step of forming a necessary hole portion can be performed simultaneously with press molding, so that simplification of a process can be achieved.

Examples of the applications of molded products to be produced by using the prepreg or preform of the present invention include electric instrument components, electronic instrument components, components for civil engineering, components for building materials, structural components for cars, structural components for motorcycles, components for cars, components for motorcycles, and components for airplanes. From the viewpoint of mechanical properties, the molded products are suitably used for housings of electric or electronic instruments, panels for civil engineering or building materials, structural components of cars, and components of airplanes. Particularly from the viewpoint of physical characteristics and isotropy, the molded products are suitably used for structural units for cars and motorcycles.

EXAMPLES

The present invention will be described below in more detail with reference to Examples.

[Evaluation (1) of Prepreg, Preform, and Molded Product]

(1) Evaluation of the Length of Reinforcing Fibers Contained in Prepreg

A prepreg was heated at 500° C. in the air for one hour, thereby burning off a resin component. Four hundred remaining reinforcing fibers were selected at random, the length thereof was measured down to 1 μm, and then the fiber lengths and the proportions thereof were measured. Moreover, the reinforcing fiber length distribution was evaluated by counting the frequency of reinforcing fibers at 0.25 mm intervals, such as shorter than 0.25 mm, 0.25 mm or longer and shorter than 0.5 mm, and 0.5 mm or longer and shorter than 0.75 mm.

Figure 2:
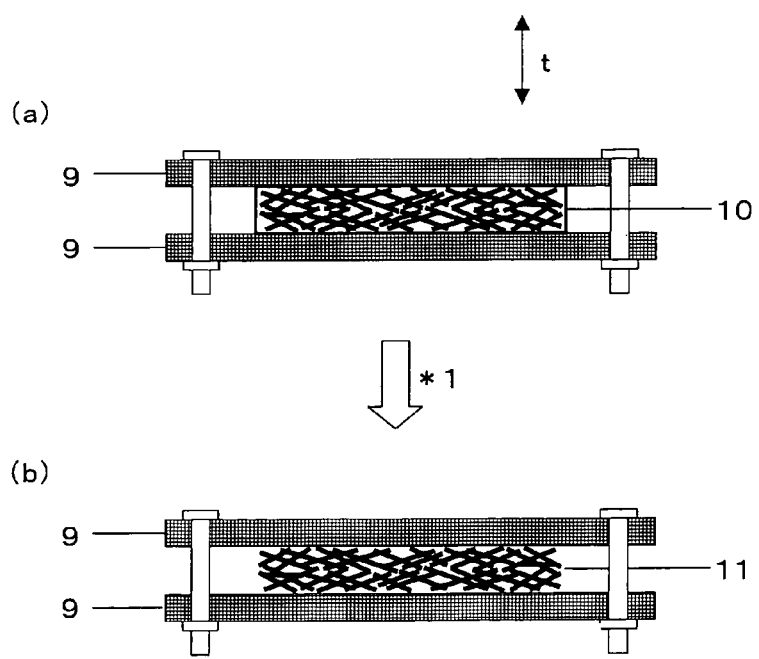
FIG. 2 is a schematic diagram illustrating one example of a burning jig for measuring the two-dimensional orientation angle of a prepreg.

(2) Measurement of the Two-Dimensional Orientation Angle of Reinforcing Fibers in Prepreg As depicted in FIG. 2, a prepreg was sandwiched between two sheets of stainless steel mesh (plain woven shape with 50 meshes per 2.5 cm) and they were fixed with adjustment of a screw so that the prepreg might not move. This was heated at 500° C. in the air for one hour, thereby burning off a resin component. Then, the stainless steel mesh sheets were removed and the resulting reinforcing fiber base material was observed with a microscope. One reinforcing filament (a) was selected at random, and the two-dimensional orientation angle formed by the reinforcing filament and another one intersecting therewith was measured by image observation. Of two angles formed by the two intersecting reinforcing filaments, an angle of 0° or more and 90° or less (i.e., an acute angle) was adopted as the orientation angle. The number of measurement of the two-dimensional orientation angle for one reinforcing filament (a) selected was n=20. The same measurement was conducted by selecting five reinforcing filaments in total and the average of the measurements was defined as the two-dimensional orientation angle.

(3) Amount of Air of Reinforcing Fiber Base Material (Frazier Method)

Using a reinforcing fiber base material obtained in the same manner as that in the burning off of (2) described above, the amount of air measured by the Frazier type method based on ASTM D737 (2008 edition) was measured.

(4) Fiber Mass Content Wf (%) of Reinforcing Fibers in Prepreg

After the mass W1 of a prepreg was measured, the prepreg was heated at 500° C. in the air for one hour, so that resin components were burned off. The mass W2 of the remaining reinforcing fibers was measured, and calculation was conducted by the following formula:

$$Wf(\%)=100 \times W2/W1.$$

(5) Thickness hn of Prepreg, and Thickness hpn of Preform (hn, hpn (n=0, 1, 2, 3, 4))

A prepreg or a preform was left at rest in the air for 10 minutes at a temperature at which measurement would be conducted, and then it was cooled to room temperature. In the prepreg or the preform, two point X and Y were determined so that the straight distance XY would become the longest, the thickness was measured at each of the dividing points which divided the straight line XY into ten equal segments except both ends X, Y. The average thereof was defined as the thickness hn or hpn of the prepreg or the preform.

(6) Bulk Density of Prepreg

A square prepreg of 100 mm on each side was cut out and its mass W was measured. Then, a bulk density was calculated from the following formula:

Bulk density of prepreg=$W/(10 \times 10 \times h0)$ where $h0$ is the thickness of the prepreg.

(7) Resin Impregnation Ratio % of Prepreg

A resin impregnation ratio of a prepreg was measured by observing a section in the thickness direction of the prepreg as follows. The prepreg was wrapped with an epoxy resin, and then a surface which was a sectional end of the prepreg was polished. An area defined by (the thickness of the prepreg)×a width of 500 μm of the polished surface was photographed at a magnification of 400 by the use of a super-deep color 3D profile measurement microscope VK-9500 (controller)/VK-9510 (measuring part) (manufactured by KEYENCE Corporation). In an observed image, the area of sites where the resin had penetrated and the area of sites where the resin had not penetrated were determined, and then a resin impregnation ratio was calculated by using the following formula:

Resin impregnation ratio (%)=100×(the total area of sites where the resin has penetrated)/(the cross sectional area of the observed site of the prepreg exclusive of reinforcing fiber portions)=100×(the area of sites where the resin has penetrated)/((the area of (the thickness of the prepreg)×(a width of 500 μm)−the area of reinforcing fiber portions).

(8) Tensile Strength σ of Prepreg

Specimens were cut from a prepreg, and the tensile characteristic thereof was measured in accordance with the ISO 527-3 method (1995). Regarding the specimens, specimens which had been cut in four directions, i.e., 0°, which was an arbitrary direction, +45°, −45°, and 90° directions, were prepared, and an average value of all measurements (n=20) obtained at the number of measurements n=5 for each of the directions was defined as a tensile strength σ. As a measuring instrument was used "Instron (registered trademark)" 5565 type universal testing instrument (manufactured by Instron Japan Company, Ltd.).

(9) Tensile Strength σMax, σMin

Among the 20 measurements of tensile strength σ measured in the above (8), the maximum value and the minimum value were expressed by σMax and σMin, respectively.

(10) Specific Strength of Molded Product

A specimen was cut from of a molded product and the specific gravity ρ of the molded product was measured on the basis of ISO 1183 (1987). Subsequently, specimens were cut from the molded product and the tensile strength thereof was measured in accordance with the ISO 527-3 method (1995). Regarding the specimen, specimens were prepared which had been cut in four directions, i.e., 0°, +45°, −45°, and 90° directions, where an arbitrary direction was determined as 0°. Then, an average value of all measurements (n=20) obtained at the number of measurements n=5 for each of the directions was defined as a tensile strength σc. As a measuring instrument was used "Instron (registered trademark)" 5565 type universal testing instrument (manufactured by Instron Japan Company, Ltd.). On the basis of the result obtained, the specific strength of the molded product was calculated by the following formula.

$$\text{Specific strength of molded product} = \sigma c/\rho.$$

(11) σcMax and σcMin of the Tensile Strength of Molded Product

Among 20 tensile strengths σc measured in (10) described above, the maximum value was expressed by σcMax and the minimum value was expressed by σcMin.

(12) Specific Rigidity of Molded Product

Specimens were cut from a prepreg, and then the flexural moduli thereof were measured in accordance with the ISO 178 method (1993). Regarding the specimen, specimens were prepared which had been cut in four directions, i.e., 0°, +45°, −45°, and 90° directions, where an arbitrary direction was determined as 0°. Then, an average value of all measurements (n=20) obtained at the number of measurements n=5 for each of the directions was defined as a flexural modulus Ec. As a measuring instrument was used "Instron (registered trademark)" 5565 type universal testing instrument (manufactured by Instron Japan Company, Ltd.). On the basis of the result obtained, the specific rigidity of the molded product was calculated by the following formula.

$$\text{Specific rigidity of molded product} = Ec^{1/3}/\rho$$

ρ: Specific gravity of molded product.

(13) EcMax and Ecmin of the Flexural Modulus of Molded Product

Among 20 flexural moduli measured in (12) described above, the maximum value was expressed by EcMax and the minimum value was expressed by EcMin.

(14) Interlaminar Shear Strength of Laminated Perform

Specimens were cut from a laminated preform, so that specimens of 6.4 mm in width and 14 mm in length were produced in accordance with ASTM D2344, and then a three-point test was performed at n=10 to measure interlaminar shear strength. The average of n=10 was adopted as a result.

(15) Coefficient of Linear Expansion of Molded Product

Specimens were cut from of a molded product and the coefficient of linear expansion thereof was measured on the basis of ISO 11359-2. Regarding the specimens, specimens which had been cut in four directions, i.e., 0°, which was an arbitrary direction, +45°, −45°, and 90° directions, were prepared, and an average value obtained at the number of measurements n=5 for each of the directions was defined as a coefficient of linear expansion Cc.

(16) CcMax and CcMin of the Coefficient of Linear Expansion of Molded Product

Among the coefficients of linear expansion measured in all four directions of 0°, +45°, −45°, and 90° in the molded product to measure, the maximum value is expressed by CcMax and the minimum value is expressed by CcMin.

(17) Judgment of the Specific Strength of Molded Product

Judgment was done according to the following criteria on the basis of the coefficient of linear expansion of a molded product.

A: The specific strength was 300 MPa or more.

B: The specific strength was 200 MPa or more and less than 300 MPa.

C: The specific strength was 150 MPa or more and less than 200 MPa.

D: The specific strength was less than 150 MPa.

(18) Judgment of the Specific Rigidity of Molded Product

Judgment was done according to the following criteria on the basis of the specific rigidity of a molded product.

AAA: The specific rigidity was 3.00 or more.

AA: The specific rigidity was 2.50 or more and less than 3.00.

A: The specific rigidity was 2.20 or more and less than 2.50.

B: The specific rigidity was 2.00 or more and less than 2.20.

A: The specific rigidity was 1.50 or more and less than 2.00.

D: The specific rigidity was less than 1.50.

(19) Judgment of the Coefficient of Linear Expansion of Molded Product

Judgment was done according to the following criteria on the basis of a coefficient of linear expansion of a molded product.

A: The coefficient of linear expansion was $7 \times 10^{-6}$/K or less.

B: The coefficient of linear expansion was more than $7 \times 10^{-6}$/K and $10 \times 10^{-6}$/K or less.

C: The coefficient of linear expansion was more than $10 \times 10^{-6}$/K and $20 \times 10^{-6}$/K or less.

D: The coefficient of linear expansion was more than $20 \times 10^{-6}$/K.

(20) Judgment of the Isotropy of Molded Product

Judgment was done according to the following criteria on the basis of the in-plane variation of the respective properties, i.e., tensile strength, flexural modulus, and coefficient of linear expansion of a molded product.

AA: The maximum was not smaller than 1.0 time and not larger than 1.1 times the minimum.

A: The maximum was larger than 1.1 times and not larger than 1.3 times the minimum.

B: The maximum was larger than 1.3 times and not larger than 2 times the minimum.

D: The maximum was larger than 2 times the minimum.

(Material 1) Carbon Fiber 1

A copolymer containing polyacrylonitrile as a main component was subjected to spinning, a baking treatment, and a surface oxidation treatment, yielding continuous carbon fibers having a total number of filaments of 12,000. The properties of this continuous carbon fiber were as follows.

Filament diameter: 7 μm

Mass per unit length: 1.6 g/m

Specific gravity: 1.8

Tensile strength: 4600 MPa

Tensile modulus: 220 GPa.

(Material 2) Carbon Fiber 2

A copolymer containing polyacrylonitrile as a main component was subjected to spinning, a baking treatment, and a surface oxidation treatment, yielding continuous carbon fibers having a total number of filaments of 12,000. The properties of this continuous carbon fiber were as follows.

Filament diameter: 7 μM

Mass per unit length: 1.6 g/m

Specific gravity: 1.8

Figure 7:
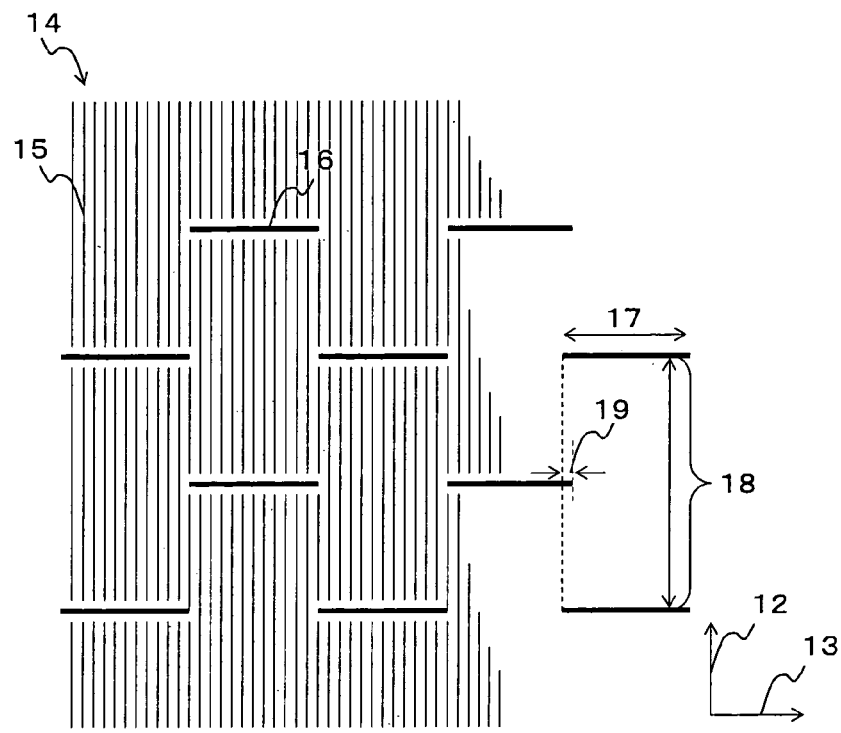
FIG. 7 is a schematic diagram of a cut-in carbon fiber prepreg.

Tensile strength: 4100 MPa
Tensile modulus: 420 GPa.
(Material 3) Carbon Fiber 3
TORAYCA T700S-12-50C, produced by Toray Industries, Inc.
(Material 4) Glass Fiber
Commercial name PF-E001, produced by Nitto Boseki Co., Ltd.
(Material 5) Glass Fiber-Reinforced Thermoplastic Resin (GMT)
UNISHEET P4038-BK31 produced by Quadrant. The thickness was 3.8 mm.
(Material 6) PP Resin Sheet
A resin sheet having a thickness of 1 mm was produced which was composed of 50% by mass of an unmodified polypropylene resin ("Prime Polypro" J105G, produced by Prime Polymer Co., Ltd.) and 50% by mass of an acid-modified polypropylene resin ("ADMER" QB510, produced by Mitsui Chemicals, Inc.).
(Material 7) Foamed PP Resin Sheet
Commercial name: EFCELL (two-time expansion, 1 mm in thickness), produced by Furukawa Electric Co., Ltd.
(Material 8) Transparent Nylon Resin Film
A transparent nylon resin film (transparent Ny, 50 μm in thickness) made of Crystamid MS1100, produced by Tokyo Zairyo Co., Ltd., was produced.
(Material 9) Nylon Resin Flame-Retardant-Film
A Nylon 6 resin flame-retardant film (flame-retardant Ny, 50 μm in thickness) was obtained by mixing 10 parts by mass of Novaled 120 (average particle diameter: 25 μm, phosphorus content: 85%) produced by Rinkagaku Kogyo Co., Ltd., to 100 parts by mass of CM1007 (Nylon 6 resin) produced by Toray Industries, Inc., followed by kneading. The flame retardancy of this film was UL94 and VTM-0.
(Material 10) Continuous Carbon Fiber Prepreg
TORAYCA PREPREG P3052S-12 produced by Toray Industries, Inc.
(Material 11) Carbon Fiber Sheet Molding Compound (SMC)
Material 3, that is, TORAYCA T700S-12K-50C was cut into a length of 25 mm, and the cut carbon fiber bundle was spread so that the carbon fiber bundle might distribute in random directions. Thus, a carbon-fiber-bundle-randomly-oriented base material was produced. Then, a carbon fiber sheet molding compound base material (SMC) was produced by impregnating 60 parts by mass of the carbon-fiber-bundle-randomly-oriented base material with 40 parts by mass of the following vinyl ester resin for carbon fiber sheet molding compounds. The thickness was 2 mm.
Vinyl ester resin: a product containing Ripoxy H600 that was produced by Showa Highpolymer Co., Ltd., as a matrix resin and that was obtained by mixing, to 100 parts by mass of the vinylester resin, 1.0 part by mass of an organic peroxide curing agent (PERBUTYL Z produced by Nippon Oil & Fats Co., Ltd.), 0.6 parts by mass of a polymerization inhibitor (TBH produced by Seiko Chemical Co., Ltd.), 13.0 parts by mass of a thickener (I-143L, produced by The Dow Chemical Co., Ltd.), and 5.0 parts by mass of an internal release agent (ZNS-P produced by ADEKA FINE).
(Material 12) Carbon Fiber Prepreg with Cut
A cut-in carbon fiber prepreg having regular cuts provided at equal intervals was obtained by successively forming cuts illustrated in FIG. 7 into a TORAYCA PREPREG P3052S-17 produced by Toray Industries, Inc., by the use of an automatic cutting machine. The cutting direction is a direction 13 perpendicular to fibers, the length 17 of each cut is 5.1 mm, and the interval 18 (fiber length) is 30 mm. 19, over which cuts of adjacent lines overlap with each other, is 0.1 mm.
(Material 13) Epoxy Resin 1
A blend of 40 parts by mass of EPOTOHTO YD128 (produced by Tohto Kasei Co., Ltd.), 20 parts by mass of EPOTOHTO YD128G (produced by Tohto Kasei Co.; Ltd.), 20 parts by mass of EPICOAT 1001 (produced by Japan Epoxy Resins Co., Ltd.), and 20 parts by mass of EPICOAT 1009 (produced by Japan Epoxy Resins Co., Ltd.) as epoxy resins, 4 parts by mass of DICY7 (dicyandiamide, produced by Japan Epoxy Resins Co., Ltd.) and 3 parts by mass of DCMU99 (3-(3,4-dichlorophenyl)-1,1-dimethylurea, produced by Hodogaya Chemical Co., Ltd.) as curing agents, and 5 parts by mass of VINYLEC K (polyvinyl formal, produced by Chisso Corp.) as an additive. The glass transition temperature of an uncured resin is 3° C. The viscosity at 60° C. is 200 Pa·s.
(Material 14) Epoxy Resin 2
A blend of 70 parts by mass of EPOTOHTO YD128 (produced by Tohto Kasei Co., Ltd.), 30 parts by mass of EPICOAT 1009 (produced by Japan Epoxy Resins Co., Ltd.) as epoxy resins, 4 parts by mass of DICY7 (dicyandiamide, produced by Japan Epoxy Resins Co., Ltd.) and 3 parts by mass of DCMU99 (3-(3,4-dichlorophenyl)-1,1-dimethylurea, produced by Hodogaya Chemical Co., Ltd.) as curing agents, and 5 parts by mass of VINYLEC K (polyvinyl formal, produced by Chisso Corp.) as an additive. The viscosity when the glass transition temperature of an uncured resin is 60° C. is 600 Pa·s.
(Material 15) Chopped Fiber of Nylon 6 Resin
A Nylon 6 resin fiber (filament fineness: 3 dtex) obtained by spinning CM1007 (Nylon 6 resin) produced by Toray Industries, Inc., was cut into 5.0 mm with a cartridge cutter, so that a Nylon 6 resin chopped fiber was obtained.

Example 1

The carbon fiber 1 obtained in Material 1 was cut into 6 mm with a cartridge cutter, so that chopped carbon fiber was obtained. A dispersion liquid with a concentration of 0.1% by mass composed of water and a surfactant (polyoxyethylene lauryl ether (commercial name), produced by Nacalai Tesque, Inc.) was prepared. A carbon fiber base material was produced using the apparatus for manufacturing a reinforcing fiber base material (papermaking base material) of FIG. 3 and using this dispersion liquid and the aforementioned chopped carbon fiber. The manufacture apparatus is composed of a dispersion vessel 21, a papermaking vessel 22, and a conveyor 32. The dispersion vessel 21 is a container in a cylindrical form of 1000 mm in diameter and has a straight transport portion (the inclination angle is 30°) with an opening cock at a lower portion of the container. The transport portion connects the dispersion vessel and the papermaking vessel. A stirrer is mounted to the upper opening of the dispersion vessel, and chopped carbon fibers and a dispersion liquid (dispersion medium) can be charged through the opening. The papermaking vessel has, at its bottom, a mesh conveyor with a papermaking surface having a width of 500 mm. The conveyor 32 is disposed following a mesh conveyor 31 and conveys a carbon fiber base material 30. Papermaking was performed while adjusting the carbon fiber concentration in the dispersion liquid to be 0.05% by mass. The carbon fiber base material prepared by papermaking was dried in a drying oven of 200° C. for 30 minutes. The resulting carbon fiber base material had a width of 500 mm, a length of 500 mm, and a basis weight of 50 g/m². The properties of the reinforcing fiber base material are shown in Table 1.

One sheet of the above-mentioned carbon fiber base material was laminated with two films of CM1007 (Nylon 6 resin) of the same thickness so that it might become film/carbon fiber base material/film. A pressure of 5 MPa was added to the resulting laminated article at a temperature of 250° C. for two minutes to prepare a prepreg (1) of 500 mm in width and 500 mm in length in which the Nylon 6 resin had been penetrated into the carbon fiber base material were produced. The properties of the prepreg are shown in Table 2.

Figure 4:
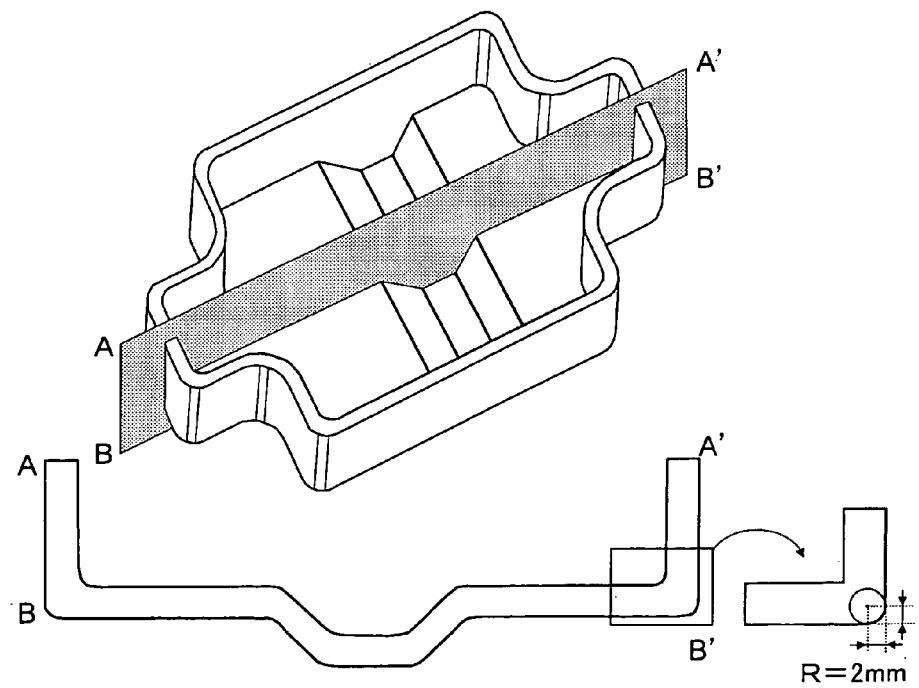
FIG. 4 is a schematic diagram illustrating one example of a box-shaped product that is obtainable by the use of the prepreg and the preform of the present invention.

A preform (A) in which eight prepregs (1) had been laminated was prepared and then preheated at 280° C. under a nitrogen atmosphere in a far-infrared heating oven. The preform (A) was placed in a stamping mold whose cavity surface temperature was 120° C. and which had an L-shaped box-like cavity of the B5 size illustrated in FIG. 4 having a thickness of 1.1 mm (the charge ratio was 110%). Then, the mold was closed, and a pressure was added at a molding pressure of 30 MPa and held for two minutes. Then, the mold member was opened and ejection was performed, so that an L-shaped box-like molded product was obtained. The preform (A) was shaped well in conformity with the shape of, the mold and a molded product that was high in shape quality was obtained. The properties of the molded product are shown in Table 3 and Table 10.

Example 2

A prepreg (2) was produced in the same manner as in Example 1 except that the Nylon 6 resin with which the carbon fiber base material was to be impregnated was adjusted so that the fiber mass content might become 52%. The properties of the prepreg are shown in Table 2. An L-shaped box-like molded product was produced in the same manner as in Example 1 except for manufacturing a preform in which seventeen prepregs (2) had been laminated. The preform was shaped well in conformity with the shape of the mold and a molded product that was high in shape quality was obtained. The properties of the molded product are shown in Table 3.

Example 3

A carbon fiber base material was produced in the same manner as in Example 1 except for adjusting the basis weight of the carbon fiber base material to 70 g/m² by adjusting the flow rate of the dispersion liquid and the speed of the mesh conveyer during papermaking. The properties of the reinforcing fiber base material are shown in Table 1. The Nylon 6 resin film with which this carbon fiber base material was to be impregnated was adjusted so that the fiber mass content might become 65% and a pressure of 5 MPa was applied at a temperature of 270° C. for three minutes, so that a prepreg (3) in which the carbon fiber base material had been impregnated with the Nylon 6 resin was produced. Since the fiber mass content was high, the impregnation with the resin became a little difficult. The properties of the prepreg are shown in Table 2. An L-shaped box-like molded product was produced in the same manner as in Example 1 except for manufacturing a preform in which seventeen prepregs (3) had been laminated. The preform was shaped well in conformity with the shape of the mold and a molded product that was high in shape quality was obtained. The properties of the molded product are shown in Table 3.

Example 4

A prepreg (4) was produced in the same manner as in Example 1 except that the Nylon 6 resin film with which the carbon fiber base material was to be impregnated was adjusted so that the fiber mass content might become 15%. The properties of the prepreg are shown in Table 2. An L-shaped box-like molded product was produced in the same manner as in Example 1 except for manufacturing a preform in which four prepregs (4) had been laminated. The preform was shaped well in conformity with the shape of the mold and a molded product that was high in shape quality was obtained. The properties of the molded product are shown in Table 3.

Example 5

A prepreg (5) was produced in the same manner as in Example 1 except that the Nylon 6 resin film with which the carbon fiber base material was to be impregnated was adjusted so that the fiber mass content might become 8%. The properties of the prepreg are shown in Table 2. An L-shaped box-like molded product was produced in the same manner as in Example 1 except for manufacturing a preform in which two prepregs (5) had been laminated. The preform was shaped well in conformity with the shape of the mold and a molded product that was high in shape quality was obtained. The properties of the molded product are shown in Table 3.

Example 6

A carbon fiber base material was produced in the same manner as in Example 1 except for adjusting the speed of the mesh conveyer at the time of papermaking to four times the flow rate of the dispersion liquid. The properties of the reinforcing fiber base material are shown in Table 1. Using the resulting carbon fiber base material, a prepreg (6) which the Nylon 6 resin had penetrated was produced in the same manner as in Example 1. The properties of the prepreg are shown in Table 2. An L-shaped box-liked molded product was produced in the same manner as in Example 1 except for using the prepreg (6). The preform was shaped well in conformity with the shape of the mold and a molded product that was high in shape quality was obtained. The properties of the molded product are shown in Table 3.

Example 7

A carbon fiber base material was produced in the same manner as in Example 1 except for adjusting the basis weight of the carbon fiber base material to 20 g/m² by adjusting the flow rate of the dispersion liquid and the speed of the mesh conveyer during papermaking. The properties of the reinforcing fiber base material are shown in Table 1. The Nylon 6 resin film with which this carbon fiber base material was to be impregnated was adjusted so that the fiber mass content might become 20% and a pressure of 5 MPa was applied at a temperature of 250° C. for two minutes, so that a prepreg (7) in which the carbon fiber base material had been impregnated with the Nylon 6 resin was produced. The properties of the prepreg are shown in Table 2. An L-shaped box-like molded product was produced in the same manner as in Example 1 except for manufacturing a preform in which eight prepregs (7) had been laminated and using a stamping mold that had a cavity with a thickness of 0.4 mm in the same shape as that illustrated in FIG. 4 (L-shaped box-like form of the B5 size). The preform was shaped well in conformity with the shape of the mold and a molded product that was high in shape quality was obtained. The properties of the molded product are shown in Table 3.

Example 8

A carbon fiber base material was produced in the same manner as in Example 1 except for adjusting the basis weight of the carbon fiber base material to 10 g/m² by adjusting the flow rate of the dispersion liquid and the speed of the mesh conveyer during papermaking. The properties of the reinforcing fiber base material are shown in Table 4. The Nylon 6 resin film with which this carbon fiber base material was to be impregnated was adjusted so that the fiber mass content might become 20% and a pressure of 5 MPa was applied at a temperature of 250° C. for two minutes, so that a prepreg (8) in which the carbon fiber base material had been impregnated with the Nylon 6 resin was produced. The properties of the prepreg are shown in Table 5. An L-shaped box-like molded product was produced in the same manner as in Example 7 except for manufacturing a preform in which sixteen prepregs (8) had been laminated. Since the prepregs (8) were very thin, the number of the laminated prepregs was large and therefore much time was taken for lamination, but the preform was shaped well in conformity with the shape of the mold and a molded product that was high in shape quality was obtained. The properties of the molded product are shown in Table 6.

Example 9

A carbon fiber base material was produced in the same manner as in Example 1 except for adjusting the basis weight of the carbon fiber base material to 200 g/m² by adjusting the flow rate of the dispersion liquid and, the speed of the mesh conveyer during papermaking. The properties of the reinforcing fiber base material are shown in Table 4. The Nylon 6 resin film with which this carbon fiber base material was to be impregnated was adjusted so that the fiber mass content might become 20% and a pressure of 5 MPa was applied at a temperature of 250° C. for two minutes, so that a prepreg (9) in which the carbon fiber base material had been impregnated with the Nylon 6 resin was produced. The properties of the prepreg are shown in Table 5. An L-shaped box-like molded product was produced in the same manner as in Example 1 except for manufacturing a preform in which two prepregs (9) had been laminated. The preform was shaped well in conformity with the shape of the mold and a molded product that was high in shape quality was obtained. The properties of the molded product are shown in Table 6.

Example 10

A carbon fiber base material was produced in the same manner as in Example 1 except for using, in papermaking, chopped carbon fibers composed of a mixture of chopped carbon fibers having a length of 6 mm and chopped carbon fibers having a length of 3 mm in a mass ratio of 1:1. The properties of the reinforcing fiber base material are shown in Table 4. Using the resulting carbon fiber base material, a prepreg (10) which the Nylon 6 resin had penetrated was produced in the same manner as in Example 1. The properties of the prepreg are shown in Table 5.

An L-shaped box-liked molded product was produced in the same manner as in Example 1 except for using the prepreg (10). The preform was shaped well in conformity with the shape of the mold and a molded product that was high in shape quality was obtained. The properties of the molded product are shown in Table 6.

Example 11

A carbon fiber base material was produced in the same manner as in Example 1 except for using, in papermaking, chopped carbon fibers composed of a mixture of chopped carbon fibers 2 having a length of 6 mm and chopped carbon fibers 1 having a length of 3 mm in a mass ratio of 3:1. The properties of the reinforcing fiber base material are shown in Table 4. Using the resulting carbon fiber base material, a prepreg (11) which the Nylon 6 resin had penetrated was produced in the same manner as in Example 1. The properties of the prepreg are shown in Table 5.

An L-shaped box-liked molded product was produced in the same manner as in Example 1 except for using the prepreg (11). The preform was shaped well in conformity with the shape of the mold and a molded product that was high in shape quality was obtained. The properties of the molded product are shown in Table 6.

Example 12

A prepreg (12) was produced in the same manner as in Example 1 except that the pressure and the time were adjusted when the carbon fiber base material was impregnated with the Nylon 6 resin film so that the resin impregnation ratio might become 20%. The properties of the prepreg are shown in Table 5. An L-shaped box-liked molded product was produced in the same manner as in Example 1 except for using the prepreg (12), adjusting the cavity surface temperature of the mold to 270° C., adding a molding pressure of 35 MPa and holding it 10 minutes. Although it was necessary to increase the molding temperature, the molding pressure and the molding time because the resin impregnation ratio of the preform was low, the molded product was shaped well in conformity with the shape of the mold and a molded product that was high in shape quality was obtained. The properties of the molded product are shown in Table 6.

Example 13

The carbon fiber base material of Example 1 and two films of the same thickness made of A900 (PPS resin) produced by Toray Industries, Inc., as films were used and laminated so as to form film/carbon fiber base material/film, and a pressure of 5 MPa was applied for 2 minutes at a temperature of 300° C. Thus, a prepreg (13) composed of the carbon fiber base material impregnated with the PPS resin was prepared. The properties of the prepreg are shown in Table 5.

An L-shaped box-liked molded product was produced in the same manner as in Example 1 except for using the prepreg (13), and adjusting the cavity surface temperature of the mold to 300° C. The molded product was shaped well in conformity with the shape of the mold and a molded product that was high in shape quality was obtained. The properties of the molded product are shown in Table 6.

Example 14

The carbon fiber base material of Example 1 and two films of the same thickness prepared from a resin prepared by kneading 50% by mass of an unmodified polypropylene resin ("Prime Polypro" J105G, produced by Prime Polymer Co., Ltd.) and 50% by mass of an acid-modified polypropylene resin ("ADMER" QB510, produced by Mitsui Chemicals, Inc.) as films were used and laminated so as to form film/carbon fiber base material/film, and a pressure of 5 MPa was applied for 2 minutes at a temperature of 230° C. Thus, a prepreg (14) composed of the carbon fiber base material impregnated with a PP resin was prepared. The properties of the prepreg are shown in Table 5.

An L-shaped box-liked molded product was produced in the same manner as in Example 1 except for using the prepreg (14), and adjusting the cavity surface temperature of the mold to 230° C. The molded product was shaped well in conformity with the shape of the mold and a molded product that was high in shape quality was obtained. The properties of the molded product are shown in Table 6.

Referential Example 1

The carbon fiber base material of Example 1 and two films of the same thickness made of the epoxy resin of Material 13 as films were used and laminated so as to form film/carbon fiber base material/film, and a pressure of 5 MPa was applied for 2 minutes at a temperature of 60° C. Thus, a prepreg (15) composed of the carbon fiber base material impregnated with the epoxy resin 1 was prepared. As compared with cases where thermoplastic resins are used, the tensile strength of the prepreg was low, and therefore it became difficult to handle the prepreg in a lamination step. The properties of the prepreg are shown in Table 8.

An L-shaped box-like molded product was produced by using the prepreg (15), molding it while adjusting the cavity surface temperature of the mold to 150° C., the molding pressure to 10 MPa and the molding time to 30 minutes, and then performing release from the mold. The molded product was shaped well in conformity with the shape of the mold and a molded product that was high in shape quality was obtained. The properties of the molded product are shown in Table 9.

Referential Example 2

The carbon fiber base material of Example 1 and two films of the same thickness made of the epoxy resin of Material 14 as films were used and laminated so as to form film/carbon fiber base material/film, and a pressure of 5 MPa was applied for 2 minutes at a temperature of 60° C. Thus, a prepreg (16) composed of the carbon fiber base material impregnated with the epoxy resin 1 was prepared. As compared with cases where thermoplastic resins are used, the tensile strength of the prepreg was low, and therefore it became difficult to handle the prepreg in a lamination step. The properties of the prepreg are shown in Table 8.

An L-shaped box-liked molded product was produced in the same manner as in Example 14 except for using the prepreg (16). The molded product was shaped well in conformity with the shape of the mold and a molded product that was high in shape quality was obtained. The properties of the molded product are shown in Table 9.

Example 15

There was prepared a film using a Nylon 6 obtained by mixing 10 parts by mass of Novaled 120 (average particle diameter: 25 μm, phosphorus content: 85%) produced by Rinkagaku Kogyo Co., Ltd., to 100 parts by mass of CM1007 (Nylon 6 resin) produced by Toray Industries, Inc., followed by kneading. A prepreg (17) was produced in the same manner as in Example 1 except for using the carbon fiber base material of Example 1 and the two films of the same thickness and laminating them so as to form film/carbon fiber base material/film. The properties of the prepreg are shown in Table 8.

An L-shaped box-liked molded product was produced in the same manner as in Example 1 except for using the prepreg (17). The preform was shaped well in conformity with the shape of the mold and a molded product that was high in shape quality was obtained. The molded product was one to which flame retardancy had been imparted by the incorporation of red phosphorus. The flame retardancy was UL94V-0. The properties of the molded product are shown in Table 9.

Example 16

A prepreg (18) was produced in the same manner as in Example 1 except for adjusting the size of the prepreg to 1000 mm×500 mm. The properties of the prepreg are shown in Table 8.

Figure 8:
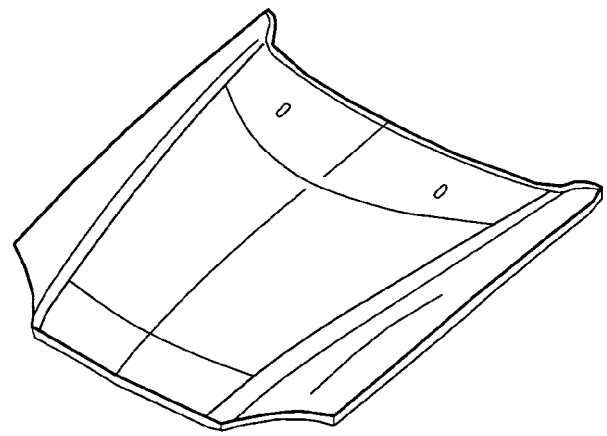
FIG. 8 is a schematic diagram of a molded automobile bonnet.

A molded product in the form of a bonnet of an automobile was produced in the same manner as in Example 1, except for preparing a preform in which 24 prepregs (18) had been laminated and using a mold for automobile bonnet molded product as shown in FIG. 8. The preform, which was large in size, could be handled in lamination, transportation, and so on, and it was shaped well in conformity with the shape of the mold and a molded product that was high in shape quality was obtained. The properties of the molded product are shown in Table 9.

Example 17

A glass fiber base material was obtained in the same manner as in Example 1, except for using chopped glass fibers prepared by cutting the glass fibers obtained in Material 4 into a length of 6 mm with a cartridge cutter instead of chopped carbon fibers. The basis weight of the glass fiber base material was 100 g/m². The properties of the glass fiber base material are shown in Table 7.

A prepreg (19) composed of the glass fiber base material impregnated with Nylon 6 resin was produced in the same manner as in Example 1 except for using the above-mentioned glass fiber base material. The properties of the prepreg are shown in Table 8.

An L-shaped box-like molded product was produced in the same manner as in Example 1 except for manufacturing a preform in which nineteen prepregs (19) had been laminated. The preform was shaped well in conformity with the shape of the mold and a molded product that was high in shape quality was obtained. The properties of the molded product are shown in Table 9.

Example 18

A prepreg (20) was produced in the same manner as in Example 2, except for using chopped carbon fibers prepared by cutting the carbon fibers obtained in Material 2 into a length of 6 mm with a cartridge cutter as chopped carbon fibers. The properties of the prepreg are shown in Table 8.

An L-shaped box-like molded product was produced in the same manner as in Example 1 except for manufacturing a preform in which seventeen prepregs (20) had been laminated. The preform was shaped well in conformity with the shape of the mold and a molded product that was high in shape quality was obtained. The properties of the molded product are shown in Table 9.

Example 19

A prepreg (21) was produced in the same manner as in Example 14 except that the PP resin film with which the carbon fiber base material was to be impregnated was adjusted so that the fiber mass content might become 40%. The properties of the prepreg are shown in Table 8.

An L-shaped box-like molded product was produced in the same manner as in Example 14 except for manufacturing a preform in which seventeen prepregs (21) had been laminated. The preform was shaped well in conformity with the shape of the mold and a molded product that was high in shape quality was obtained. The properties of the molded product are shown in Table 9.

Example 20

A laminated preform (A) was prepared by laminating eight prepregs (1) and then the preform (A) was pressurized at a temperature of 250° C. for 1 minute under a pressure of 5 MPa, so that a preform (B) in which the prepregs (1) had been adhered to each other was produced. The properties of the preform are shown in Table 10.

Using this preform (B), an L-shaped box-like molded product of a B5 size was produced in the same manner as in Example 1. Since the prepregs (1) had been adhered together, the standing wall portion of the L-shaped box-like molded product was a little thin and the surface thereof was roughened a little, so that the shapeability was a little poor, but the molded product was capable of being used. The properties of the molded product are shown in Table 10.

Example 21

A laminated preform (C) was produced by laminating the prepregs (1) and the prepregs (2), eight sheets in total, in a constitution of [(2)/(1)×6/(2)]. The properties of the preform are shown in Table 10.

An L-shaped box-liked molded product was produced in the same manner as in Example 1 except for using this preform. The molded product was shaped well in conformity with the shape of the mold and a molded product that was high in shape quality was obtained. The properties of the molded product are shown in Table 10.

Example 22

A laminated preform (D) was produced by laminating the prepregs (1) and the prepregs (20), eight sheets in total, in a constitution of [(20)/(1)×6/(20)]. The properties of the preform are shown in Table 10.

An L-shaped box-liked molded product was produced in the same manner as in Example 1 except for using this preform. The molded product was shaped well in conformity with the shape of the mold and a molded product that was high in shape quality was obtained. The properties of the molded product are shown in Table 10.

Example 23

A laminated preform (E) was produced by laminating the prepregs (1) and the prepregs (19), six sheets in total, in a constitution of [(1)/(19)×4/(1)]. The properties of the preform are shown in Table 10.

An L-shaped box-liked molded product was produced in the same manner as in Example 1 except for using this preform. The molded product was shaped well in conformity with the shape of the mold and a molded product that was high in shape quality was obtained. The properties of the molded product are shown in Table 10.

Example 24

Figure 5:
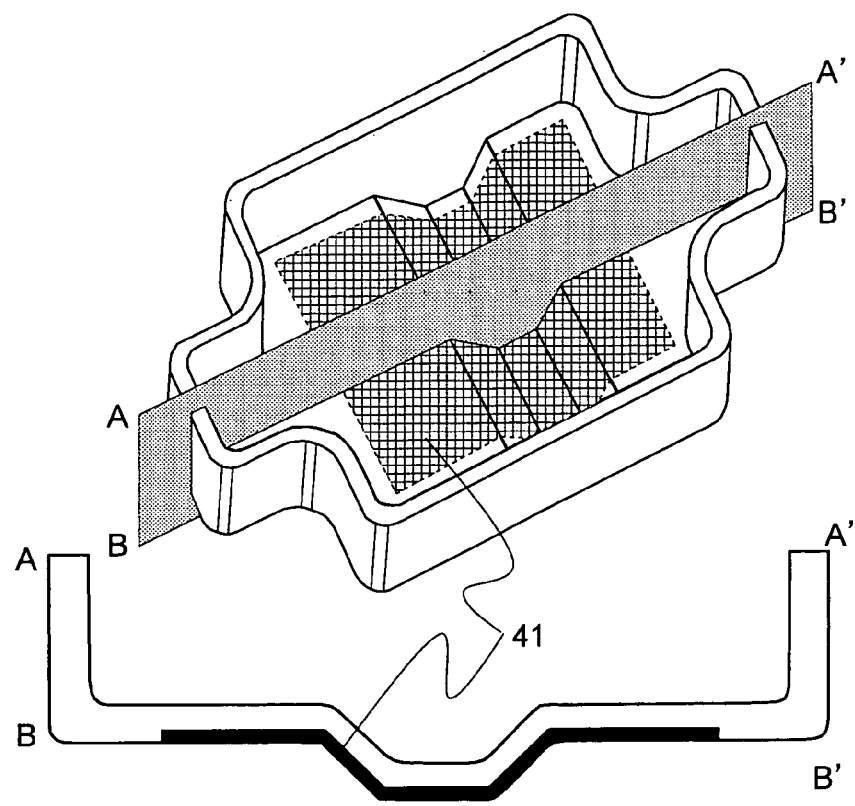
FIG. 5 is a schematic diagram illustrating one example of a box-shaped product that is obtainable by the use of the prepreg and the preform of the present invention.

A laminated preform (F) was produced by laminating the prepregs (1) and TORAYCA prepreg of Material 10, eight sheets in total, in a constitution of [TORAYCA prepreg/(1)× 7]. The properties of the preform are shown in Table 10. Here, the TORAYCA prepreg is arranged so that the top panel portion of the molded product of FIG. 5 may be reinforced.

An L-shaped box-liked molded product was produced in the same manner as in Example 1 except for using this preform. The molded product was shaped well in conformity with the shape of the mold and a molded product that was high in shape quality was obtained. The properties of the molded product are shown in Table 10.

Example 25

Figure 6:
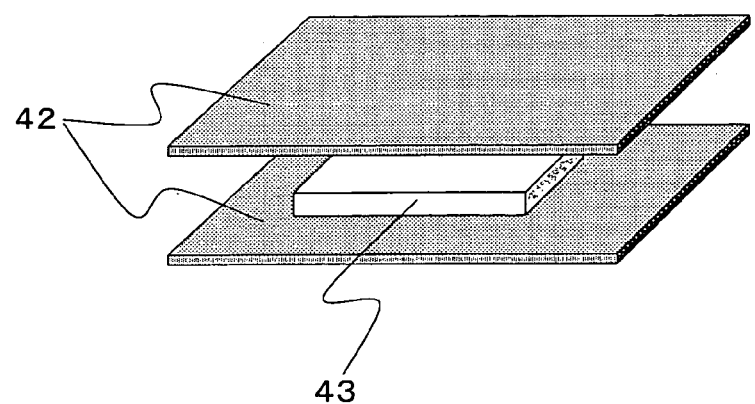
FIG. 6 is a schematic diagram of lamination using a prepreg of the present invention and GMT.

A laminated preform (G) was produced by laminating the prepregs (1) and GMT of Material 5, three sheets in total, in a constitution of [(1)/GMT/(1)]. The properties of the preform are shown in Table 11. Here, the prepreg (1) and the GMT were arranged so that the charge ratio might be 110% for the prepreg (1) and 50% for GMT as illustrated in FIG. 6.

An L-shaped box-liked molded product was produced in the same manner as in Example 1 except for using this preform. The molded product was shaped well in conformity with the shape of the mold and a molded product that was high in shape quality was obtained. The properties of the molded product are shown in Table 11.

Example 26

A laminated preform (H) was produced by laminating the prepregs (21) and a PP resin sheet of Material 6, three sheets in total, in a constitution of [(21)/PP resin sheet/(21)]. The properties of the preform are shown in Table 11.

An L-shaped box-liked molded product was produced in the same manner as in Example 1 except for using this preform. The molded product was shaped well in conformity with the shape of the mold and a molded product that was high in shape quality was obtained. The properties of the molded product are shown in Table 11.

Example 27

A laminated preform (I) was produced by laminating the prepregs (21) and a foamed PP resin sheet of Material 7, three sheets in total, in a constitution of [(21)/foamed PP resin sheet/(21)]. The properties of the preform are shown in Table 11.

An L-shaped box-liked molded product was produced in the same manner as in Example 1 except for using this preform. The molded product was shaped well in conformity with the shape of the mold and a molded product that was high in shape quality was obtained. The properties of the molded product are shown in Table 11.

Example 28

A laminated preform (J) was produced by laminating the prepregs (1) and a transparent Nylon resin film of Material 8, nine sheets in total, in a constitution of [transparent Nylon resin sheet/(1)×8]. The properties of the preform are shown in Table 11.

An L-shaped box-liked molded product was produced in the same manner as in Example 1 except for using this preform. The molded product was shaped well in conformity with the shape of the mold and a molded product that was high in shape quality was obtained. Since the surface was the transparent Nylon resin sheet, it was glossy and it provided luxuriousness. The properties of the molded product are shown in Table 11.

Example 29

A laminated preform (K) was produced by laminating the prepregs (1) and a Nylon resin flame retardant film of Material 9, nine sheets in total, in a constitution of [Nylon resin flame retardant film/(1)×8]. The properties of the preform are shown in Table 11.

An L-shaped box-liked molded product was produced in the same manner as in Example 1 except for using this preform. The molded product was shaped well in conformity with the shape of the mold and a molded product that was high in shape quality was obtained. The properties of the molded product are shown in Table 11. Moreover, the height of a flame of a burner was adjusted to 19 mm and flame retardancy measurement comprising exposing the surface of the molded product where the Nylon resin flame retardant film had been disposed to the flame and 5 seconds later removing it from the flame. The flame went out after the removal from the flame.

Example 30

An L-shaped box-like molded product was produced in the same manner as in Example 1, except for exchanging the stamping mold which had an L-shaped box-like cavity of the B5 size to a mold having a stamping-out mechanism for stamping-out an excess portion of located at an edge of the molded product. The process was shortened successfully by performing molding and stamping-out simultaneously.

Comparative Example 1

A carbon fiber base material was produced in the same manner as in Example 1 except for adjusting the basis weight of the carbon fiber base material to 410 g/m² by adjusting the flow rate of the dispersion liquid and the speed of the mesh conveyer during papermaking. The properties of the carbon fiber base material are shown in Table 12. The Nylon 6 resin film with which this carbon fiber base material was to be impregnated was adjusted so that the fiber mass content might become 20% and a pressure of 5 MPa was applied at a temperature of 250° C. for two minutes, so that a prepreg (22) in which the carbon fiber base material had been impregnated with the Nylon 6 resin was produced. The properties of the prepreg are shown in Table 13.

An L-shaped box-liked molded product was produced in the same manner as in Example 1 except for using one prepreg (22) as a preform. It was difficult to shape the preform in conformity with the shape of the mold, so that the standing wall portion failed to be uniform in thickness and it was partly torn. The properties of the molded product are shown in Table 15.

Comparative Example 2

A prepreg (23) in which carbon fibers and Nylon 6 fibers had been mixed was obtained by performing papermaking in the same manner as in Example 1, except for charging, into a dispersion liquid, the chopped carbon fibers used in Example 1 and Nylon 6 resin chopped fibers of Material 15 in a formulation such that the fiber mass content might become 20%. The properties of the prepreg are shown in Table 13. The basis weight of only the carbon fibers was 50 g/m². Although molding of a bonnet for an automobile was attempted in the same manner as in Example 16, except for using the prepreg (23), the prepreg (23) was ruptured during transportation, lamination, and movement in manufacturing a preform in which 24 prepregs (23) had been laminated because the tensile strength of the prepreg (23) was low, so that it could not be molded.

Comparative Example 3

An L-shaped box-like molded product was produced in the same manner as in Example 1, except for using one sheet of GMT (prepreg (24)) of Material 5 and arranging it at a charge ratio of 50%. Since the GMT was excessively thick, it was not able to be molded into a molded product of 1.1 mm in thickness and no satisfactory molded product with a desired thickness was obtained. The properties of the molded product are shown in Table 14.

Comparative Example 4

An L-shaped box-like molded product was produced in the same manner as in Example 13, except for using one sheet of CF-SMC (prepreg (25)) of Material 11 and arranging it at a charge ratio of 50%. Although the molded product was shaped well in conformity with the shape of the mold and the molded product that was high in shape quality was obtained, the article was low in specific strength and poor in isotropy because the carbon fibers were dispersed in a bundle form. The properties of the molded product are shown in Table 14.

Comparative Example 5

A preform of quasi-isotropic lamination [0/45/90/−45]s was produced using eight sheets of cut-in carbon fiber prepregs (prepregs (26)) of Material 12, and an L-shaped box-like molded product was produced in the same manner as in Example 13. Although the molded product was shaped well in conformity with the shape of the mold and the molded product that was high in shape quality was obtained, the article was poor in isotropy because the carbon fibers were dispersed in a bundle form. The properties of the molded product are shown in Table 14.

Comparative Example 6

A preform of quasi-isotropic lamination [0/45/90/−45]s was produced using eight sheets of TORAYCA prepregs (prepregs (27)) of Material 10, and an L-shaped box-like molded product was produced in the same manner as in Example 13, but it was difficult to provide a shape and a standing wall, corner portions and so on were not capable of being shaped because the carbon fibers were continuous.

TABLE 1

| | | | | | Example 1 | Example 2 | Example 3 | Example 4 | Example 5 | Example 6 | Example 7 |
|---|---|---|---|---|---|---|---|---|---|---|---|
| Reinforcing fiber base material | Reinforcing fiber | Kind of fiber | | [—] | Carbon fiber 1 | Carbon fiber 1 | Carbon fiber 1 | Carbon fiber 1 | Carbon fiber 1 | Carbon fiber 1 | Carbon fiber 1 |
| | | Fiber mass content | | [% by mass] | 28 | 52 | 65 | 15 | 8 | 28 | 28 |
| | | Fiber length | Longer than 10 mm | [% by mass] | 0 | 0 | 0 | 0 | 0 | 0 | 0 |

TABLE 1-continued

|  |  |  | Example 1 | Example 2 | Example 3 | Example 4 | Example 5 | Example 6 | Example 7 |
|---|---|---|---|---|---|---|---|---|---|
| Proportion | 2 to 10 mm | [% by mass] | 95 | 95 | 95 | 95 | 95 | 95 | 95 |
|  | Shorter than 2 mm | [% by mass] | 5 | 5 | 5 | 5 | 5 | 5 | 5 |
| Two-dimensional orientation angle |  | [°] | 40 | 42 | 41 | 40 | 40 | 25 | 40 |
| Amount of air (Frazier method) |  | [cm$^3$/cm$^2$ · s] | 160 | 160 | 150 | 160 | 160 | 160 | 450 |

TABLE 2

|  |  |  |  | Example 1 | Example 2 | Example 3 | Example 4 | Example 5 | Example 6 | Example 7 |
|---|---|---|---|---|---|---|---|---|---|---|
| Prepreg | Prepreg number |  | [—] | (1) | (2) | (3) | (4) | (5) | (6) | (7) |
|  | Resin | Kind of resin | [—] | Nylon 6 | Nylon 6 | Nylon 6 | Nylon 6 | Nylon 6 | Nylon 6 | Nylon 6 |
|  |  | Resin mass content | [% by mass] | 72 | 48 | 35 | 85 | 92 | 72 | 72 |
|  | Feature | Thickness at 23° C., hp0 | [mm] | 0.15 | 0.07 | 0.07 | 0.28 | 0.56 | 0.15 | 0.06 |
|  |  | Thickness at 100° C., h1 | [mm] | 0.15 | 0.07 | 0.07 | 0.28 | 0.56 | 0.15 | 0.06 |
|  |  | Thickness at 200° C., h2 | [mm] | 0.18 | 0.10 | 0.11 | 0.30 | 0.58 | 0.18 | 0.08 |
|  |  | Thickness at 300° C., h3 | [mm] | 0.92 (*2) | 0.45 (*2) | 0.49 (*2) | 0.85 (*2) | 0.73 (*2) | 0.92 (*2) | 0.46 (*2) |
|  |  | Thickness at 400° C., h4 | [mm] | (*1) | (*1) | (*1) | (*1) | (*1) | (*1) | (*1) |
|  |  | Resin impregnation ratio | [%] | 95 | 95 | 95 | 99 | 99 | 95 | 95 |
|  |  | Bulk density | [g/cm$^3$] | 1.20 | 1.33 | 1.46 | 1.19 | 1.15 | 1.20 | 1.20 |
|  |  | Mass per unit area | [g/m$^2$] | 180 | 100 | 100 | 330 | 650 | 180 | 35 |
|  |  | Tensile strength σ | [MPa] | 150 | 200 | 210 | 120 | 90 | 150 | 120 |
|  |  | σMax | [MPa] | 170 | 220 | 220 | 135 | 95 | 200 | 130 |
|  |  | σMim | [MPa] | 140 | 185 | 190 | 110 | 85 | 120 | 105 |
|  |  | Length in the longitudinal direction | [mm] | 500 | 500 | 500 | 500 | 500 | 500 | 500 |

(*1): Resin was decomposed.
(*2): Resin was slightly decomposed.

TABLE 3

|  |  |  | Example 1 | Example 2 | Example 3 | Example 4 | Example 5 | Example 6 | Example 7 |
|---|---|---|---|---|---|---|---|---|---|---|
| Molded product | Molding method |  | Stamping | Stamping | Stamping | Stamping | Stamping | Stamping | Stamping |
|  | Properties | Specific strength | B | A | A | B | C | B | B |
|  |  | Isotropy | A | A | A | A | A | B | A |
|  |  | Specific rigidity | B | B | B | B | C | B | B |
|  |  | Isotropy | A | A | A | A | A | B | A |
|  |  | Coefficient of linear expansion | A | A | A | C | D | A | A |
|  |  | Isotropy | A | A | A | A | A | A | A |

TABLE 4

|  |  |  |  | Example 8 | Example 9 | Example 10 | Example 11 | Example 12 | Example 13 | Example 14 |
|---|---|---|---|---|---|---|---|---|---|---|
| Reinforcing fiber base material | Reinforcing fiber | Kind of fiber | [—] | Carbon fiber 1 | Carbon fiber 1 | Carbon fiber 1 There are two peaks of fiber length distribution. | Carbon fiber 1 Carbon fiber 2 There are two peaks of fiber length distribution. | Carbon fiber 1 | Carbon fiber 1 | Carbon fiber 1 |
|  |  | Fiber mass content | [% by mass] | 28 | 28 | 28 | 52 | 28 | 25 | 33 |
|  |  | Fiber length | Longer than 10 mm | [% by mass] | 0 | 0 | 0 | 0 | 0 | 0 | 0 |
|  |  | Proportion | 2 to 10 mm | [% by mass] | 95 | 95 | 95 | 95 | 95 | 95 | 95 |
|  |  |  | Shorter than 2 mm | [% by mass] | 5 | 5 | 5 | 5 | 5 | 5 | 5 |
|  | Two-dimensional orientation angle |  | [°] | 40 | 40 | 40 | 40 | 40 | 40 | 40 |
|  | Amount of air (Frazier method) |  | [cm$^3$/cm$^2$ · s] | 1100 | 80 | 200 | 180 | 160 | 160 | 160 |

TABLE 5

|  |  |  |  | Example 8 | Example 9 | Example 10 | Example 11 | Example 12 | Example 13 | Example 14 |
|---|---|---|---|---|---|---|---|---|---|---|
| Prepreg | Prepreg number |  | [—] | (8) | (9) | (10) | (11) | (12) | (13) | (14) |
|  | Resin | Kind of resin | [—] | Nylon 6 | Nylon 6 | Nylon 6 | Nylon 6 | Nylon 6 | PPS | PP |
|  |  | Resin mass content | [% by mass] | 72 | 72 | 72 | 48 | 72 | 75 | 67 |
|  | Feature | Thickness at 23° C., hp0 | [mm] | 0.03 | 0.58 | 0.15 | 0.07 | 0.69 | 0.15 | 0.15 |
|  |  | Thickness at 100° C., h1 | [mm] | 0.03 | 0.58 | 0.15 | 0.07 | 0.69 | 0.15 | 0.15 |
|  |  | Thickness at 200° C., h2 | [mm] | 0.04 | 0.62 | 0.16 | 0.08 | 0.73 | 0.15 | 0.69 |
|  |  | Thickness at 300° C., h3 | [mm] | 0.18 (*2) | 3.45 (*2) | 0.73 (*2) | 0.36 (*2) | 0.95 (*2) | 0.88 | (*1) |
|  |  | Thickness at 400° C., h4 | [mm] | (*1) | (*1) | (*1) | (*1) | (*1) | 0.94 (*2) | (*1) |
|  |  | Resin impregnation ratio | [%] | 95 | 95 | 95 | 95 | 20 | 95 | 95 |
|  |  | Bulk density | [g/cm$^3$] | 1.20 | 1.25 | 1.20 | 1.33 | 0.25 | 1.37 | 1.03 |
|  |  | Mass per unit area | [g/m$^2$] | 35 | 620 | 180 | 100 | 180 | 200 | 150 |
|  |  | Tensile strength σ | [MPa] | 120 | 160 | 140 | 180 | 60 | 145 | 120 |
|  |  | σMax | [MPa] | 130 | 175 | 155 | 200 | 70 | 155 | 130 |
|  |  | σMim | [MPa] | 105 | 150 | 130 | 165 | 65 | 140 | 115 |
|  |  | Length in the longitudinal direction | [mm] | 500 | 500 | 500 | 500 | 500 | 500 | 500 |

(*1): Resin was decomposed.
(*2): Resin was slightly decomposed.

TABLE 6

|  |  |  | Example 8 | Example 9 | Example 10 | Example 11 | Example 12 | Example 13 | Example 14 |
|---|---|---|---|---|---|---|---|---|---|
| Molded product | Molding method |  | Stamping | Stamping | Stamping | Stamping | Stamping | Stamping | Stamping |
|  | Properties | Specific strength | B | B | B | A | B | B | B |
|  |  | Isotropy | A | A | AA | AA | A | A | A |
|  |  | Specific rigidity | B | B | B | A | B | B | B |
|  |  | Isotropy | A | A | AA | AA | A | A | A |
|  |  | Coefficient of linear expansion | A | A | A | A | A | A | A |
|  |  | Isotropy | A | A | A | A | A | A | A |

TABLE 7

|  |  |  |  | Referential Example 1 | Referential Example 2 | Example 15 | Example 16 | Example 17 | Example 18 | Example 19 |
|---|---|---|---|---|---|---|---|---|---|---|
| Reinforcing fiber base material | Reinforcing fiber | Kind of fiber |  | [—] | Carbon fiber 1 | Carbon fiber 1 | Carbon fiber 1 | Carbon fiber 1 | Grass fiber | Carbon fiber 2 | Carbon fiber 1 |
|  |  | Fiber mass content |  | [% by mass] | 27 | 27 | 28 | 28 | 36 | 52 | 57 |
|  |  | Fiber length | Longer than 10 mm | [% by mass] | 0 | 0 | 0 | 0 | 0 | 0 | 0 |
|  |  | Proportion | 2 to 10 mm | [% by mass] | 95 | 95 | 95 | 95 | 95 | 95 | 95 |
|  |  |  | Shorter than 2 mm | [% by mass] | 5 | 5 | 5 | 5 | 5 | 5 | 5 |
|  | Two-dimensional orientation angle |  |  | [°] | 40 | 40 | 40 | 40 | 40 | 40 | 40 |
|  | Amount of air (Frazier method) |  |  | [cm$^3$/cm$^2$·s] | 160 | 160 | 160 | 160 | 250 | 160 | 160 |

TABLE 8

|  |  |  |  | Referential Example 1 | Referential Example 2 | Example 15 | Example 16 | Example 17 | Example 18 | Example 19 |
|---|---|---|---|---|---|---|---|---|---|---|
| Prepreg | Prepreg number |  | [—] | (15) | (16) | (17) | (18) | (19) | (20) | (21) |
|  | Resin | Kind of resin | [—] | Epoxy uncured Tg viscosity is low. | Epoxy uncured Tg viscosity is high. | Nylon 6 10 wt % red phosphorus acid was incorporated. | Nylon 6 | Nylon 6 | Nylon 6 | PP |
|  |  | Resin mass content | [% by mass] | 73 | 73 | 72 | 72 | 64 | 48 | 43 |
|  | Feature | Thickness at 23° C., hp0 | [mm] | 0.15 | 0.15 | 0.15 | 0.15 | 0.21 | 0.07 | 0.07 |
|  |  | Thickness at 100° C., h1 | [mm] | 0.75 | 0.35 | 0.15 | 0.15 | 0.21 | 0.07 | 0.07 |
|  |  | Thickness at 200° C., h2 | [mm] | 0.82 | 0.55 | 0.17 | 0.18 | 0.22 | 0.09 | 0.35 |
|  |  | Thickness at 300° C., h3 | [mm] | (*1) | (*1) | 0.88 (*2) | 0.92 (*2) | 0.83 (*2) | 0.58 (*2) | (*1) |
|  |  | Thickness at 400° C., h4 | [mm] | (*1) | (*1) | (*1) | (*1) | (*1) | (*1) | (*1) |
|  |  | Resin impregnation ratio | [%] | 95 | 95 | 95 | 95 | 95 | 95 | 95 |
|  |  | Bulk density | [g/cm$^3$] | 1.25 | 1.25 | 1.22 | 1.20 | 1.33 | 1.33 | 1.20 |

TABLE 8-continued

|  |  | Referential Example 1 | Referential Example 2 | Example 15 | Example 16 | Example 17 | Example 18 | Example 19 |
|---|---|---|---|---|---|---|---|---|
| Mass per unit area | [g/m$^2$] | 180 | 180 | 180 | 180 | 280 | 100 | 90 |
| Tensile strength σ | [MPa] | 0.05 | 0.1 | 160 | 150 | 110 | 140 | 135 |
| σMax | [MPa] | 0.06 | 0.11 | 175 | 170 | 120 | 150 | 145 |
| σMim | [MPa] | 0.04 | 0.09 | 150 | 140 | 105 | 130 | 125 |
| Length in the longitudinal direction | [mm] | 500 | 500 | 500 | 1500 | 500 | 500 | 500 |

(*1): Resin was decomposed.
(*2): Resin was slightly decomposed.

TABLE 9

|  |  |  | Referential Example 1 | Referential Example 2 | Example 15 | Example 16 | Example 17 | Example 18 | Example 19 |
|---|---|---|---|---|---|---|---|---|---|
| Molded product | Molding method |  | Heat press | Heat press | Stamping | Stamping | Stamping | Stamping | Stamping |
|  | Properties | Specific strength | B | B | B | B | C | A | B |
|  |  | Isotropy | A | A | A | A | A | A | A |
|  |  | Specific rigidity | B | B | B | B | C | A | A |
|  |  | Isotropy | A | A | A | A | A | A | A |
|  |  | Coefficient of linear expansion | A | A | A | A | C | A | A |
|  |  | Isotropy | A | A | A | A | A | A | A |

TABLE 10

|  |  |  |  | Example 1 | Example 20 | Example 21 | Example 22 | Example 23 | Example 24 |
|---|---|---|---|---|---|---|---|---|---|
| Preform | Preform number |  | [—] | (A) | (B) | (C) | (D) | (E) | (F) |
|  | Used prepreg | Prepreg number | [—] | (1) | (1) | (1), (2) | (1), (20) | (1), (19) | (1), Continuous CFRTP |
|  | Laminated configuration |  | [—] | Eight-sheet lamination | Eight-sheet lamination | (2)/(1) × 6/(2) | (20)/(1) × 6/(20) | (1)/(19) × 4/(1) | Core layer (1) × 7 Single-side continuous CFRTP |
|  | Feature | Thickness at 23° C., hp0 | [mm] | 1.2 | 1.2 | 1.1 | 1.1 | 1.1 | 1.2 |
|  |  | Thickness at 100° C., h1 | [mm] | 1.3 | 1.2 | 1.2 | 1.2 | 1.2 | 1.3 |
|  |  | Thickness at 200° C., h2 | [mm] | 1.5 | 1.4 | 1.5 | 1.5 | 1.4 | 1.4 |
|  |  | Thickness at 300° C., h3 | [mm] | 7.9 (*2) | 7.9 (*2) | 8.2 (*2) | 8.1 (*2) | 6.3 (*2) | 7.5 (*2) |
|  |  | Thickness at 400° C., h4 | [mm] | (*1) | (*1) | (*1) | (*1) | (*1) | (*1) |
|  |  | Interlayer shear strength | [MPa] | 0 | 60 | 0 | 0 | 0 | 0 |
| Molded product | Molding method |  |  | Stamping | Stamping | Stamping | Stamping | Stamping | Stamping |
|  | Properties | Specific strength | [—] | B | B | B | B | C | A |
|  |  | Isotropy | [—] | A | A | A | A | A | B |
|  |  | Specific rigidity | [—] | B | B | A | A | C | A |
|  |  | Isotropy | [—] | A | A | A | A | A | B |
|  |  | Coefficient of linear expansion | [—] | B | B | A | A | B | A |
|  |  | Isotropy | [—] | A | A | A | A | A | B |

(*1): Resin was decomposed.
(*2): Resin was slightly decomposed.

TABLE 11

|  |  |  |  | Example 25 | Example 26 | Example 27 | Example 28 | Example 29 | Example 30 |
|---|---|---|---|---|---|---|---|---|---|
| Preform | Preform number |  | [—] | (G) | (H) | (I) | (J) | (K) | (A) |
|  | Used prepreg | Prepreg number | [—] | (14), GMT | (21), PP resin sheet | (21), foamed sheet | (1), surfacing film | (1) flame retardant film | (1) |
|  | Laminated configuration |  | [—] | (14)/GMT (14) | (21)/resin sheet/(21) | (21)/foamed sheet/(21) | surfacing film/(1) × 8 | flame retardant film/(1) × 8 | Eight-sheet lamination |
|  | Feature | Thickness at 23° C., hp0 | [mm] | 4.1 | 1.2 | 1.2 | 1.3 | 1.3 | 1.2 |
|  |  | Thickness at 100° C., h1 | [mm] | 4.1 | 1.2 | 1.2 | 1.3 | 1.3 | 1.3 |
|  |  | Thickness at 200° C., h2 | [mm] | 15.4 | 1.9 | 2.1 | 1.4 | 1.4 | 1.5 |
|  |  | Thickness at 300° C., h3 | [mm] | (*1) | (*1) | (*1) | 8.1 (*2) | 8.1 (*2) | 7.9 (*2) |
|  |  | Thickness at 400° C., h4 | [mm] | (*1) | (*1) | (*1) | (*1) | (*1) | (*1) |
|  |  | Interlayer shear strength | [MPa] | 0 | 0 | 0 | 0 | 0 | 0 |

TABLE 11-continued

|  |  |  |  | Example 25 | Example 26 | Example 27 | Example 28 | Example 29 | Example 30 |
|---|---|---|---|---|---|---|---|---|---|
| Molded product | Molding method |  |  | Stamping | Stamping | Stamping | Stamping | Stamping | Stamping + punching |
|  | Properties | Specific strength | [—] | C | B | B | B | B | B |
|  |  | Isotropy | [—] | A | A | A | A | A | A |
|  |  | Specific rigidity | [—] | B | AA | AAA | B | B | B |
|  |  | Isotropy | [—] | A | A | A | A | A | A |
|  |  | Coefficient of linear expansion | [—] | B | A | A | B | B | B |
|  |  | Isotropy | [—] | A | A | A | A | A | A |

(*1): Resin was decomposed.
(*2): Resin was slightly decomposed.

TABLE 12

|  |  |  |  | Comparative Example 1 | Comparative Example 2 | Comparative Example 3 | Comparative Example 4 | Comparative Example 5 | Comparative Example 6 |
|---|---|---|---|---|---|---|---|---|---|
| Reinforcing fiber base material | Reinforcing fiber | Kind of fiber | [—] | Carbon fiber 1 | Carbon fiber 1 | Grass fiber | Carbon fiber 3 | Carbon fiber | Carbon fiber |
|  |  | Fiber mass content | [% by mass] | 28 | 28 | 40 | 60 | 67 | 67 |
|  | Fiber length Proportion | Longer than 10 mm | [% by mass] | 0 | 0 | 95 | 100 | 100 | 100 |
|  |  | 2 to 10 mm | [% by mass] | 95 | 95 | 5 | 0 | 0 | 0 |
|  |  | Shorter than 2 mm | [% by mass] | 5 | 5 | 0 | 0 | 0 | 0 |
|  | Two-dimensional orientation angle |  | [°] | 40 | 40 | 30 | 2 | 1 | 1 |
|  | Amount of air (Frazier method) |  | [cm$^3$/cm$^2$·s] | 40 | 160 | 60 | 40 | 15 | 10 |

TABLE 13

|  |  |  |  | Comparative Example 1 | Comparative Example 2 | Comparative Example 3 | Comparative Example 4 | Comparative Example 5 | Comparative Example 6 |
|---|---|---|---|---|---|---|---|---|---|
| Prepreg | Prepreg number |  | [—] | (22) | (23) | (24) | (25) | (26) | (27) |
|  | Resin | Knd of resin | [—] | Nylon 6 | Epoxy | PP | Vinyl ester | Epoxy | Epoxy |
|  |  | Resin mass content | [% by mass] | 72 | 72 | 60 | 40 | 33 | 33 |
|  | Feature | Thickness at 23° C., hp0 | [mm] | 1.2 | 0.95 | 3.8 | 2.0 | 0.15 | 0.15 |
|  |  | Thickness at 100° C., h1 | [mm] | 1.2 | 0.95 | 3.8 | 2.0 | 0.15 | 0.15 |
|  |  | Thickness at 200° C., h2 | [mm] | 1.3 | 0.96 | 14.1 | 2.1 | 0.16 | 0.16 |
|  |  | Thickness at 300° C., h3 | [mm] | 0.84 (*2) | 0.98 (*2) | (*1) | (*1) | (*1) | (*1) |
|  |  | Thickness at 400° C., h4 | [mm] | (*1) | (*1) | (*1) | (*1) | (*1) | (*1) |
|  |  | Resin impregnation ratio | [%] | 95 | 0 (Resin fiber mixing) | 70 | 95 | 95 | 95 |
|  |  | Bulk density | [g/cm$^3$] | 1.20 | 1.90 | 1.24 | 1.20 | 1.47 | 1.47 |
|  |  | Mass per unit area | [g/m$^2$] | 1440 | 180 | 3900 | 3900 | 220 | 220 |
|  |  | Tensile strength σ | [MPa] | 250 | 0.005 | 30 | 0.3 | 0.01 | 200 |
|  |  | σMax | [MPa] | 255 | 0.006 | 35 | 0.4 | 0.5 | 1000 |
|  |  | σMim | [MPa] | 235 | 0.004 | 20 | 0.25 | 0.005 | 0.005 |
|  |  | Length in the longitudinal direction | [mm] | 500 | 1500 | 500 | 500 | 1000 | 1000 |

(*1): Resin was decomposed.
(*2): Resin was slightly decomposed.

TABLE 14

|  |  |  | Comparative Example 1 | Comparative Example 2 | Comparative Example 3 | Comparative Example 4 | Comparative Example 5 | Comparative Example 6 |
|---|---|---|---|---|---|---|---|---|
| Molded product | Molding method |  | Stamping | — | Stamping | Heat press | Heat press | Heat press |
|  | Properties | Specific strength | B | — | D | D | B | — |
|  |  | Isotropy | A | — | C | C | C | — |
|  |  | Specific rigidity | B | — | C | B | A | — |
|  |  | Isotropy | A | — | C | C | C | — |
|  |  | Coefficient of linear expansion | A | — | D | A | A | A |
|  |  | Isotropy | A | — | C | C | C | C |

As demonstrated in Examples 1 to 19, the isotropic prepregs which were good in distribution of the fiber length of reinforcing fibers, thickness and tensile strength and in which the two-dimensional orientation angle of fibers was from 10 to 80° exhibited good properties when a molded product was produced therefrom. In addition, the laminated preforms of Example 1 and Examples 20 to 30 produced using these prepregs also demonstrated good properties.

On the other hand, in Comparative Example 1, which was a prepreg with a great thickness was difficult to be shaped and it generated defects partly in the molded product. Moreover, in Comparative Example 2 using a prepreg which was low in tensile strength, rupture occurred during the Manufacture of a preform. Furthermore, in Comparative Example 3 using GMT, the thickness was large, so that it was very difficult to perform thin-wall molding. The isotropy of mechanical properties was also poor because of the occurrence of flow. In Comparative Example 4 using CF-SMC, the two-dimensional orientation angle of the fibers was small, and the mechanical properties and their isotropy were poor. In Comparative Example 5 using a cut-in carbon fiber prepreg, mechanical properties were improved, but the isotropy was still poor because the fibers were in the form of a bundle. Comparative Example 6, in which a continuous fiber prepreg was used, was difficult to complete a shape.

[Evaluation of Method for Manufacturing Prepreg]

Raw Materials Used for Examples (Carbon Fiber A1) PAN Type Carbon Fiber

Carbon fiber A1 was produced as follows.

An acrylic fiber bundle having a filament denier of 1d and the number of filaments of 12,000 was obtained by the dry-wet type spinning process using a copolymer composed of 99.4 mol % of acrylonitrile (AN) and 0.6 mol % of methacrylic acid. The resulting acrylic fiber bundle was heated in a draw ratio of 1.05 in the air of a temperature of from 240 to 280° C. to convert it to flame-resistant fibers, and then 10% draw was applied in a nitrogen atmosphere within a temperature range of from 300 to 900° C. at a temperature elevation rate of 200° C./min, followed by calcination with a temperature elevation up to 1300° C. The carbon fiber bundle was subjected to electrolytic surface treatment of 3 coulombs per gram of the carbon fibers using an aqueous solution containing sulfuric acid as an electrolyte. Furthermore, a sizing agent was imparted by a dipping process and then dried in hot air at a temperature of 120° C., yielding PAN type carbon fibers.

| | |
|---|---|
| Total number of filaments | 24,000 |
| Filament diameter | 7 μm |
| Mass per unit length | 0.8 g/m |
| Specific gravity | 1.8 g/cm³ |
| Tensile strength (Note 1) | 4.2 GPa |
| Tensile modulus (Note 2) | 230 GPa |
| O/C (Note 3) | 0.10 |
| Kind of sizing | Polyoxyethylene oleyl ether |
| Amount of attached sizing (Note 4) | 1.5% by mass |

(Carbon Fiber A2) PAN Type Carbon Fiber

Carbon fiber A2 was produced as follows. An acrylic fiber bundle having a filament denier of 1d and the number of filaments of 12,000 was obtained by the dry-wet type spinning process using a copolymer composed of 99.4 mol % of acrylonitrile (AN) and 0.6 mol % of methacrylic acid. The resulting acrylic fiber bundle was heated in a draw ratio of 1.05 in the air of a temperature of from 240 to 280° C. to convert it to flame-resistant fibers, and then 10% draw was applied in a nitrogen atmosphere within a temperature range of from 300 to 900° C. at a temperature elevation rate of 200° C./min, followed by calcination with a temperature elevation up to 1300° C. Furthermore, a sizing agent was imparted by a dipping process and then dried in hot air at a temperature of 120° C., yielding PAN type carbon fibers.

| | |
|---|---|
| Total number of filaments | 12,000 |
| Filament diameter | 7 μm |
| Mass per unit length | 0.8 g/m |
| Specific gravity | 1.8 g/cm³ |
| Tensile strength (Note 1) | 4.2 GPa |
| Tensile modulus (Note 2) | 230 GPa |
| O/C (Note 3) | 0.05 |
| Kind of sizing | Polyoxyethylene oleyl ether |
| Amount of attached sizing (Note 4) | 0.6% by mass |

(Carbon Fiber A3) PAN Type Carbon Fiber

Carbon fiber A3 was produced as follows. An acrylic fiber bundle having a filament denier of 1d and the number of filaments of 12,000 was obtained by the dry-wet type spinning process using a copolymer composed of 99.4 mol % of acrylonitrile (AN), and 0.6 mol % of methacrylic acid. The resulting acrylic fiber bundle was heated in a draw ratio of 1.05 in the air of a temperature of from 240 to 280° C. to convert it to flame-resistant fibers, and then 10% draw was applied in a nitrogen atmosphere within a temperature range of from 300 to 900° C. at a temperature elevation rate of 200° C./min, followed by calcination with a temperature elevation up to 1300° C. Furthermore, a sizing agent was imparted by a dipping process and then dried in hot air at a temperature of 120° C., yielding PAN type carbon fibers.

| | |
|---|---|
| Total number of filaments | 48,000 |
| Filament diameter | 7 μm |
| Mass per unit length | 0.8 g/m |
| Specific gravity | 1.8 g/cm³ |
| Tensile strength (Note 1) | 4.2 GPa |
| Tensile modulus (Note 2) | 230 GPa |
| O/C (Note 3) | 0.05 |
| Kind of sizing | Polyoxyethylene oleyl ether |
| Amount of attached sizing (Note 4) | 1.5% by mass |

(Matrix Resin B1) Acid-Modified Polypropylene Resin

As matrix resin B1 was used "ADMER" (registered trademark) QE510, manufactured by Mitsui Chemicals, Inc. The physical properties are as follows.

| | |
|---|---|
| Specific gravity | 0.91 |
| Melting point | 160° C. |

(Matrix Resin B2) Nylon 6 Resin

As matrix resin B2 was used "Amilan" (registered trademark) CM1001, manufactured by Toray Industries, Inc. The physical properties are as follows.

| | |
|---|---|
| Specific gravity | 1.13 |
| Melting point | 225° C. |

(Matrix Resin B2) PPS Resin

As matrix resin B3 was used "Torelina" (registered trademark) A900, manufactured by Toray Industries, Inc. The physical properties are as follows.

| | |
|---|---|
| Specific gravity | 1.34 |
| Melting point | 278° C. |

(Matrix Resin B4) Epoxy Resin

Thirty parts by mass of "EPICOAT" (registered trademark) 828 (bisphenol A type epoxy resin, produced by Japan Epoxy Resins Co., Ltd.), 30 parts by mass of "EPICOAT" (registered trademark) 1002 (bisphenol A type epoxy resin, produced by Japan Epoxy Resins Co., Ltd.), 40 parts by mass of "EPICOAT" (registered trademark) 154 (phenol novolac type epoxy resin, produced by Japan Epoxy Resins Co., Ltd.), 5 parts by mass of "VINYLEC" (registered trademark) (polyvinyl formal, produced by Chisso Corp.), 4 parts by mass of DICY7 (dicyandiamide, produced by Japan Epoxy Resins Co., Ltd.), and 5 parts by mass of DCMU-99 (3,4-dichlorophenyl-1,1-dimethylurea, produced by Hodogaya Chemical Co., Ltd.) were mixed with a kneader in the following procedures, yielding an epoxy resin composition in which the polyvinyl formal had been dissolved uniformly.

(a) Respective epoxy resin raw materials and polyvinyl formal were stirred for 1 to 3 hours homogeneously while being heated at 150 to 190° C., so that the polyvinyl formal was dissolved.

(b) The resin temperature was lowered to 55 to 65° C., and then dicyandiamide and 3-(3,4-dichlorophenyl)-1,1-dimethylurea were added, kneaded at that temperature for 30 to 40 minutes, and then taken out from the kneader, so that a resin composition was obtained.

(Binder Component C1)

As a binder component constituting a binder was used "POLYMENT" (registered trademark) SK-1000 produced by NIPPON SHOKUBAI Co., Ltd. Its main constituent is an acrylic polymer that has an aminoalkylene group in a side chain.

(Binder Component C2)

As a binder component constituting a binder was used "EPOCROS" (registered trademark) WS-700 produced by NIPPON SHOKUBAI Co., Ltd. Its main constituent is an acrylic polymer that has an oxazoline group in a side chain:

Conditions for Measuring Tensile Strength (Note 1) and Tensile Modulus (Note 2)

The determination was done by using the procedures described in Japanese Industrial Standard (JIS) R-7601 "Testing method for strands impregnated with resin." Strands impregnated with resin of the carbon fiber to be measured were formed by impregnating the carbon fiber with "BAKELITE" (registered trademark) ERL4221 (100 parts by mass)/boron trifluoride monoethylamine (3 parts by mass)/acetone (4 parts by mass) and then curing them at 130° C. for 30 minutes. The number of the strands to be measured was determined to be six and the averages of the respective measurement results were defined as the tensile strength and the tensile modulus of the carbon fiber.

(Note 3) Measurement Condition of Measurement of O/C

The determination was done in the following procedures by X-ray photoelectron spectroscopy. First, carbon fibers from the surface of which adherents or the like had been removed were cut into 20 mm and then spread and arranged on a copper sample support. Then, the inside of a sample chamber was held at $1 \times 10^9$ Torr by the use of AlK$\alpha$1, 2 as an X-ray source. The kinetic energy value (K.E.) of the primary peak of $C_{1s}$ was adjusted to 1202 eV as a correction value of a peak accompanying the electrification at the time of measurement. The area of the $C_{1s}$ peak was determined by drawing a straight baseline within a range of from 1191 to 1205 eV in K.E. The area of the $O_{1s}$ peak was determined by drawing a straight baseline within a range of from 947 to 959 eV in K.E.

The surface oxygen concentration was calculated as an atomic number ratio from the ratio of the $O_{1s}$ peak area and the $C_{1s}$ peak area using a sensitivity correction value that was inherent to an instrument. Model ES-200 manufactured by International Electric Co., Ltd., was used as an X-ray photoelectron spectrometer, and the sensitivity correction value was determined to be 1.74.

(Note 4) Measurement Condition of Amount of Attached Sizing Agent

About 5 g of carbon fibers to which a sizing agent had attached were taken as a sample and then were charged into a heat-resistant container. Next, this container was dried at 120° C. for 3 hours. After cooling to room temperature in a desiccator with care not to allow moisture absorption, the mass was measured, which was determined as $W_1$ (g). Subsequently, the sample was heated together with the container in a nitrogen atmosphere at 450° C. for 15 minutes and then cooled to room temperature in a desiccator with care not to allow moisture absorption, and then the mass was measured, which was determined as $W_2$ (g). Through the above treatments, the amount of the sizing agent attaching to the carbon fibers was determined by using the following formula.

$$\text{Attached amount (\% by mass)} = 100 \times \{(W_1 - W_2)/W_2\} \quad \text{(Formula)}$$

The measurement was conducted three times and the average thereof was adopted as an attached amount.

The criteria of evaluations of the carbon fiber base materials to be obtained in each Example are as follows.

(21) Total Process Time

The time taken from the steps (I) to (III) and the time taken from the steps (I) to (IV) were measured.

(22) Evaluation of Dispersion State of Reinforcing Fibers

A web was cut out in a square shape with a size of 50 mm×50 mm from an arbitrary part of the reinforcing fiber base material produced in the step (I) and it was observed with a microscope. Then, a state that ten or more carbon filament formed a bundle, that is, the number of bundles of carbon fibers with insufficient dispersion was measured. Measurement was conducted 20 times in this procedure and an average was calculated. Then, evaluation was done on the basis of the following criteria.

AA: There is less than one carbon fiber bundle with insufficient dispersion.

A: There are one or more and less than five carbon fiber bundles with insufficient dispersion.

B: There are five or more and less than ten carbon fiber bundles with insufficient dispersion.

C: There are ten or more carbon fiber bundles with insufficient dispersion.

(23) Handling Performance of Prepreg

The handling performance of a prepreg obtained was evaluated on the basis of the following criteria.

A: A carbon fiber base material and a matrix resin are integrated together and the handling performance is good.

B: A carbon fiber base material and a matrix resin are separated from each other and cautions are required for handling.

(24) Evaluation of the Mechanical Properties of a Molded Product

A resulting prepreg was cut into 200 mm×200 mm and was dried at 120° C. for one hour. A molded product with a thickness of 1.0 mm was prepared by laminating eight prepregs after drying, press molding the laminate under a pressure of 30 MPa for five minutes, and cooling it to 50° C.

while maintaining the pressure. By using the resulting molded product, flexural strength was evaluated at n=10 in accordance with the ISO178 method (1993). An evaluation result of the flexural strength was expressed in a relative value on an Example 1 base material of 100. The variation of the evaluation results was expressed in a coefficient of variation (CV value).

Example 101

Manufacture of Prepreg P1 by Wet Process

Figure 9:
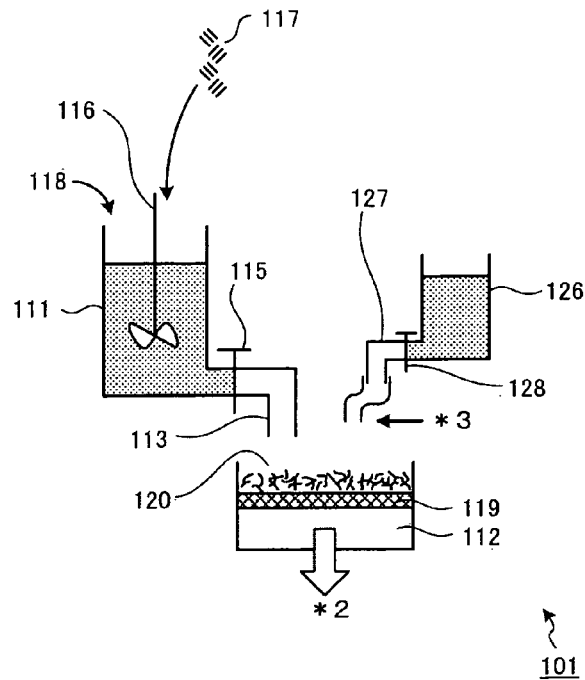
FIG. 9 is a schematic diagram illustrating one example of the apparatus for manufacturing a prepreg.

A prepreg P1 was produced by using an apparatus 101 of FIG. 9. The apparatus 101 is composed of a dispersion vessel 111, a papermaking vessel 112, and a binder vessel 126. The dispersion vessel 111 is a container in a cylindrical form of 300 mm in diameter and has a slurry transport portion 113 with an opening cock 115 at a lower portion of the container. As the papermaking vessel 112 is used a large-sized square-shaped sheet machine (No. 2553-I (commercial name), manufactured by Kumagai Riki Kogyo Co., Ltd.). The binder vessel 126 has a binder transport portion 127 with an opening cock 128 at a lower portion of the vessel. The opening of the binder transport portion 127 is located above the papermaking vessel 112. The binder transport portion 127 is movable and can sprinkle a binder uniformly on a reinforcing fiber base material 120. A stirrer 116 is mounted to the upper opening of the dispersion vessel 111 and a carbon fiber bundle 117 and a dispersion medium 118 can be charged through the opening. The bottom of the papermaking vessel 12 has a papermaking surface 119 (made of mesh sheet) of 400 mm in length and 400 mm in width, and a reinforcing fiber base material 120 is formed on the papermaking surface 119.

Carbon fiber A1 was cut into 6.4 mm with a cartridge cutter, so that chopped carbon fiber (A1-1) was obtained. A 1%-by-mass aqueous dispersion liquid (emulsion) of C1 had been produced as a binder solution and put into a binder vessel 126. Twenty liters of a dispersion liquid with a concentration of 0.1% by mass composed of water and a surfactant (polyoxyethylene lauryl ether (commercial name), produced by Nacalai Tesque, Inc.) was prepared and transferred to a dispersion vessel 111. 9.6 g of A1-1 (chopped carbon fiber) was added to this dispersion liquid, followed by stirring for 10 minutes. Thus, a slurry was prepared. The opening cock 115 provided at the lower portion of the dispersion vessel was, opened to pour the slurry into the papermaking vessel 112 and then water was aspirated to yield a carbon fiber base material of 400 mm in length and 400 mm in width (step (I)). Subsequently, an opening cock 128 of the binder vessel 126 was opened and 200 g of the binder solution was sprinkled from the upper side of the carbon fiber base material. An excess of the binder solution was aspirated, yielding a carbon fiber base material 120 to which a binder solution had been imparted. The carbon fiber base material 120 was taken out from the manufacture apparatus 101 and was dried at 150° C. for 20 minutes, yielding a carbon fiber base material W1 (step (II)). The basis weight of the carbon fiber base material W1 was 60 g/m². A non-woven fabric of B1 (resin basis weight: 30 g/m²) was arranged as a matrix resin on both sides of the carbon fiber base material W1 and then was pressurized at 220° C., 10 MPa, yielding a prepreg P1 in which the carbon fiber base material had been impregnated with the matrix resin (step (III)). The execution conditions of the respective steps and the evaluation results of the resulting prepreg are shown in Table 15.

Example 102

Manufacture of Prepreg P2 by Wet Process

Figure 10:
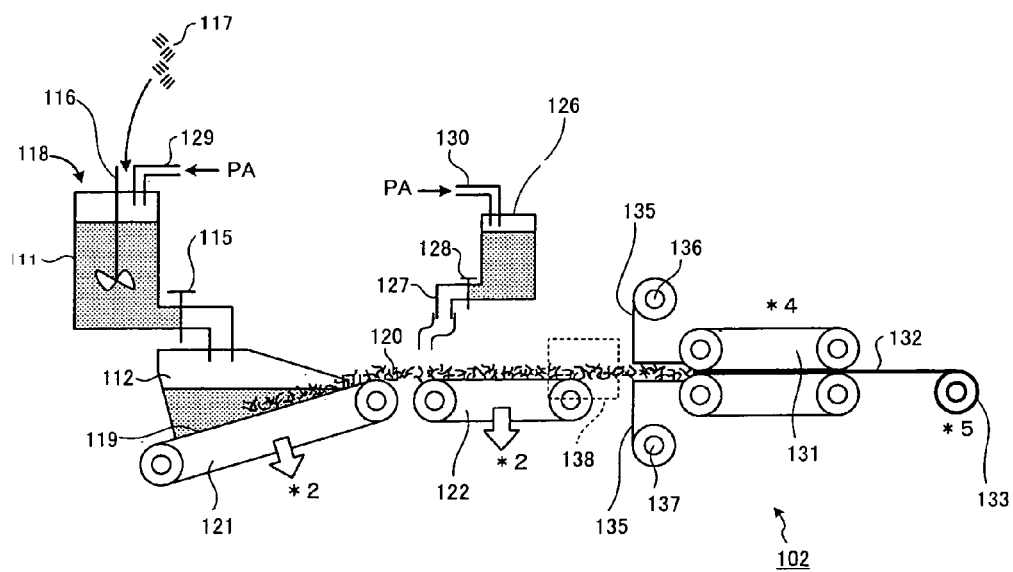
FIG. 10 is a schematic diagram illustrating one example of the apparatus for manufacturing a prepreg.

A prepreg was produced by using an apparatus 102 of FIG. 10. The apparatus 102 is composed of a dispersion layer 111, a papermaking vessel 112, a binder vessel 126, a conveyor 122, a dryer 138, a double belt press 131, and a winding machine 133. The dispersion vessel 111 is a container in a cylindrical form of 300 mm in diameter and has a slurry transport portion 113 with an opening cock 115 at a lower portion of the container, and a pressurized air tube 129 for supplying pressurized air into the vessel. The binder vessel 126 is provided with a binder transport portion 127 with an opening cock 128 at a lower portion of a container, and a pressurized air tube 130 for supplying pressurized air into the vessel. The papermaking vessel 112 has, at its bottom, a mesh conveyor 121 with a papermaking surface 119 having a width of 200 mm. The conveyor 122 is disposed following a mesh conveyor 121 and conveys a reinforcing fiber base material. The opening of the binder transport portion 127 is located above the conveyor 122. The dryer 138 dries the reinforcing fiber base material 120 on the conveyor 122. The double belt press 131 horizontally introduces the reinforcing fiber base material 120 conveyed by the conveyor 122. To the double belt press 131 are charged, together with the reinforcing fiber base material 120, a matrix resin 135 toward both sides of the reinforcing fiber base material 120 from rolls 136,137. The winding machine 133 winds the resulting prepreg 132.

Carbon fiber A1 was cut into 6.4 mm with a cartridge cutter, so that chopped carbon fiber (A1-1) was obtained.

A 1%-by-mass aqueous dispersion liquid (emulsion) of C1 had been produced as a binder solution and put into a binder vessel 126. Forty liters of a dispersion liquid with a concentration of 0.1% by mass composed of water and a surfactant (polyoxyethylene lauryl ether (commercial name), produced by Nacalai Tesque, Inc.) was prepared and transferred to a dispersion vessel 111. 20 g of A1-1 (chopped carbon fiber) was added to this dispersion liquid, followed by stirring for 10 minutes. Thus, a slurry was prepared. An opening cock 115 located at a lower portion of the dispersion vessel container was opened, and then while compressed air was introduced into the slurry container to keep the slurry flow rate constant, the slurry was poured to a mesh conveyor 121 having a papermaking surface with a width of 200 mm. The slurry was drawn with the mesh conveyor 121 at a rate of 1 m/min under suction of water, so that a carbon fiber base material 120 having a length of 5 m and a width of 200 mm was obtained (step (I)). Subsequently, an opening cock 128 of the binder vessel 126 was opened and 200 g of the binder solution was sprinkled to the upper side of the carbon fiber base material 120. After an excess binder solution was aspirated, the carbon fiber base material was made to pass through the dryer 138 of 200° C. in 3 minutes, so that a carbon fiber base material W2 was obtained (step (II)). The basis weight of the carbon fiber base material W2 was 20 g/m². The carbon fiber base material W2 was sent to a double belt press 131 by a conveyor 122 while being held online. A non-woven fabric of B1 (resin basis weight: 15 g/m²) was arranged as a matrix resin on both sides of the carbon fiber base material W1 and then was pressurized at 220° C., 5 MPa by the use of a double belt pressing machine 131, preparing a prepreg P2 in which the carbon fiber base material had been impregnated with the matrix resin (step (III)). It was then directly wound into a roll form at a winding rate of 1 m/min with a winding machine 133 (step (IV)). The execution conditions of the respective steps and the evaluation results of the resulting prepreg P2 are shown in Table 15.

Example 103

Manufacture of Prepreg P3 by Wet Process

A prepreg P3 was obtained by treating in the same manner as in Example 101, except for adjusting the water content of the reinforcing fiber base material of the step (II) to 20% by mass. The execution conditions of the respective steps and the evaluation results of the resulting prepreg. P3 are shown in Table 15.

Example 104

Manufacture of Prepreg P4 by Wet Process

A prepreg P4 was obtained by treating in the same manner as in Example 102, except for failing to perform the pressurization and the heating in the step (III). The execution conditions of the respective steps and the evaluation results of the resulting prepreg P4 are shown in Table 15.

Example 105

Manufacture of Prepreg P5 by Wet Process

A prepreg P5 was obtained by treating in the same manner as in Example 101, except for performing double belt press at 250° C. by using a non-woven fabric of B2 (30 g/m$^2$) as the matrix resin in the step (III). The execution conditions of the respective steps and the evaluation results of the resulting prepreg P5 are shown in Table 15.

Example 106

Manufacture of Prepreg P6 by Wet Process

A prepreg P6 was obtained by treating in the same manner as in Example 101, except for performing double belt press at 300° C. by using a non-woven fabric of B3 (30 g/m$^2$) as the matrix resin in the step (III). The execution conditions of the respective steps and the evaluation results of the resulting prepreg P6 are shown in Table 16.

Example 107

Manufacture of Prepreg P7 by Wet Process

A prepreg P7 was obtained by treating in the same manner as in Example 101, except for performing double belt press at 80° C. by using a film of B4 (30 g/m$^2$) as the matrix resin in the step (III). The execution conditions of the respective steps and the evaluation results of the resulting prepreg P7 are shown in Table 16.

Example 108

Manufacture of Prepreg P8 by Wet Process

Carbon fiber A3 was cut into 6.4 mm with a cartridge cutter, so that chopped carbon fiber (A3-1) was obtained. A prepreg 8 was obtained by treating in the same manner as in Example 101, except for using A3-1 as the chopped carbon fiber of step (I). The execution conditions of the respective steps and the evaluation results of the resulting prepreg P8 are shown in Table 16.

Example 109

Manufacture of Prepreg P9 by Wet Process

A prepreg P9 was obtained by treating in the same manner as in Example 101, except for using C2 as the binder of the step (II). The execution conditions of the respective steps and the evaluation results of the resulting prepreg P9 are shown in Table 16.

Comparative Example 101

Manufacture of Prepreg P10 by Wet Process

A prepreg P10 was obtained by treating in the same manner as in Example 101, except for performing the treatments of the steps (I), (II) and (III) offline. The execution conditions of the respective steps and the evaluation results of the resulting prepreg P10 are shown in Table 16.

TABLE 15

| | | | Example 101 | Example 102 | Example103 | Example 104 | Example 105 |
|---|---|---|---|---|---|---|---|
| Raw material | Reinforcing fiber | Kind | A1 | A1 | A1 | A1 | A1 |
| | | Cutting length [mm] | 6.4 | 6.4 | 6.4 | 6.4 | 6.4 |
| | | Incorporated amount [% by mass] | 49.5 | 49.5 | 49.5 | 49.5 | 49.5 |
| | Binder | Kind | C1 | C1 | C1 | C1 | C1 |
| | | Incorporated amount [% by mass] | 1 | 1 | 1 | 1 | 1 |
| | Matrix resin | Kind | B1 | B1 | B1 | B1 | B2 |
| | | Form | Non-woven fabric | Non-woven fabric | Non-woven fabric | Non-woven fabric | Non-woven fabric |
| | | Incorporated amount [% by mass] | 49.5 | 49.5 | 49.5 | 49.5 | 49.5 |
| Step conditions | Step (I) | Solid concentration of slurry [% by mass] | 0.05 | 0.05 | 0.05 | 0.05 | 0.05 |
| | | Mass per unit area [g/m$^2$] of a reinforcing fiber base material | 60 | 60 | 60 | 60 | 60 |
| | | Water content of a reinforcing fiber base [% by mass] | 8 | 8 | 20 | 8 | 8 |
| | | Reinforcing fiber/solid concentration [% by mass] | 100 | 100 | 100 | 100 | 100 |
| | Step (II) | Heating step after imparting binder | Yes | Yes | Yes (time twice) | Yes | Yes |
| | Step (III) | Pressurization step | Yes | Yes | Yes | No | Yes |
| | | Heating step | Yes | Yes | Yes | No | Yes |
| | | Reinforcing fiber length [mm] | 5 | 5 | 5 | 6.4 | 5 |

TABLE 15-continued

|  |  |  | Example 101 | Example 102 | Example103 | Example 104 | Example 105 |
|---|---|---|---|---|---|---|---|
|  | Step (IV) | Winding step | — | Yes | — | Yes | — |
|  | Online step |  | (I)-(II) | (I)-(II)-(III)-(IV) | (I)-(II) | (I)-(II)-(III)-(IV) | (I)-(II) |
|  | Offline step |  | (III) | — | (III) | — | (III) |
| Evaluation | Total process time | [min] | 40 | 30 | 50 | 30 | 40 |
|  | Reinforcing fiber dispersion state | AA, A, B, C | AA | AA | AA | AA | AA |
|  | Handeability of forming base material | A, B | A | A | A | B | A |
|  | Flexural strength | Relative value | 100 | 100 | 100 | 100 | 150 |
|  | Coefficient of variation | % | 3 | 3 | 3 | 3 | 3 |

TABLE 16

|  |  |  | Example 106 | Example 107 | Example 108 | Example 109 | Comparative Example 101 |
|---|---|---|---|---|---|---|---|
| Raw material | Reinforcing fiber | Kind | A1 | A1 | A3 | A1 | A1 |
|  |  | Cutting length [mm] | 6.4 | 6.4 | 6.4 | 6.4 | 6.4 |
|  |  | Incorporated amount [% by mass] | 49.5 | 49.5 | 49.5 | 49.5 | 49.5 |
|  | Binder | Kind | C1 | C1 | C1 | C2 | C1 |
|  |  | Incorporated amount [% by mass] | 1 | 1 | 1 | 1 | 1 |
|  | Matrix resin | Kind | B3 | B4 | B1 | B1 | B1 |
|  |  | Form | Non-woven fabric | Film | Non-woven fabric | Non-woven fabric | Non-woven fabric |
|  |  | Incorporated amount [% by mass] | 49.5 | 49.5 | 49.5 | 49.5 | 49.5 |
| Step conditions | Step (I) | Solid concentration of slurry [% by mass] | 0.05 | 0.05 | 0.05 | 0.05 | 0.05 |
|  |  | Mass per unit area [g/m$^2$] of a reinforcing fiber base material | 60 | 60 | 60 | 60 | 60 |
|  |  | Water content of a reinforcing fiber base [% by mass] | 8 | 8 | 8 | 8 | 8 |
|  |  | Reinforcing fiber/solid concentration [% by mass] | 100 | 100 | 100 | 100 | 100 |
|  | Step (II) | Heating step after imparting binder | Yes | Yes | Yes | Yes | Yes |
|  | Step (III) | Pressurization step | Yes | Yes | Yes | Yes | Yes |
|  |  | Heating step | Yes | Yes | Yes | Yes | Yes |
|  |  | Reinforcing fiber length [mm] | 5 | 5 | 5 | 5 | 5 |
|  | Step (IV) | Winding step | — | — | — | — | — |
|  | Online step |  | (I)-(II) | (I)-(II) | (I)-(II) | (I)-(II) | — |
|  | Offline step |  | (III) | (III) | (III) | (III) | (I)-(II)-(III) |
| Evaluation | Total process time | [min] | 40 | 40 | 40 | 40 | 70 |
|  | Reinforcing fiber dispersion state | AA, A, B, C | AA | AA | AA | AA | B |
|  | Handeability of forming base material | A, B | A | A | A | A | A |
|  | Flexural strength | Relative value | 140 | 130 | 90 | 100 | 90 |
|  | Coefficient of variation | % | 3 | 3 | 3 | 3 | 10 |

As is clear from Table 15 and Table 16, a prepreg that was superior in dispersion state and could maintain high mechanical properties when being processed into a molded product can be obtained in a short time in each of Examples 101 to 109. It became clear that it was possible to prevent reinforcing fibers from sedimenting or floccurating in transportation by performing the steps (I) to (II) online (see Examples 101 to 109 and Comparative Example 101).

Moreover, a prepreg was obtained successfully in a shorter time by performing the steps (I) to (III) and the step (IV) that may be provided if necessary (see Examples 101, 102, and 104).

It became clear that the heating step after the impartation of a binder could be finished in a short time by adjusting the water content of the carbon fiber base material in the step (II) to 10% by mass or less (see Examples 101, and 103).

It became clear that a matrix resin penetrates a reinforcing fiber base material efficiently and the mechanical properties of a prepreg to be obtained could be maintained higher by performing the pressurization and the heating in the step (III) (see Examples 102, and 103).

If the pressurization and the heating in the step (II) are not performed, the handleability of a prepreg deteriorates a little but a process time can be shortened greatly because a matrix resin fails to penetrate a matrix resin a reinforcing fiber base material. (Example 104)

It was also found that the above-mentioned effects are obtained equally regardless of the kinds of a reinforcing fiber, a matrix resin and a binder (see Examples 101, 105 to 109).

Example 110

Manufacture of Prepreg P11 by Dry Process

Figure 11:
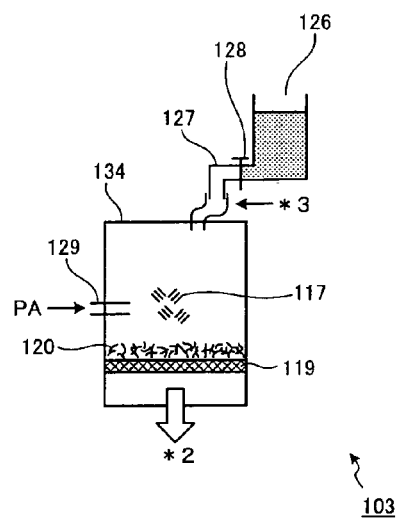
FIG. 11 is a schematic diagram illustrating one example of the apparatus for manufacturing a prepreg.

A prepreg P5 was produced by using a manufacture apparatus 103 of FIG. 11. The manufacture apparatus 103 was composed of a binder vessel 126 and a dispersion papermaking vessel 134. The dispersion papermaking vessel 134 is a container of 400 mm in length, 400 mm in width, and 400 mm in height and is equipped with a pressurized air tube 29 through which the air can be aspirated and a papermaking surface 119 in the bottom portion. The papermaking surface 119 is a mesh sheet of a size of 400 mm in length and 400 mm in width, and a carbon fiber base material 120 is to be obtained on this papermaking surface 119. The binder vessel 126 has a binder transport portion 127 with an opening cock 128. The opening of the binder transport portion 127 is located above the dispersion papermaking vessel 112. Moreover, the binder transport portion 127 is movable and can sprinkle a binder uniformly on a carbon fiber base material 120 in the dispersion papermaking vessel 134.

Carbon fiber A2 was cut into 6.4 mm with a cartridge cutter, so that chopped carbon fiber (A2-1) was obtained. A 1%-by-mass aqueous dispersion liquid of C1 had been produced as a binder solution and put into a binder vessel 126. Into the dispersion papermaking vessel 134 were charged 9.6 g of chopped carbon fibers (A2-1), which were opened by spraying pressurized air. Then, the air was aspirated through the bottom surface and thereby the opened fibers were accumulated on the bottom surface, so that a carbon fiber base material of 400 mm in length and 400 mm in width (step (I)). Subsequently, an opening cock 128 of the binder vessel 126 was opened and 200 g of the binder was sprinkled from the upper side of the carbon fiber base material. An excess of the binder solution was aspirated, yielding a carbon fiber base material to which a binder solution had been imparted. The carbon fiber base material was taken out and was dried at 150° C. for 20 minutes, yielding a carbon fiber base material W11 (step (II)). The basis weight of the carbon fiber base material W11 was 60 g/m². A non-woven fabric of B-1 (resin basis weight: 30 g/m²) was arranged as a matrix resin on both sides of the carbon fiber base material and then was pressurized at 220° C., 10 MPa, yielding a prepreg P5 in which the carbon fiber base material had been impregnated with the matrix resin (step (III)). The execution conditions of the respective steps and the evaluation results of the resulting prepreg P11 are shown in Table 17.

Example 111

Manufacture of Prepreg P12 by Dry Process

Figure 12:
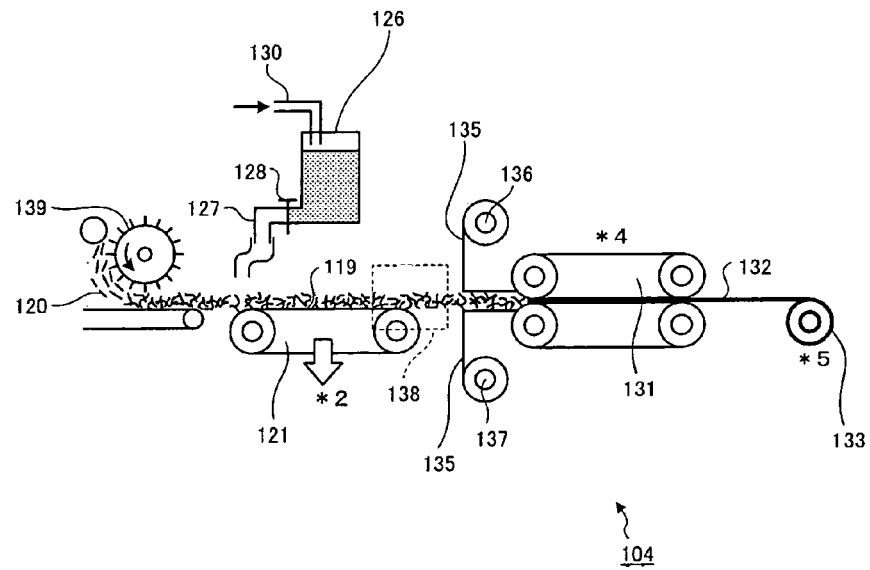
FIG. 12 is a schematic diagram illustrating one example of the apparatus for manufacturing a prepreg.

A prepreg P6 was produced by using an apparatus 104 of FIG. 12. The manufacture apparatus 104 has a carding machine 139 which is to perform dispersion of a reinforcing fiber bundle, a mesh conveyer 121 which has at the bottom a papermaking surface of 200 mm in width, a binder vessel 126 with an opening cock 128 at a lower portion of a container and a binder transport portion 127 which opens above the mesh conveyor 121, a double belt press 131 that can horizontally introduce a carbon fiber base material 120 conveyed by the conveyor 122, a dryer 138 for drying the carbon fiber base material 120 on the conveyor 122, and a winding roll 133 capable of winding a prepreg to be obtained.

Carbon fiber A2 was cut into 6.4 mm with a cartridge cutter, so that chopped carbon fiber (A2-1) was obtained. A 1%-by-mass aqueous dispersion liquid of C1 had been produced as a binder solution and put into a binder vessel 126. The carding machine 139 was charged with 6 g of A2-1 (chopped carbon fibers) uniformly over 30 seconds, and a carbon fiber base material of 200 mm in width was hauled while maintaining the carding speed at 1 m/min. Subsequently, the opening cock 128 of the binder vessel 126 was opened, and 200 g of a binder was sprayed onto the upper side of the carbon fiber base material running on the conveyor over 30 seconds. An excess of the binder solution was aspirated online, and then the resultant was allowed to pass through a drying oven of 200° C. in 3 minutes, so that a carbon fiber base material W12 was obtained. The basis weight of the carbon fiber base material W12 was 60 g/m². While the carbon fiber base material was held online, a non-woven fabric of B-1 (resin basis weight: 15 g/m²) was arranged as a matrix resin on both sides of the carbon fiber base material and then was pressurized at 220° C., 5 MPa by the use of a double belt press, preparing a prepreg P6 in which the carbon fiber base material had been impregnated with the matrix resin. It was wound up as it was into the form of a roll at with winding machine 133 at a winding rate of 1 m/min. The execution conditions of the respective steps and the evaluation results of the resulting prepreg P12 are shown in Table 17.

Example 112

Manufacture of Prepreg P13 by Dry Process

A prepreg P13 was obtained by treating in the same manner as in Example 106, except for failing to perform the pressurization and the heating in the step (III). The execution conditions of the respective steps and the evaluation results of the resulting prepreg P13 are shown in Table 17.

Comparative Example 102

Manufacture of Prepreg P12 by Dry Process

A prepreg P14 was obtained by treating in the same manner as in Example 1, except for performing the treatments of the steps (I), (II) and (III) offline. The execution conditions of the respective steps and the evaluation results of the resulting prepreg P14 are shown in Table 17.

TABLE 17

| | | | Example 110 | Example 111 | Example 112 | Comparative Example 102 |
|---|---|---|---|---|---|---|
| Raw material | Reinforcing fiber | Kind | A2 | A2 | A1 | A1 |
| | | Cutting length [mm] | 6.4 | 6.4 | 6.4 | 6.4 |
| | | Incorporated amount [% by mass] | 49.5 | 49.5 | 49.5 | 49.5 |
| | Binder | Kind | C1 | C1 | C1 | C1 |
| | | Incorporated amount [% by mass] | 1 | 1 | 1 | 1 |
| | Matrix resin | Kind | B1 | B1 | B1 | B1 |
| | | Form | Non-woven fabric | Non-woven fabric | Non-woven fabric | Non-woven fabric |
| | | Incorporated amount [% by mass] | 49.5 | 49.5 | 49.5 | 49.5 |

TABLE 17-continued

|  |  |  | Example 110 | Example 111 | Example 112 | Comparative Example 102 |
|---|---|---|---|---|---|---|
| Step conditions | Step (I) | Opening system | Air opening | Carding | Carding | Air opening |
|  |  | Mass per unit area [g/m²] of a reinforcing fiber base material | 60 | 60 | 60 | 60 |
|  |  | Reinforcing fiber/solid concentration [% by mass] | 100 | 100 | 100 | 100 |
|  | Step (II) | Heating step after imparting binder | Yes | Yes | Yes | Yes |
|  | Step (III) | Pressurization step | Yes | Yes | Yes | Yes |
|  |  | Heating step | Yes | Yes | No | Yes |
|  |  | Reinforcing fiber length [mm] | 5 | 5 | 5 | 5 |
|  | Step (IV) | Winding step | — | Yes | No | — |
|  | Online step |  | (I)-(II) | (I)-(II)-(III)-(IV) | (I)-(II)-(III)-(IV) | — |
|  | Offline step |  | (III) | — | — | (I)-(II)-(III) |
| Evaluation | Total process time | [min] | 20 | 15 | 13 | 30 |
|  | Reinforcing fiber dispersion state | AA, A, B, C | A | A | A | B |
|  | Handeability of forming base material | A, B | A | A | A | A |
|  | Flexural strength | Relative value | 100 | 100 | 100 | 90 |
|  | Coefficient of variation | % | 5 | 5 | 5 | 10 |

As is clear from Table 17, a prepreg that was superior in dispersion state of carbon fibers and could maintain high mechanical properties when being processed into a molded product can be obtained in a short time in each of Examples 110 to 112. It became clear that it was possible to prevent reinforcing fibers from sedimenting or floccurating in transportation by performing the steps (I) to (II) online (see Examples 110 to 112 and Comparative Example 2).

Moreover, a prepreg was obtained successfully in a shorter time by performing the steps (I) to (III) and the step (IV) that may be provided if necessary (see Examples 110 to 112).

It became clear that a matrix resin penetrates a fiber reinforced base material efficiently and the mechanical properties of a prepreg to be obtained could be maintained more higher by performing the pressurization and the heating in the step (III) (see Examples 111 and 112).

[Evaluation of the Method for Manufacturing Reinforcing Fiber Base Material by Wet Process]

(Raw Materials Used for Examples)

(Carbon Fiber A4) PAN Type Carbon Fiber

An acrylic fiber bundle having a filament denier of 1d and the number of filaments of 12,000 was obtained by the dry-wet type spinning process using a copolymer composed of 99.4 mol % of acrylonitrile (AN) and 0.6 mol % of methacrylic acid. The resulting acrylic fiber bundle was heated in a draw ratio of 1.05 in the air of a temperature of from 240 to 280° C. to convert it to flame-resistant fibers, and then 10% draw was applied in a nitrogen atmosphere within a temperature range of from 300 to 900° C. at a temperature elevation rate of 200° C./min, followed by calcination with a temperature elevation up to 1300° C. The carbon fiber bundle was subjected to electrolytic surface treatment of 3 coulombs per gram of the carbon fibers using an aqueous solution containing sulfuric acid as an electrolyte. Furthermore, a sizing agent was imparted by a dipping process and then dried in hot air at a temperature of 120° C., yielding PAN type carbon fibers A4.

| Total number of filaments | 12,000 |
|---|---|
| Filament diameter | 7 μm |
| Mass per unit length | 0.8 g/m |
| Specific gravity | 1.8 g/cm³ |
| Tensile strength (Note 5) | 4.2 GPa |
| Tensile modulus (Note 6) | 230 GPa |
| O/C (Note 7) | 0.10 |
| Kind of sizing | Polyoxyethylene oleyl ether |
| Amount of attached sizing (Note 8) | 1.5% by mass |

(Carbon Fiber A5) PAN Type Carbon Fiber

An acrylic fiber bundle having a filament denier of 1d and the number of filaments of 12,000 was obtained by the dry-wet type spinning process using a copolymer composed of 99.4 mol % of acrylonitrile (AN) and 0.6 mol % of methacrylic acid. The resulting acrylic fiber bundle was heated in a draw ratio of 1.05 in the air of a temperature of from 240 to 280° C. to convert it to flame-resistant fibers, and then 10% draw was applied in a nitrogen atmosphere within a temperature range of from 300 to 900° C. at a temperature elevation rate of 200° C./min, followed by calcination with a temperature elevation up to 1300° C. Furthermore, a sizing agent was imparted by a dipping process and then dried in hot air at a temperature of 120° C., yielding PAN type carbon fibers A5.

| Total number of filaments | 12,000 |
|---|---|
| Filament diameter | 7 μm |
| Mass per unit length | 0.8 g/m |
| Specific gravity | 1.8 g/cm³ |
| Tensile strength (Note 5) | 4.2 GPa |
| Tensile modulus (Note 6) | 230 GPa |
| O/C (Note 7) | 0.05 |
| Kind of sizing | Polyoxyethylene oleyl ether |
| Amount of attached sizing (Note 8) | 1.5% by mass |

(Film F) Acid-Modified Polypropylene Resin Film

An acid-modified polypropylene resin film F of 50 μm was produced by press molding an acid-modified polypropylene resin "ADMER" (registered trademark) QE510 produced by Mitsui Chemicals, Inc., (specific gravity: 0.91, melting point: 160° C.) at a temperature of 200° C. and pressure of 20 MPa for 1 minute.

Conditions of Measurement of (Note 5) Tensile Strength, and (Note 6) Tensile Modulus The condition is the same as the foregoing (Note 1) and (Note 2).

(Note 7) Measurement of O/C

The measurement is the same as the foregoing (Note 3).

(Note 8) Conditions of Measurement of the Amount of Attached Sizing Agent

The conditions are the same as the foregoing (Note 4).

(25) (i)-(iv) Process Time

The time required from step (i) to step (iv) was measured.

(26) Evaluation of the Dispersion State of Reinforcing Fibers

A web was cut out in a square shape with a size of 50 mm×50 mm from an arbitrary part of the carbon fiber base material produced by papermaking and it was observed with a microscope. Then, a state that ten or more carbon filament formed a bundle, that is, the number of bundles of carbon fibers with insufficient dispersion was measured. Measurement was conducted 20 times in this procedure and an average was calculated. Then, evaluation was done on the basis of the following criteria.

AA: There is less than one carbon fiber bundle with insufficient dispersion.

A: There are one or more and less than five carbon fiber bundles with insufficient dispersion.

B: There are five or more and less than ten carbon fiber bundles with insufficient dispersion.

C: There are ten or more carbon fiber bundles with insufficient dispersion.

(27) Evaluation of the Mechanical Properties of Molded Product

A carbon fiber base material obtained by papermaking was cut into 200 mm×200 mm and was dried at 120° C. for one hour. The carbon fiber base material after drying and acid-modified polypropylene resin films F were three-layer laminated so as to form resin film F/carbon fiber base material/resin film F. The laminate was press molded at a temperature of 200° C. and a pressure of 30 MPa for 5 minutes and then it was cooled to 50° C. while maintaining the pressure, so that a carbon fiber-reinforced resin sheet with a thickness of 0.12 mm was produced. A carbon fiber-reinforced resin molded product with a thickness of 1.0 mm was prepared by laminating eight sheets of that resin sheet, press molding the laminate at a temperature of 200° C. and a pressure of 30 MPa for 5 minutes, and cooling it to 50° C. while maintaining the pressure. By using the resulting molded product, flexural strength was evaluated at n=10 in accordance with the ISO178 method (1993). An evaluation result of the flexural strength was expressed in a relative value on an Example 1 base material of 100. The variation of the evaluation results was expressed in a coefficient of variation (CV value).

(28) Evaluation of the Viscosity of Dispersion Medium

A beaker was filled up with a dispersion medium, sealed hermetically, and then adjusted to 25° C. in a thermostatic bath. A matching No. 1 rotor had been adjusted in advance to 25° C. within the thermostatic bath. Then, the viscosity of the dispersion medium was measured at a rotor rotation speed of 60 rpm in accordance with the method disclosed in Attachment 1 of JISK7117-1 (1999) by using a B type viscometer (Model: B8L, manufactured by Tokyo Keiki Inc.). The measurement was conducted five times and the average thereof was adopted as the viscosity.

(29) Evaluation of Slurry Flow Rate of Transport Portion

When a slurry was transported from a dispersion vessel to a papermaking vessel via a transport portion, there was measured a time T (second) taken for transporting 0.01 m³ of the slurry. Using the transported amount of the slurry (0.01 m³), the time T taken for the transportation, and the cross-sectional area of the inner diameter of the transport portion S (m²), the slurry flow rate of the transport portion was determined from the following formula.

$$\text{Slurry flow rate (m/s)} = 0.01/(S \times T) \quad \text{(Formula)}$$

The measurement was conducted five times and the average thereof was adopted as the slurry flow rate.

[Evaluation of Method a for Manufacturing a Reinforcing Fiber Base Material by Wet Process]

Production Example 201

Figure 22:
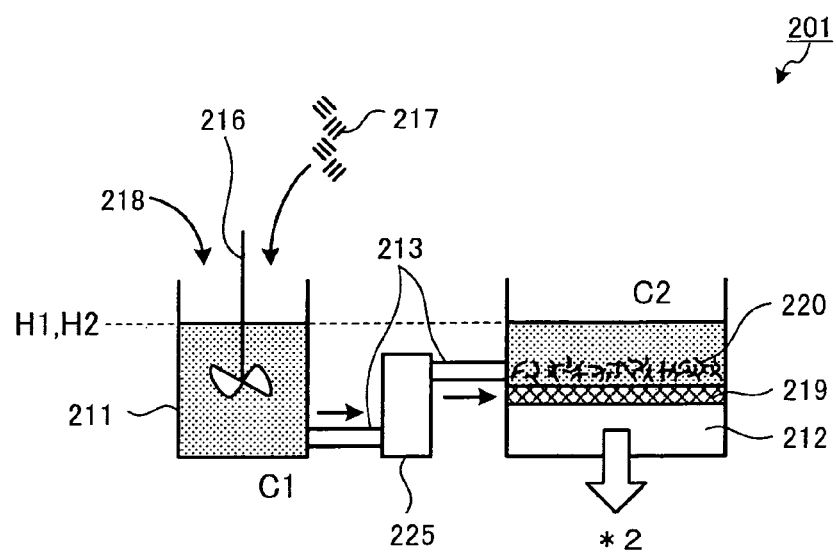
FIG. 22 is a schematic diagram illustrating one example of the apparatus for manufacturing a reinforcing fiber base material (papermaking base material).

A reinforcing fiber base material was produced by using an apparatus 201 for manufacturing a reinforcing fiber base material (papermaking base material) of FIG. 22. The manufacture apparatus 201 is composed of a dispersion vessel 211, a papermaking vessel 212, and a transport portion 213. The dispersion vessel 211 is a container in a cylindrical form of 300 mm in diameter and is equipped with a stirrer 216 in the upper opening of the top opening, and a carbon fiber bundle 217 and a dispersion liquid (dispersion medium) 218 can be charged through the opening. As the papermaking vessel 212 is used a large-sized square-shaped sheet machine (No. 2553-I (commercial name), manufactured by Kumagai Riki Kogyo Co., Ltd.). The bottom of the papermaking vessel 212 is equipped with a papermaking surface (made of mesh sheet) 219 of 400 mm in length and 400 min in width. A carbon fiber base material 220 is obtained on the papermaking surface 219. The transport portion 213 is a level and linear passage that connects the dispersion vessel 211 and the papermaking vessel 212 and is provided with a liquid transfer pump (diaphragm pump) 225 in the middle of the passage.

Carbon fiber A4 was cut into 6.4 mm with a cartridge cutter, so that chopped carbon fiber A4-1 was obtained. Twenty liters of a dispersion liquid with a concentration of 0.1% by mass composed of water and a surfactant (polyoxyethylene lauryl ether (commercial name), produced by Nacalai Tesque, Inc.) was prepared and transferred to a dispersion vessel 211. To this dispersion liquid was charged 9.6 g of chopped carbon fiber A4-1 (step (i)). A slurry was prepared by stirring for 10 minutes (step (ii)). Then, the slurry was started to be poured into the papermaking vessel 212 (supply rate of slurry: 0.001 m³/sec) via the transport portion 213 by using the diaphragm pump 225 (step (iii)). Subsequently, water was aspirated, yielding a carbon fiber base material 220 of 400 mm in length and 400 mm in width (step (iv)). The basis weight of the carbon fiber base material was 60 g/m². The execution conditions of the respective steps and the evaluation results of the resulting carbon fiber base material are shown in Table 18.

Production Example 202

A carbon fiber base material was obtained by treating in the same manner as in Production Example 201, except for increasing the mass content C1 of the chopped carbon fiber A1-1 in the slurry to be prepared in the step (ii) to 1.5% by mass. The basis weight of the carbon fiber base material was 60 g/m². The execution conditions of the respective steps and the evaluation results of the resulting carbon fiber base material are shown in Table 18.

Production Example 203

Figure 23:
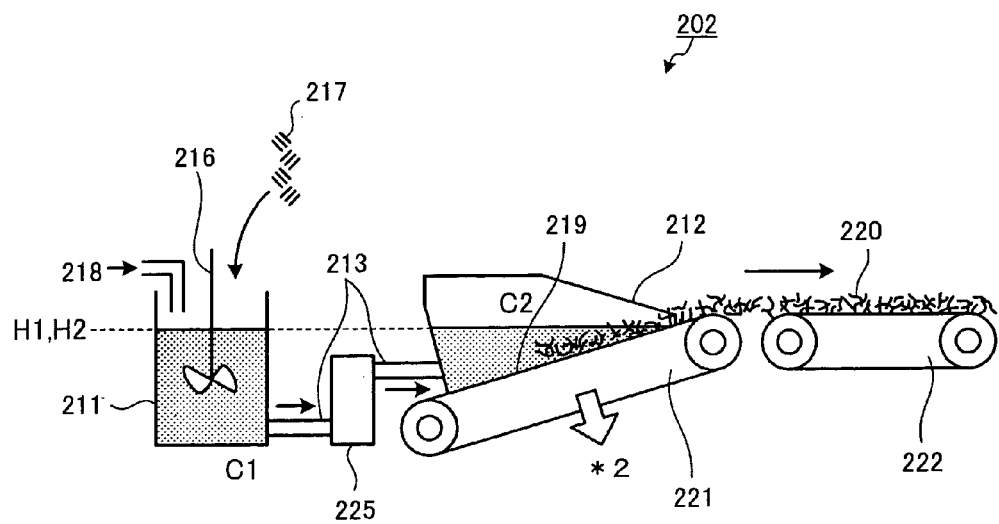
FIG. 23 is a schematic diagram illustrating one example of the apparatus for manufacturing a reinforcing fiber base material (papermaking base material).

A reinforcing fiber base material was produced by using an apparatus 202 for manufacturing a reinforcing fiber base material (papermaking base material) of FIG. 23. The manufacture apparatus 202 is composed of a dispersion vessel 211, a papermaking vessel 212, a transport portion 213, and a conveyor 222. The dispersion vessel 211 and the transport portion 213 are the same as those of the manufacture apparatus 201. The papermaking vessel 212 has, at its bottom, a mesh conveyor 221 with a papermaking surface 219 having a width of 200 mm. A carbon fiber base material 220 is obtained on the papermaking surface 219. The conveyor 222 is disposed following a mesh conveyor 221 and conveys the reinforcing fiber base material 220.

Carbon fiber A4 was cut into 6.4 mm with a cartridge cutter, so that chopped carbon fiber A4-1 was obtained. A dispersion liquid with a concentration of 0.1% by mass composed of water and a surfactant (polyoxyethylene lauryl ether (commercial name), produced by Nacalai Tesque, Inc.) was prepared. The dispersion liquid and the chopped carbon fiber A4-1 were started to be charged into the dispersion vessel 211. The charging of the dispersion liquid and the chopped carbon fibers were continued continuously while adjusting the charging amount so that the carbon fiber concentration in the slurry in the dispersion vessel might be a fixed concentration and the level H1 of the surface of the slurry in the dispersion vessel might be fixed during the production (step (i)). At the same time when the raw materials were started to be charged into the container, stirring was started and a slurry was prepared (step (ii)). Then, the slurry poured into the papermaking vessel 212 (supply rate of slurry: 0.0014 m$^3$/sec) via the transport portion 213 by using the diaphragm pump 225 (step (iii)). By aspirating water from the slurry: and the resultant was hauled at a rate of 10 m/min, a carbon fiber base material 220 of 200 mm in width was obtained continuously (step iv). The basis weight of the carbon fiber base material was 20 g/m$^2$. The execution conditions of the respective steps and the evaluation results of the resulting carbon fiber base material are shown in Table 18.

Production Example 204

Figure 24:
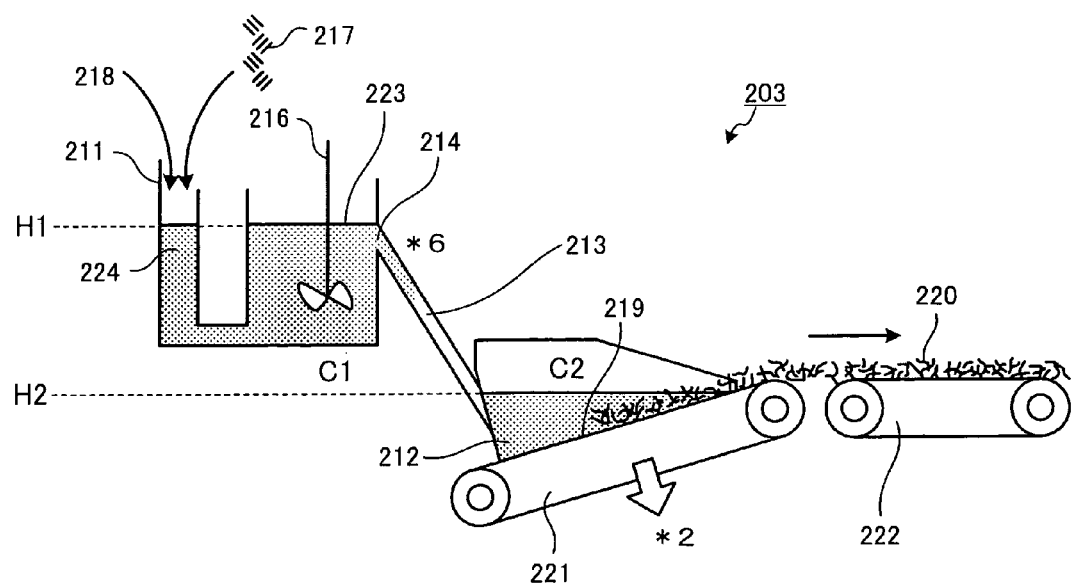
FIG. 24 is a schematic diagram illustrating one example of the apparatus for manufacturing a reinforcing fiber base material (papermaking base material).

A reinforcing fiber base material was produced by using an apparatus 203 for manufacturing a reinforcing fiber base material (papermaking base material) of FIG. 24. The manufacture apparatus 203 is composed of a dispersion vessel 211, a papermaking vessel 212, a transport portion 213, and a conveyor 222. The papermaking vessel 212 and the conveyor 222 are the same as those of the manufacture apparatus 202. The dispersion vessel 211 is in a recessed shape having two openings (a wide opening 223 and a narrow opening 224) in its top surface and is equipped with a stirrer 216 in the wide opening 223. The transport portion 213 inclines downward from the dispersion vessel 211 toward the papermaking vessel 212 (inclination angle: 45°), but has no liquid transfer pump 225 in the midway. A connecting part 214 of the transport portion 213 to the dispersion vessel 211 is located at an upper part (near the openings) of the dispersion vessel 211, and the liquid transfer from the dispersion vessel 211 to the papermaking vessel 212 is performed in a overflow system.

By using the above-mentioned manufacture apparatus 203, chopped carbon fibers A4-1 and a dispersion liquid with a concentration of 0.1% by mass composed of water and a surfactant (polyoxyethylene lauryl ether (commercial name), produced by Nacalai Tesque, Inc.) were charged through the narrow opening. Then, a carbon fiber base material was obtained by treating in the same manner as in Example 203. The basis weight of the resulting carbon fiber base material was 20 g m$^2$. The execution conditions of the respective steps and the evaluation results of the resulting carbon fiber base material are shown in Table 18.

Production Example 205

A carbon fiber base material was obtained by treating in the same manner as in Production Example 204 except for changing the ratio W1/W2 of the width W1 of the transport portion to the width W2 of the carbon fiber base material from 0.6 to 0.2. The basis weight of the resulting carbon fiber base material was 20 g/m$^2$. The execution conditions of the respective steps and the evaluation results of the resulting carbon fiber base material are shown in Table 19.

Production Example 206

A carbon fiber base material was obtained by treating as in the same manner as in Production Example 201 except for changing the kind of carbon fiber from A4 to A5. The basis weight of the resulting carbon fiber base material was 60 g/m$^2$. The execution conditions of the respective steps and the evaluation results of the resulting carbon fiber base material are shown in Table 19.

Production Example 207

A carbon fiber base material was obtained by treating in the same manner as in Production Example 201, except for adjusting the time taken for the step (ii) to 5 minutes (adjusting the time of stirring for slurry preparation to 5 minutes). The basis weight of the carbon fiber base material was 60 g/m$^2$. The execution conditions of the respective steps and the evaluation results of the resulting carbon fiber base material are shown in Table 19.

Comparative Production Example 201

A carbon fiber base material was obtained by treating in the same manner as in Production Example 202, except for increasing the ratio C1/C2 of the mass content C1 of the chopped carbon fibers A4-1 in the slurry to be prepared in the step (ii) to, the mass content C2 of the chopped carbon fibers A4-1 in the slurry at the commencement of the step (iv) to 1.8. The execution conditions of the respective steps and the evaluation results of the resulting carbon fiber base material are shown in Table 19.

TABLE 18

|  |  |  | Production Example 201 | Production Example 202 | Production Example 203 | Production Example 204 |
| --- | --- | --- | --- | --- | --- | --- |
| Raw material | Reinforcing fiber | Kind | A4 (O/C = 0.10) | A4 (O/C = 0.10) | A4 (O/C = 0.10) | A4 (O/C = 0.10) |
|  |  | Cutting length [mm] | 6.4 | 6.4 | 6.4 | 6.4 |
| Step conditions | Step (i) | Raw material supplement | No | No | Yes | Yes |
|  | Step (ii) | Mass per unit area [g/m$^2$] of a reinforcing fiber base material | 60 | 60 | 20 | 20 |

TABLE 18-continued

|  |  |  | Production Example 201 | Production Example 202 | Production Example 203 | Production Example 204 |
|---|---|---|---|---|---|---|
|  |  | Reinforcing fiber content C1 [% by mass] | 0.05 | 1.5 | 0.05 | 0.05 |
|  | Step (iii) | Position of slurry surface level H1 | Varied | Varied | Fixed | Fixed |
|  |  | Slurry surface level H1-H2 [m] | 0 | 0 | 0 | 0.5 |
|  |  | Use of liquid transfer pump | Yes | Yes | Yes | No |
|  |  | W1/W2 ratio | 0.6 | 0.6 | 0.6 | 0.6 |
|  |  | C1/C2 ratio | 1.0 | 1.0 | 1.0 | 1.0 |
|  | Online step |  | (i)-(ii) | (i)-(ii) | (i)-(ii)-(iii)-(iv) | (i)-(ii)-(iii)-(iv) |
|  | Offline step |  | (iii), (iv) | (iii), (iv) | — | — |
|  | Hauling rate | [m/min] | — | — | 10 | 10 |
|  | (I) to (IV) process time | [min] | 20 | 30 | 5 | 5 |
| Evaluation | Reinforcing fiber dispersion state | AA, A, B, C | A-AA | A | AA | AA |
|  | Flexural strength | Relative value | 100 | 100 | 100 | 100 |
|  | Coefficient of variation | % | 3 | 5 | 3 | 3 |

TABLE 19

|  |  |  | Production Example 205 | Production Example 206 | Production Example 207 | Comparative Production Example 201 |
|---|---|---|---|---|---|---|
| Raw material | Reinforcing fiber | Kind | A4 (O/C = 0.10) | A5 (O/C = 0.05) | A4 (O/C = 0.10) | A4 (O/C = 0.10) |
|  |  | Cutting length [mm] | 6.4 | 6.4 | 6.4 | 6.4 |
| Step conditions | Step (i) | Raw material supplement | Yes | No | No | No |
|  | Step (ii) | Mass per unit area [g/m$^2$] of a reinforcing fiber base material | 20 | 60 | 60 | 60 |
|  |  | Reinforcing fiber content C1 [% by mass] | 0.05 | 0.05 | 0.05 | 1.5 |
|  | Step (iii) | Position of slurry surface level H1 | Fixed | Varied | Varied | Varied |
|  |  | Slurry surface level H1-H2 [m] | 0.5 | 0 | 0 | 0 |
|  |  | A liquid transfer pump was used | No | Yes | Yes | Yes |
|  |  | W1/W2 ratio | 0.2 | 0.6 | 0.6 | 0.6 |
|  |  | C1/C2 ratio | 1.0 | 1.0 | 1.0 | 1.8 |
|  | On-line step |  | (i)-(ii)-(iii)-(iv) | (i)-(ii) | (i)-(ii) | (i)-(ii) |
|  | Off-line step |  | — | (iii), (iv) | (iii), (iv) | (iii), (iv) |
|  | Hauling rate | [m/min] | 10 | — | — | — |
|  | (I) to (IV) process time | [min] | 5 | 20 | 15 | 25 |
| Evaluation | Reinforcing fiber dispersion state | AA, A, B, C | A-AA | A-AA | A-AA | C |
|  | Flexural strength | Relative value | 100 | 90 | 100 | 90 |
|  | Coefficient of variation | % | 3 | 3 | 3 | 10 |

As is clear from Table 18 and Table 19, a carbon fiber base material with good dispersion state was obtained successfully in each of Production Examples 201 through 207. Specifically, by adjusting the C1/C2 ratio to within the range of from 0.8 to 1.2, it became unnecessary to perform excess steps such as concentration dilution in the respective steps and carbon fiber base materials superior in dispersion state were obtained successfully (see Production Examples 201 to 207, and Comparative Production Example 201). Moreover, the carbon fiber base materials obtained in Production Examples 201 to 207 were found to be superior in mechanical properties of molded product when being processed into molded products.

By adjusting the concentration C1 to a relatively low concentration, it becomes possible to perform treatment in a short time (see Production Examples 201 and 202). Moreover, by performing the steps (i) to (iv) online, or moreover by using an overflow system without using any pump in a transport portion, it was possible to perform treatment in a shorter time (see Production Examples 201, 203 to 205).

Through the adjustment of W1/W2 ratio to from 0.5 to 1.0, the dispersion state of a carbon was improved successfully (see Production Examples 204 and 205).

It has become clear that the mechanical properties of a molded product of a carbon fiber base material can be improved by the use of fibers with high O/C (see Production Examples 201 and 206).

[Evaluation of Method b for Manufacturing Reinforcing Fiber Base Material by Wet Process]

Production Example 301

Figure 25:
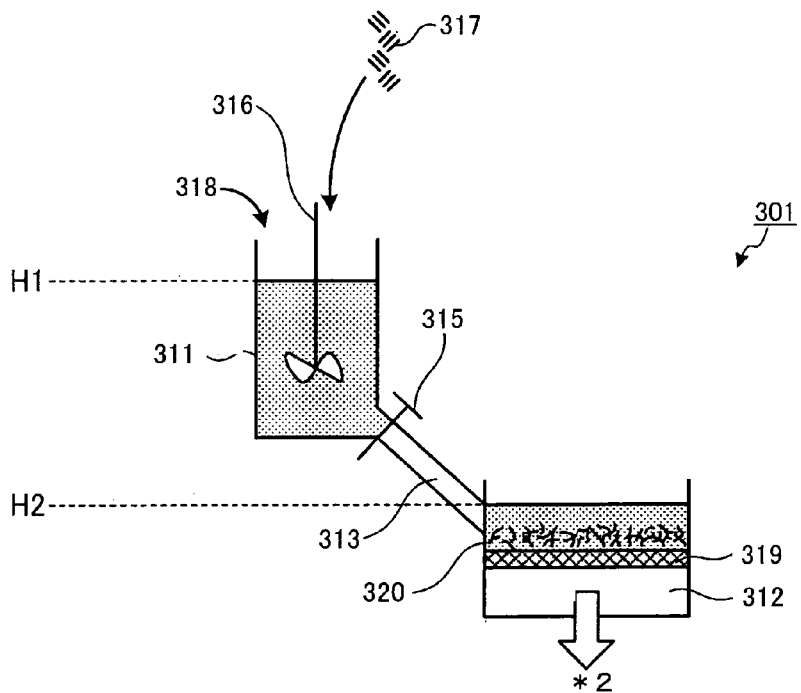
FIG. 25 is a schematic diagram illustrating one example of the apparatus for manufacturing a reinforcing fiber base material (papermaking base material).

A reinforcing fiber base material was produced by using an apparatus 301 for manufacturing a reinforcing fiber base material (papermaking base material) of FIG. 25. The manufacture apparatus 301 is composed of a dispersion vessel 311, a papermaking vessel 212, and a transport portion 313. The dispersion vessel 311 is a container in a cylindrical form of 300 mm in diameter and is equipped with an opening cock 315 at a lower part of the container and a stirrer 316 in the upper opening. Through the opening can be charged a carbon fiber bundle 317 and a dispersion liquid (dispersion medium) 318. As the papermaking vessel 312 is used a large-sized square-shaped sheet machine (No. 2553-I (commercial name), manufactured by Kumagai Riki Kogyo Co., Ltd.), and it has a papermaking surface 319 (made of mesh sheet) of 400 mm in length and 400 mm in width. A carbon fiber base material 320 is obtained on the papermaking plane 319. The transport portion 313 is a linear passage that connects the dispersion vessel 311 and the papermaking vessel 312 and inclines downward from the dispersion vessel 311 toward the papermaking vessel 312 (inclination angle: 45°). The dispersion vessel 311 and the transport portion 313 are connected via the opening cock 315.

Carbon fiber A4 was cut into 6.4 mm with a cartridge cutter, so that chopped carbon fiber A4-1 was obtained. Twenty liters of a dispersion liquid composed of water and a surfactant (polyoxyethylene lauryl ether (commercial name), produced by Nacalai Tesque, Inc.) with a concentration of 0.1% by mass was prepared and transferred to a dispersion vessel 311. To this dispersion liquid was charged 9.6 g of chopped carbon fiber A4-1 (step (i)). A slurry was prepared by stirring for 10 minutes (step (ii)). Then, the opening cock 315 located at the lower portion of the container was opened and thereby the slurry was poured into the papermaking vessel 312 through the transport portion 313 (step (iii)). At this time, the level H1 of the slurry surface in the dispersion vessel was at a position only 50 cm higher than the slurry surface H2 in the papermaking vessel. Subsequently, water was aspirated through the papermaking surface 319 of the papermaking vessel, yielding a carbon fiber base material 320 of 400 mm in length and 400 mm in width (step (iv)). The basis weight of the carbon fiber base material was 60 g/m². The execution conditions of the respective steps and the evaluation results of the resulting carbon fiber base material are shown in Table 20.

Production Example 302

Figure 26:
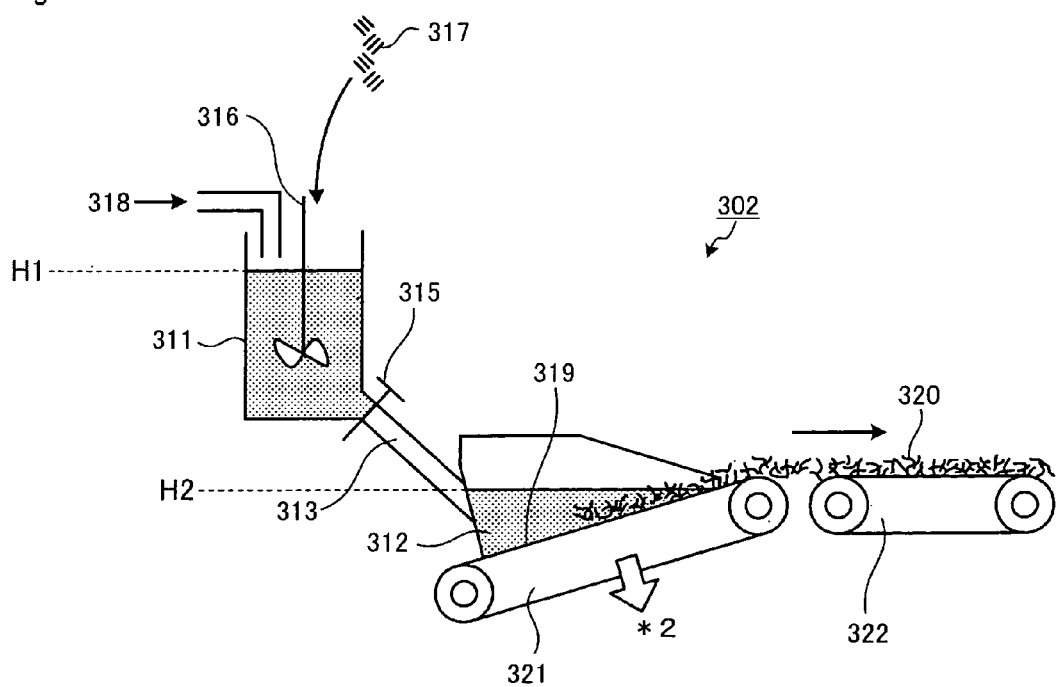
FIG. 26 is a schematic diagram illustrating one example of the apparatus for manufacturing a reinforcing fiber base material (papermaking base material).

A reinforcing fiber base material was produced by using an apparatus 302 for manufacturing a reinforcing fiber base material (papermaking base material) of FIG. 26. The manufacture apparatus 302 is composed of a dispersion vessel 311, a papermaking vessel 312, a transport portion 313, and a conveyor 322. The dispersion vessel 311 and the transport portion 313 are the same as those of the manufacture apparatus 301. The papermaking vessel 312 has, at its bottom, a mesh with a papermaking plane 319 having a width of 200 mm. A carbon fiber base material 320 is obtained on the papermaking plane 319. The conveyor 322 is disposed following a mesh conveyor 321 and conveys the reinforcing fiber base material 320.

Carbon fiber A4 was cut into 6.4 mm with a cartridge cutter, so that chopped carbon fiber A4-1 was obtained: A dispersion liquid composed of water and a surfactant (polyoxyethylene lauryl ether (commercial name), produced by Nacalai Tesque, Inc.) with a concentration of 0.1% by mass was prepared. The dispersion liquid and the chopped carbon fiber A4-1 were started to be charged into the dispersion vessel 311. The charging of the dispersion liquid and the chopped carbon fibers were continued continuously while adjusting the charging amount so that the carbon fiber concentration in the slurry in the dispersion vessel might be a fixed concentration and the level H1 of the surface of the slurry in the dispersion vessel might be fixed during the production (step (i)). At the same time when the raw materials were started to be charged into the container, stirring was started and a slurry was prepared (step (ii)). When 40 liters of slurry was accumulated, the opening cock 315 of the lower part of the container was opened, so that the slurry was poured into the papermaking vessel 312 via the transport portion 313 (step (iii)). At this time, the level H1 of the slurry surface in the dispersion vessel was at a position only 50 cm higher than the slurry surface H2 in the papermaking vessel. By aspirating water from the slurry and the resultant was hauled at a rate of 10 m/min, a carbon fiber base material 320 of 200 mm in width was obtained continuously (step iv). The basis weight of the carbon fiber base material was 20 g/m². The execution conditions of the respective steps and the evaluation results of the resulting carbon fiber base material are shown in Table 20.

Production Example 303

Figure 27:
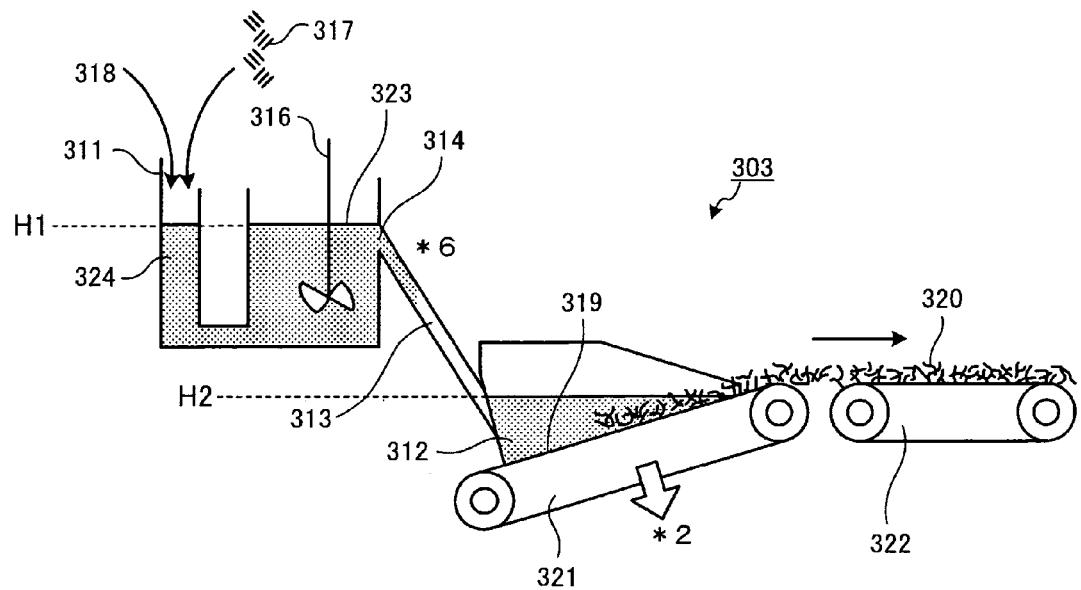
FIG. 27 is a schematic diagram illustrating one example of the apparatus for manufacturing a reinforcing fiber base material (papermaking base material).
Figure 28:
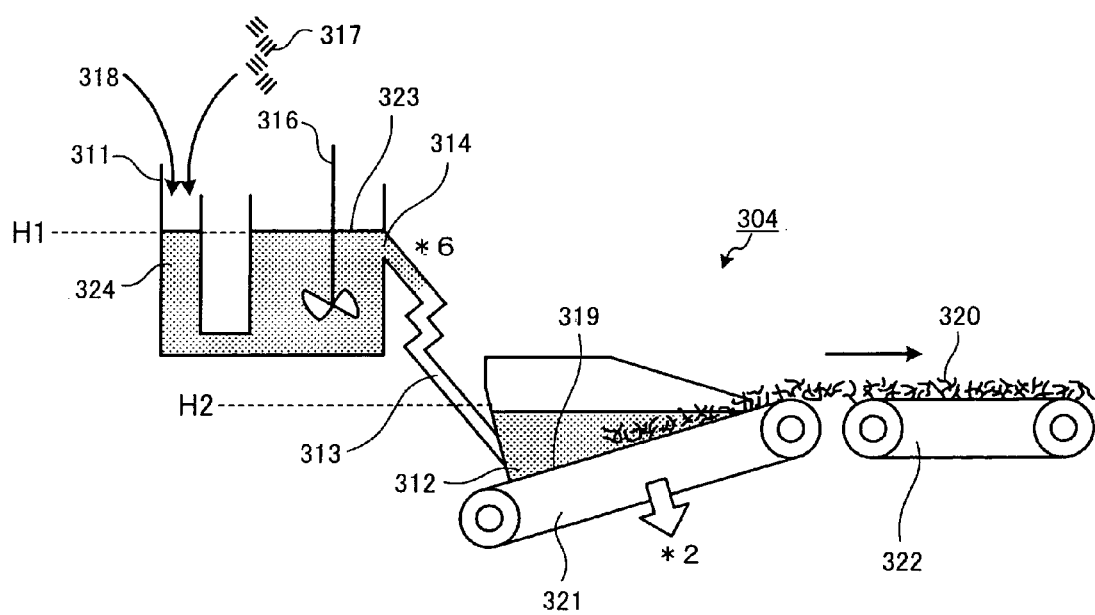
FIG. 28 a schematic diagram illustrating one example of the apparatus for manufacturing a reinforcing fiber base material (papermaking base material).

A reinforcing fiber base material was produced by using an apparatus 303 for manufacturing a reinforcing fiber base material (papermaking base material) of FIG. 27. The manufacture apparatus 303 is composed of a dispersion vessel 311, a papermaking vessel 312, a transport portion 313, and a conveyor 322. The papermaking vessel 312, the transport portion 313, and the conveyor 322 are the same as those of the manufacture apparatus 302. The dispersion vessel 311 is in a recessed shape having two openings (a wide opening 323 and a narrow opening 324) in its top surface and is equipped with a stirrer 316 in the wide opening 323. A connecting part 314 of the transport portion 313 to the dispersion vessel 311 is located at an upper part (near the openings) of the dispersion vessel 311, and the liquid transfer from the dispersion vessel 311 to the papermaking vessel 312 is performed in a overflow system. The connecting portion 314 is provided with no opening cock.

By using the above-mentioned manufacture apparatus 303, chopped carbon fibers A4-1 and a dispersion liquid with a concentration of 0.1% by mass composed of water and a surfactant (polyoxyethylene lauryl ether (commercial name), produced by Nacalai Tesque, Inc.) were charged through the narrow opening 324. Then, a carbon fiber base material was obtained by treating in the same manner as in Production Example 302. The basis weight of the resulting carbon fiber base material was 20 g/m². The execution conditions of the respective steps and the evaluation results of the resulting carbon fiber base material are shown in Table 20.

Production Example 304

A reinforcing fiber base material was produced by using an apparatus 304 for manufacturing a reinforcing fiber base material (papermaking base material) of FIG. 27. The manufacture apparatus 304 is composed of a dispersion vessel 311, a papermaking vessel 312, a transport portion 313, and a conveyor 322. The dispersion vessel 311, the papermaking vessel 312, and the conveyor 322 are the same as those of the manufacture apparatus 303. The transport portion 313 is of a structure in which the portion is bent at right angle at four point and has an angle of 45° as a whole.

A carbon fiber base material was obtained in the same manner as in Production Example 303 by the use of the manufacture apparatus 304 described above. The basis weight of the resulting carbon fiber base material was 20 g/m². The execution conditions of the respective steps and the evaluation results of the resulting carbon fiber base material are shown in Table 20.

Production Example 305

A manufacture apparatus (not shown) that was the same as the manufacture apparatus 303 except for having a structure in which the angel of the transport portion was 90° (perpendicularly downward). A carbon fiber base material was obtained by treating in the same manner as in Production Example 303. The basis weight of the resulting carbon fiber base material was 20 g/m². The execution conditions of the respective steps and the evaluation results of the resulting carbon fiber base material are shown in Table 20.

Production Example 306

A manufacture apparatus 303 was used. A carbon fiber base material was obtained by treating in the same manner as in Production Example 305 except for changing the ratio W1/W2 of the width W1 of the transport portion to the carbon fiber base material W2 from 0.6 to 0.2. The basis weight of the resulting carbon fiber base material was 20 g/m². The execution conditions of the respective steps and the evaluation results of the resulting carbon fiber base material are shown in Table 21.

Production Example 307

A carbon fiber base material was obtained by treating as in the same manner as in Production Example 301 except for changing the kind of carbon fiber from A4 to A5. The basis weight of the resulting carbon fiber base material was 60 g/m². The execution conditions of the respective steps and the evaluation results of the resulting carbon fiber base material are shown in Table 2.

Comparative Production Example 301

A manufacture apparatus 301 was used. A carbon fiber base material was obtained by treating in the same manner as in Production Example 301, except for performing only the steps (i) to (ii) online and performing the steps (iii) to (iv) offline. The basis weight of the resulting carbon fiber base material was 60 g/m². The execution conditions of the respective steps and the evaluation results of the resulting carbon fiber base material are shown in Table 21.

Comparative Production Example 302

There was used a manufacture apparatus (not shown) which was the same as the manufacture apparatus 301 except that the transport portion was in a horizontal straight form (angle: 0°) and equipped with a liquid transfer pump. A carbon fiber base material was obtained by treating in the same manner as in Production Example 301. The basis weight of the resulting carbon fiber base material was 60 g/m². The execution conditions of the respective steps and the evaluation results of the resulting carbon fiber base material are shown in Table 21.

TABLE 20

|  |  |  | Production Example 301 | Production Example 302 | Production Example 303 | Production Example 304 | Production Example 305 |
|---|---|---|---|---|---|---|---|
| Raw material | Reinforcing fiber | Kind | A4 (O/C = 0.10) | A4 (O/C = 0.10) | A4 (O/C = 0.10) | A4 (O/C = 0.10) | A4 (O/C = 0.10) |
|  |  | Cutting length [mm] | 6.4 | 6.4 | 6.4 | 6.4 | 6.4 |
| Step conditions | Step (i) | Solid concentration of a slurry [% by mass] | 0.05 | 0.05 | 0.05 | 0.05 | 0.05 |
|  |  | Raw material supplement | No | Yes | Yes | Yes | Yes |
|  | Step (ii) | Mass per unit area [g/m²] of a reinforcing fiber base material | 60 | 20 | 20 | 20 | 20 |
|  |  | Position of slurry surface level H1 | Varied | Fixed | Fixed | Fixed | Fixed |
|  | Step (iii) | Slurry surface level H1-H2 [m] | 0.5 | 0.5 | 0.5 | 0.5 | 0.5 |
|  |  | Use of liquid transfer pump | No | No | No | No | No |
|  |  | Shape of a transport portion | Straight | Straight | Straight | Bent at night angle | Straight |
|  |  | Inclination angle of transport portion [°] | 45 | 45 | 45 | 45 | 90 |
|  |  | W1/W2 ratio | 0.6 | 0.6 | 0.6 | 0.6 | 0.6 |
|  | Online step |  | (i)-(ii)-(iii)-(iv) | (i)-(ii)-(iii)-(iv) | (i)-(ii)-(iii)-(iv) | (i)-(ii)-(iii)-(iv)-(v) | (i)-(ii)-(iii)-(iv) |
|  | Offline step |  | — | — | — | — | — |
|  | Hauling rate | [m/min] | — | 10 | 10 | 10 | 10 |
| Evaluation | (I) to (IV) process time | [min] | 15 | 5 | 5 | 5 | 5 |
|  | Reinforcing fiber dispersion state | AA, A, B, C | AA | AA | AA | A | A |
|  | Flexural strength | Relative value | 100 | 100 | 100 | 100 | 100 |
|  | Coefficient of variation | % | 3 | 3 | 3 | 5 | 5 |

TABLE 21

|  |  |  | Production Example 306 | Production Example 307 | Comparative Production Example 301 | Comparative Production Example 302 |
|---|---|---|---|---|---|---|
| Raw material | Reinforcing fiber | Kind | A4 (O/C = 0.10) | A5 (O/C = 0.05) | A4 (O/C = 0.10) | A4 (O/C = 0.10) |
|  |  | Cutting length [mm] | 6.4 | 6.4 | 6.4 | 6.4 |
| Step conditions | Step (i) | Solid concentration of a slurry [% by mass] | 0.05 | 0.05 | 0.05 | 0.05 |
|  |  | Raw material supplement | Yes | No | No | No |
|  | Step (ii) | Mass per unit area [g/m²] of a reinforcing fiber base material | 20 | 60 | 60 | 60 |
|  |  | Position of slurry surface level H1 | Fixed | Varied | Varied | Varied |
|  | Step (iii) | Slurry surface level H1-H2 [m] | 0.5 | 0.5 | 0.5 | 0 |
|  |  | Use of liquid transfer pump | No | No | No | Yes |

TABLE 21-continued

|  |  |  | Production Example 306 | Production Example 307 | Comparative Production Example 301 | Comparative Production Example 302 |
|---|---|---|---|---|---|---|
|  |  | Shape of a transport portion | Straight | Straight | Straight | Straight |
|  |  | Inclination angle of a transport portion [°] | 45 | 45 | 45 | 0 |
|  |  | W1/W2 ratio | 0.2 | 0.6 | 0.6 | 0.6 |
|  | Online step |  | (i)-(ii)-(iii)-(iv) | (i)-(ii)-(iii)-(iv) | (i)-(ii) | (i)-(ii)-(iii)-(iv) |
|  | Offline step |  | — | — | (iii), (iv) | — |
|  | Hauling rate | [m/min] | 10 | — | — | 10 |
| Evaluation | (I) to (IV) process time | [min] | 5 | 15 | 25 | 15 |
|  | Reinforcing fiber dispersion state | AA, A, B, C | A | AA | B | C |
|  | Flexural strength | Relative value | 100 | 90 | 90 | 70 |
|  | Coefficient of variation | % | 5 | 3 | 10 | 15 |

As is clear from Table 20 and Table 21, a carbon fiber base material with good dispersion state without reflocculation was obtained successfully in a short time in each of Production Examples 301 through 307. It became clear that by performing the steps (i) to (iv) online and transferring a liquid without using a liquid transfer pump, it was possible to prevent reinforcing fibers from sedimentation and reflocculation in transportation (see Production Examples 1 to 7 and Comparative Production Examples 1 to 2). Moreover, the carbon fiber base materials obtained in Production Examples 301 to 307 were found to be superior in mechanical properties of molded product when being processed into molded products.

By adjusting the level H1 of the surface of a slurry to be constant while charging a dispersion liquid and chopped carbon fibers continuously into a dispersion vessel or by further configuring a transport portion to be of an overflow system, it was possible to perform treatment in a shorter time (see Production Examples 302 to 306).

By making a transport portion to have a straight form and adjusting an inclination angle to from 30 to 60° or adjusting a W1/W2 ratio to from 0.5 to 1.0, the dispersion state of a carbon fiber base material was improved successfully (see Production Examples 301 to 304, and 307).

It has become clear that the mechanical properties of a molded product of a carbon fiber base material can be improved by the use of fibers with high O/C (see Production Examples 301 and 307).

[Evaluation of Method c for Manufacturing Reinforcing Fiber Base Material by Wet Process]

Production Example 401

Figure 29:
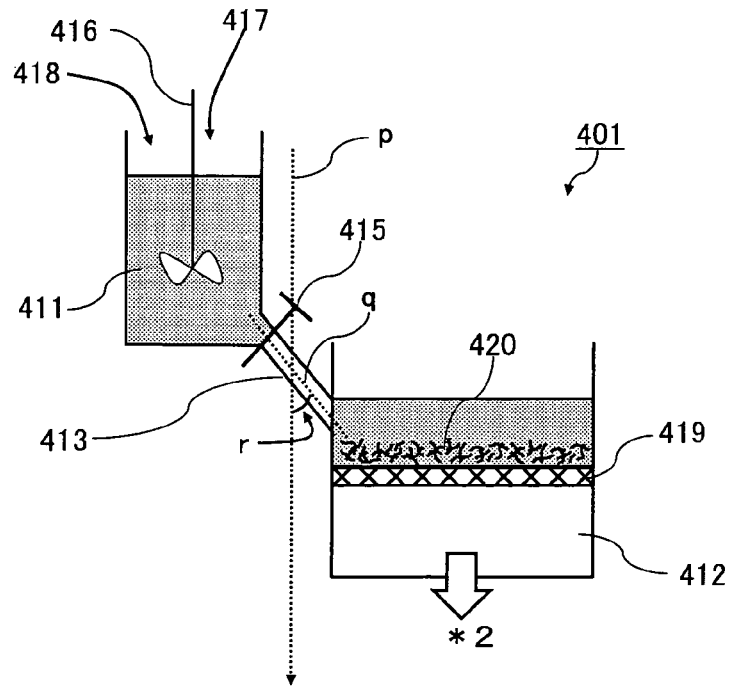
FIG. 29 is a schematic diagram illustrating one example of the apparatus for manufacturing a reinforcing fiber base material (papermaking base material).

A reinforcing fiber base material was produced by using an apparatus 401 for manufacturing a reinforcing fiber base material (papermaking base material) of FIG. 29. The manufacture apparatus 401 is composed of a dispersion vessel 411, a papermaking vessel 412, and a transport portion 413. The dispersion vessel 411 is a container in a cylindrical form of 300 mm in diameter and is equipped with an opening cock 415 at a lower part of the container and a stirrer 416 in the upper opening. Through the opening can be charged a carbon fiber bundle 417 and a dispersion liquid (dispersion medium) 418. As the papermaking vessel 412 is used is used a large-sized square-shaped sheet machine (No. 2553-I (commercial name), manufactured by Kumagai Riki Kogyo Co., Ltd.), and it has a papermaking surface 419 (made of mesh sheet) of 400 mm in length and 400 mm in width. A carbon fiber base material 420 is obtained on the papermaking plane 419. The transport portion 413 is a linear passage that connects the dispersion vessel 411 and the papermaking vessel 412 and inclines downward from the dispersion vessel 411 toward the papermaking vessel 412 (inclination angle r: 88°). The cross-sectional shape of the transport portion 413 is a circle of 0.01 m in diameter.

Carbon fiber A1 was cut into 6.4 mm with a cartridge cutter, so that chopped carbon fiber A4-1 was obtained. Twenty liters of a dispersion liquid with a concentration of 0.25% by mass composed of water and a water-soluble polymer (PEO-8Z (commercial name), produced by Sumitomo Seika Chemicals Co., Ltd.) was prepared and transferred to the dispersion vessel 411. The dispersion liquid had a viscosity of 10 mPa·s. To this dispersion liquid was charged 9.6 g of chopped carbon fiber A4-1 (step (i)). A slurry was prepared by stirring for 10 minutes (step (ii)). Then, the opening cock 415 located at the lower portion of the container was opened and thereby the slurry was poured into the papermaking vessel 412 through the transport portion 413 (step (iii)). Subsequently, water was aspirated through the papermaking surface 419 of the papermaking vessel, yielding a carbon fiber base material 420 of 400 mm in length and 400 mm in width (step (iv)). The basis weight of the carbon fiber base material was 60 g/m². The execution conditions of the respective steps and the evaluation results of the resulting carbon fiber base material are shown in Table 22.

Production Example 402

A manufacture apparatus (not shown) was used which was the same as the manufacture apparatus 401 except that the inclination angle r was 65°. A carbon fiber base material was obtained by treating in the same manner as in Production Example 401. The basis weight of the resulting carbon fiber base material was 60 g/m². The execution conditions of the respective steps and the evaluation results of the resulting carbon fiber base material are shown in Table 22.

Production Example 403

A carbon fiber base material was obtained by treating in the same manner as in Production Example 401, except for preparing 20 L of a dispersion of a concentration of 0.1% by mass composed of water a water-soluble polymer (PEO-8Z (commercial name), produced by Sumitomo Seika Chemicals Co., Ltd.). The basis weight of the resulting carbon fiber base material was 60 g/m². The execution conditions of the respective steps and the evaluation results of the resulting carbon fiber base material are shown in Table 22.

Production Example 404

A carbon fiber base material was obtained by performing treatment in the same manner as in Production Example 401, except for preparing 20 L of a dispersion having a concentration of 1% by mass composed of water a water-soluble polymer (PEO-8Z (commercial name), produced by Sumitomo Seika Chemicals Co., Ltd.). The basis weight of the resulting carbon fiber base material was 60 g/m². The execution conditions of the respective steps and the evaluation results of the resulting carbon fiber base material are shown in Table 22.

Production Example 405

A manufacture apparatus (not shown) was used which was the same as the manufacture apparatus 401 except that the sectional shape of its transport portion 13 was a square 0.01 m long on each side. A carbon fiber base material was obtained by treating in the same manner as in Production Example 401. The basis weight of the resulting carbon fiber base material was 60 g/m². The execution conditions of the respective steps and the evaluation results of the resulting carbon fiber base material are shown in Table 23.

Production Example 406

A carbon fiber base material was obtained by treating in the same manner as in Production Example 401 except for cutting carbon fiber A5 into 6.4 mm with a cartridge cutter to obtain chopped carbon fiber A5-1 and charging 9.6 g of the chopped carbon fiber A5-1 to a dispersion liquid in the step (i). The basis weight of the resulting carbon fiber base material was 60 g/m². The execution conditions of the respective steps and the evaluation results of the resulting carbon fiber base material are shown in Table 23.

Comparative Production Example 401

A manufacture apparatus (not shown) was used which was the same as the manufacture apparatus 401 except that the inclination angle r was 0°. A carbon fiber base material was obtained by treating in the same manner as in Production Example 401. The basis weight of the resulting carbon fiber base material was 60 g/m². The execution conditions of the respective steps and the evaluation results of the resulting carbon fiber base material are shown in Table 23.

Comparative Production Example 402

A manufacture apparatus (not shown) was used which was the same as the manufacture apparatus 401 except for having a liquid transfer pump in its transport portion. A carbon fiber base material was obtained by treating in the same manner as in Production Example 401. The basis weight of the resulting carbon fiber base material was 60 g/m². The execution conditions of the respective steps and the evaluation results of the resulting carbon fiber base material are shown in Table 23.

TABLE 22

| | | | Production Example 401 | Production Example 402 | Production Example 403 | Production Example 404 |
|---|---|---|---|---|---|---|
| Raw material | Reinforcing fiber | Kind | A4 (O/C = 0.10) | A4 (O/C = 0.10) | A4 (O/C = 0.10) | A4 (O/C = 0.10) |
| | | Cutting length [mm] | 6.4 | 6.4 | 6.4 | 6.4 |
| Step conditions | Step (i) | Solid concentration of a slurry [% by mass] | 0.05 | 0.05 | 0.05 | 0.05 |
| | Step (ii) | Mass per unit area [g/m²] of a reinforcing fiber base material | 60 | 60 | 60 | 60 |
| | | Viscosity of dispersion medium [mPa·s] | 10 | 10 | 5 | 120 |
| | Step (iii) | Use of liquid transfer pump | No | No | No | No |
| | | Shape of a transport portion | Circle | Circle | Circle | Circle |
| | | Representative length of a transport portion [m] | 0.01 | 0.01 | 0.01 | 0.01 |
| | | State of flow | Laminar flow | Transition region from laminar flow to turbulent flow | Transition region from laminar flow to turbulent flow | Laminar flow |
| | | Flow rate [m/s] | 1 | 4 | 2 | 0.5 |
| | | Reynolds number | 1000 | 4000 | 4000 | 40 |
| Evaluation | Reinforcing fiber dispersion state | AA, A, B, C | AA | A | AA | AA |
| | Flexural strength | Relative value | 100 | 100 | 100 | 85 |
| | Coefficient of variation | % | 3 | 5 | 3 | 3 |

TABLE 23

| | | | Production Example 405 | Production Example 406 | Comparative Production Example 401 | Comparative Production Example 402 |
|---|---|---|---|---|---|---|
| Raw material | Reinforcing fiber | Kind | A4 (O/C = 0.10) | A5 (O/C = 0.05) | A4 (O/C = 0.10) | A4 (O/C = 0.10) |
| | | Cutting length [mm] | 6.4 | 6.4 | 6.4 | 6.4 |
| Step conditions | Step (i) | Solid concentration of a slurry [% by mass] | 0.05 | 0.05 | 0.05 | 0.05 |
| | Step (ii) | Mass per unit area [g/m²] of a reinforcing fiber base material | 60 | 60 | 20 | 60 |

TABLE 23-continued

|  |  |  | Production Example 405 | Production Example 406 | Comparative Production Example 401 | Comparative Production Example 402 |
|---|---|---|---|---|---|---|
|  | Step (iii) | Viscosity of dispersion medium [mPa·s] | 10 | 10 | 10 | 10 |
|  |  | Use of liquid transfer pump | No | No | No | Yes |
|  |  | Shape of a transport portion | Square | Circle | Circle | Circle |
|  |  | Representative length of a transport portion [m] | 0.01 | 0.01 | 0.01 | 0.01 |
|  |  | State of flow | Laminar flow | Laminar flow | turbulent flow | turbulent flow |
|  |  | Flow rate [m/s] | 2 | 1 | 12 | 4 |
|  |  | Reynolds number | 2000 | 1000 | 12000 | 200000 |
| Evaluation | Reinforcing fiber dispersion state | AA, A, B, C | AA | AA | B | C |
|  | Flexural strength | Relative value | 100 | 80 | 95 | 90 |
|  | Coefficient of variation | % | 3 | 3 | 10 | 15 |

As is clear from Table 22 and Table 23, the reinforcing fiber did not reflocculate and a carbon fiber base material with good dispersion state was obtained successfully in each of Production Examples 401 through 406. It became clear that it was possible to prevent reinforcing fibers from reflocculating in transportation by transporting a slurry in a transport portion in a laminar flow state or in a state of a transition region from a laminar flow to a turbulent flow (see Production Examples 401 to 406 and Comparative Production Examples 401 to 402).

It became clear that it was possible to prevent reinforcing fibers from reflocculating in transportation by transporting a slurry in a transport portion in a laminar flow state or in a state of a transition region from a laminar flow to a turbulent flow even if the cross-sectional shape of the transport portion is either a circle or a quadrangle (a polygon) (see Production Examples 401 and 405).

It is expected that it is possible to increase the mechanical properties of carbon fiber base materials or molded products by adjusting the viscosity of a dispersion medium to from 1 to 100 mPa·s. (See Production Examples 402, 403, and 404.)

It is expected that it is possible to increase the mechanical properties of carbon fiber base materials or their molded products by using fibers with a high O/C.

[Evaluation (2) of Prepreg, Preform, and Molded Product]

The evaluation and the measurement of various properties were carried out in the same methods as those described in "Evaluation (1) of prepreg, preform, and molded product."

Example 501

A prepreg was produced by using an apparatus 102 of FIG. 10.

Carbon fiber A1 was cut into 6.4 mm with a cartridge cutter, so that chopped carbon fiber A1 was obtained. A 1%-by-mass aqueous dispersion liquid (emulsion) of C1 had been produced as a binder solution and put into a binder vessel 126. Forty liters of a dispersion liquid composed of water and a surfactant (polyoxyethylene lauryl ether (commercial name), produced by Nacalai Tesque, Inc.) with a concentration of 0.1% by mass was prepared and transferred to a dispersion vessel 111. Fifty grams of chopped carbon fiber was added to this dispersion liquid, followed by stirring for 10 minutes. Thus, a slurry was prepared. An opening cock 115 located at a lower portion of the dispersion layer container was opened, and then while compressed air was introduced into the slurry container to keep the slurry flow rate constant, the slurry was poured to a mesh conveyor having a papermaking plane with a width of 200 mm. The slurry was drawn with the mesh conveyor at a rate of 1 m/min under aspiration of water, so that a carbon fiber base material 120 having a length of 5 m and a width of 200 mm was obtained (step (I)). Subsequently, an opening cock 128 of the binder vessel 126 was opened and 200 g of the binder solution was sprinkled to the upper side of the carbon fiber base material 120. After an excess binder solution was aspirated, the carbon fiber base material was made to pass through the dryer 138 of 200° C. for three minutes, so that a carbon fiber base material W2 was obtained (step (II)). The basis weight of the carbon fiber base material W2 was 50 g/m$^2$. The carbon fiber base material W2 was sent to a double belt pressing machine 131 by a conveyor while being held online. It was laminated with two films of CM1007 (Nylon 6 resin) produced by Toray Industries, Inc., as a matrix resin which were equal in thickness so as to form film/carbon fiber base material/film, followed by application of pressure at a temperature of 250° C. and a pressure of 5 MPa for two minutes by the use of the double belt pressing machine 131. Thus, a prepreg (28) in which the carbon fiber base material had been impregnated with the matrix resin was produced (step (III)). It was then directly wound into a roll form at a winding rate of 1 m/min with a winding machine 133 (step (IV)). The properties of the prepreg are shown in Table 25.

An L-shaped box-like molded product was produced in the same manner as in Example 1 except for manufacturing a preform in which eight prepregs (28) had been laminated. The preform was shaped well in conformity with the shape of the mold and a molded product that was high in shape quality was obtained. The properties of the molded product are shown in Table 26.

Example 502

A prepreg was produced by using the apparatus 202 of FIG. 23 as the papermaking apparatus disposed upstream from the dryer 138 in the apparatus 102 of FIG. 10. By using the manufacture apparatus, a dispersion liquid with a concentration of 0.1% by mass composed of water and a surfactant (polyoxyethylene lauryl ether (commercial name) produced by Nacalai Tesque, Inc.), and chopped carbon fibers using carbon fibers A1 were charged through the narrow opening. Then, a prepreg (29) was obtained by treating in the same manner as in Example 501. The carbon fiber content in the slurry was 0.05% by mass and the carbon fiber concentration difference of the slurry, C1/C2, was 1.0. The properties of the resulting prepreg are shown in Table 25.

An L-shaped box-like molded product was produced in the same manner as in Example 1 except for manufacturing a preform in which eight prepregs (29) had been laminated. The preform was shaped well in conformity with the shape of the mold and a molded product that was high in shape quality was obtained. The properties of the molded product are shown in Table 26.

Example 503

A prepreg was produced by using the apparatus 303 of FIG. 27 as the papermaking apparatus disposed upstream from the dryer 138 in the apparatus 102 of FIG. 10. By using the manufacture apparatus, a dispersion liquid with a concentration of 0.1% by mass composed of water and a surfactant (polyoxyethylene lauryl ether (commercial name) produced by Nacalai Tesque, Inc.), and chopped carbon fibers using carbon fibers A1 were charged through the narrow opening. Then, a prepreg (30) was obtained by treating in the same manner as in Example 501. The level of the surface of the slurry, H1–H2, was 0.5 m, the shape of the transport portion was straight, and the angle of inclination of the transport portion was 45°. The properties of the resulting prepreg are shown in Table 25.

An L-shaped box-like molded product was produced in the same manner as in Example 1 except for manufacturing a preform in which eight prepregs (30) had been laminated. The preform was shaped well in conformity with the shape of the mold and a molded product that was high in shape quality was obtained. The properties of the molded product are shown in Table 26.

Example 504

A prepreg was produced by using the apparatus 303 of FIG. 27 as the papermaking apparatus disposed upstream from the dryer 138 in the apparatus 102 of FIG. 10. It is noted that the cross-sectional shape of the transport portion (inclination angle r: 88°) of the apparatus 303 is a circle of 0.01 m in diameter. By using the manufacture apparatus, a dispersion liquid with a concentration of 0.25% by mass composed of water and a water-soluble macromolecule (PEO-8Z (commercial name) produced by Sumitomo Seika Chemicals Co., Ltd.), and chopped carbon fibers using carbon fibers A1 were charged through the narrow opening. Then, a prepreg (31) was obtained by treating in the same manner as in Example 501. The viscosity of the dispersion medium was 10 mPa·s. The state of flow in the transport portion was laminar flow, whose flow rate was 1 m/s and Reynolds number was 1000. The properties of the resulting prepreg are shown in Table 25.

An L-shaped box-like molded product was produced in the same manner as in Example 1 except for manufacturing a preform in which eight prepregs (31) had been laminated. The preform was shaped well in conformity with the shape of the mold and a molded product that was high in shape quality was obtained. The properties of the molded product are shown in Table 26.

TABLE 24

| | | | | Example 501 | Example 502 | Example 503 | Example 504 |
|---|---|---|---|---|---|---|---|
| Reinforcing fiber base material | Reinforcing fiber | Kind of fiber | [—] | Carbon fiber A1 | Carbon fiber 1 | Carbon fiber 1 | Carbon fiber 1 |
| | | Fiber mass content | [% by mass] | 28 | 27 | 28 | 28 |
| | | Fiber length Longer than 10 mm | [% by mass] | 0 | 0 | 0 | 0 |
| | | Proportion 2 to 10 mm | [% by mass] | 95 | 95 | 95 | 95 |
| | | Shorter than 2 mm | [% by mass] | 5 | 5 | 5 | 5 |
| | Two-dimensional orientation angle | | [°] | 40 | 41 | 41 | 41 |
| | Amount of air (Frazier method) | | [cm³/cm² · s] | 160 | 160 | 160 | 160 |

TABLE 25

| | | | | Example 501 | Example 502 | Example 503 | Example 504 |
|---|---|---|---|---|---|---|---|
| Prepreg | Prepreg number | | [—] | (28) | (29) | (30) | (31) |
| | Resin | Kind of resin | [—] | Nylon 6 | Nylon 6 | Nylon 6 | Nylon 6 |
| | | Resin mass content | [% by mass] | 72 | 72 | 72 | 72 |
| | Feature | Thickness at 23° C., hp0 | [mm] | 0.15 | 0.15 | 0.15 | 0.15 |
| | | Thickness at 100° C., h1 | [mm] | 0.15 | 0.15 | 0.15 | 0.15 |
| | | Thickness at 200° C., h2 | [mm] | 0.18 | 0.18 | 0.18 | 0.18 |
| | | Thickness at 300° C., h3 | [mm] | 0.92 (*2) | 0.92 (*2) | 0.92 (*2) | 0.92 (*2) |
| | | Thickness at 400° C., h4 | [mm] | (*1) | (*1) | (*1) | (*1) |
| | | Resin impregnation ratio | [%] | 95 | 95 | 95 | 95 |
| | | Bulk density | [g/cm³] | 1.20 | 1.20 | 1.20 | 1.20 |
| | | Mass per unit area | [g/m²] | 180 | 180 | 180 | 180 |
| | | Tensile strength σ | [MPa] | 150 | 150 | 150 | 150 |
| | | σMax | [MPa] | 170 | 170 | 170 | 170 |
| | | σMim | [MPa] | 140 | 140 | 140 | 140 |
| | | Length in the longitudinal direction | [mm] | 5000 | 5000 | 5000 | 5000 |

(*1): Resin was decomposed.
(*2): Resin was slightly decomposed.

TABLE 26

|  |  |  | Example 501 | Example 502 | Example 503 | Example 504 |
|---|---|---|---|---|---|---|
| Molded product | Molding method | | Stamping | Heat press | Stamping | Stamping |
| | Properties | Specific strength | B | B | B | B |
| | | Isotropy | A | A | A | A |
| | | Specific rigidity | B | B | B | B |
| | | Isotropy | A | A | A | A |
| | | Coefficient of linear expansion | A | A | A | A |
| | | Isotropy | A | A | A | A |

The prepregs produced in Examples 501 to 504 were good in distribution of the fiber length of reinforcing fibers, thickness and tensile strength, and were isotropic within a range of two-dimensional orientation angle of from 10 to 80°, and molded products produce therefrom exhibited good properties. In addition, laminated preforms produced using these prepregs also demonstrated good properties. Moreover, a continuous prepreg can be obtained in the form of a roll and therefore it is advantageous in industrial execution.

INDUSTRIAL APPLICABILITY

The prepreg the present invention and a laminated article thereof can be suitably used as a fiber-reinforced preform that can reconcile mechanical properties and moldability simultaneously; in particular, since reinforcing fibers constituting a thin prepreg have been oriented with two-dimensional isotropy, the prepreg is superior in reinforcing effect in its plane direction and inhibits interference of reinforcing fibers in the intralayer thickness direction, and since there is less interlayer interaction, it is superior in shapability in molding. These can be applied to a wide variety of industrial fields, such as components, parts and housings of electric and electronic instruments, robots, motorcycles, cars, and airplanes.

| [Explanation of referential signs] | |
|---|---|
| 1 | Reinforcing filament (a) |
| 2 to 7 | Reinforcing filament (b) |
| 8 | Two-dimensional orientation angle |
| 9 | Stainless steel mesh |
| 10 | Prepreg |
| 11 | Reinforcing fiber base material |
| 12 | Fiber direction |
| 13 | Fiber orthogonal direction |
| 14 | Carbon fiber prepreg with cut |
| 15 | Carbon fiber |
| 16 | Cut |
| 17 | Cut length |
| 18 | Fiber length |
| 19 | Length with which cuts of adjacent lines overlap with each other |
| 21 | Dispersion vessel |
| 22 | Papermaking vessel |
| 25 | Opening cock |
| 26 | Stirrer |
| 27 | Chopped reinforcing fiber |
| 28 | Dispersion liquid (dispersion medium) |
| 30 | Reinforcing fiber base material (papermaking base material) |
| 31 | Mesh conveyor |
| 32 | Conveyor |
| 41 | Continuous CFRP |
| 42 | Prepreg |
| 43 | GMT |
| t | Prepreg thickness direction |
| R | Radius of curvature |
| 101, 102, 103, 104 | Apparatus |
| 111 | Dispersion vessel |
| 112 | Papermaking vessel |
| 113 | Transport portion |

-continued

| [Explanation of referential signs] | |
|---|---|
| 115, 128 | Opening cock |
| 116 | Stirrer |
| 117 | Chopped carbon fiber (carbon fiber bundle) |
| 118 | Dispersion liquid (dispersion medium) |
| 119 | Papermaking side |
| 120 | Reinforcing fiber base material (Papermaking base material) |
| 121 | Mesh conveyor |
| 122 | Conveyor |
| 126 | Binder vessel |
| 127 | Binder transport portion |
| 129, 130 | Pressurized air pipe |
| 131 | Double belt press |
| 132 | Prepreg |
| 133 | Winding machine |
| 134 | Dispersion-papermaking vessel |
| 135 | Matrix resin |
| 136, 137 | Roll |
| 138 | Dryer |
| 139 | Carding machine |
| PA | Pressurized air |
| 201-203, 301-304, 401 | Apparatus for manufacturing a reinforcing fiber base material (papermaking base material) |
| 211, 311, 411 | Dispersion vessel |
| 212, 312, 412 | Papermaking vessel |
| 213, 313, 413 | Transport portion |
| 214, 314, 414 | Connecting portion between transport portion and dispersion vessel |
| 315, 415 | Opening cock |
| 216, 316, 416 | Stirrer |
| 217, 317, 417 | Chopped carbon fiber (carbon fiber bundle) |
| 218, 318, 418 | Dispersion liquid (dispersion medium) |
| 219, 319, 419 | Papermaking surface (mesh sheet) |
| 220, 320, 420 | Reinforcing fiber base material (papermaking base material) |
| 221, 321 | Mesh conveyor |
| 222, 322 | Conveyor |
| 223, 323 | Wide opening |
| 224, 324 | Narrow opening |
| 225 | Liquid transfer pump (low shear pump, diaphragm pump) |
| H1 | Level of the surface of slurry in step (ii) |
| H2 | Level of the surface of slurry in step (iv) |
| A | Standard |
| B | The surface of slurry in step (ii) |
| C | The surface of slurry in step (iv) |
| p | Line that is parallel to the gravity direction |
| q | Central line of transport division |
| r | Angle which p and q form in the perpendicularly lower side |
| C1, C2 | Mass content of reinforcing fibers in slurry |
| D | Fiber diameter |
| L | Fiber length |
| n | The number of fibers per unit volume |
| *1 | Burning off of resin |
| *2 | Aspiration |
| *3 | A tip works so that it can perform uniform sprinkle. |
| *4 | Heating, pressurization, and cooling |
| *5 | Winding |
| *6 | Overflow |

The invention claimed is:

1. A prepreg comprising a reinforcing fiber base material impregnated with a thermoplastic resin, wherein the reinforcing fiber base material comprises from 0 to 50% by mass of reinforcing fibers each having a fiber length of more than 10 mm, from 50 to 100% by mass of reinforcing fibers each having a fiber length of from 2 to 10 mm, and from 0 to 50% by mass of reinforcing fibers each having a fiber length of less than 2 mm, the average of two-dimensional orientation angles each formed by a reinforcing filament (a) and a reinforcing filament (b) intersecting the reinforcing filament (a) is from 10 to 80°, the thickness h0 (mm) at 23° C. is 0.03 to 1 mm, and the tensile strength a is 0.01 MPa or more.

2. The prepreg according to claim 1, wherein the distribution of the fiber length of the reinforcing fiber base material has at least two peaks, wherein at least one peak is within a fiber length range of from 5 to 10 mm and at least one peak is within a fiber length range of from 2 to 5 mm.

3. The prepreg according to claim 1, wherein the air content ($cm^3/cm^2 \cdot s$) of the reinforcing fiber base material measured by a Frazier type method based on ASTM D737 is from 50 to 1000.

4. The prepreg according to claim 1, wherein the thickness hn (mm) of the prepreg at $(n \times 100)°$ C. is $h0 \leqq hn \leqq h0 \times (2n+1)$ (n is at least one natural number selected from among 1, 2, 3, and 4).

5. The prepreg according to claim 1, wherein the ratio of the reinforcing fiber base material to the whole portion of the prepreg is from 5 to 60% by mass.

6. The prepreg according to claim 1, wherein the impregnation ratio of the thermoplastic resin to the whole portion of the prepreg is from 50 to 100.

7. The prepreg according to claim 1, wherein the tensile strength σ is from 50 to 1000 MPa.

8. A preform comprising, as at least a lamination unit, a prepreg which comprises a reinforcing fiber base material impregnated with a thermoplastic resin and in which the average of two-dimensional orientation angles each formed by a reinforcing filament (a) and a reinforcing filament (b) intersecting the reinforcing filament (a) is from 10 to 80°, the thickness h0 (mm) at 23° C. is 0.03 to 1 mm, and the tensile strength σ is 0.01 MPa or more.

9. The preform according to claim 8, wherein the prepreg forms a plurality of lamination units, and the preform comprising, as the prepreg that forms the plurality of lamination units, at least two kinds of prepregs which substantially differ in at least any one selected from the group consisting of the ratio of reinforcing fibers, the length of reinforcing fibers, the tensile modulus of elasticity of reinforcing fibers, the basis weight of a prepreg, and the thickness h0 (mm) at 23° C. of a prepreg.

10. The preform according to claim 8, wherein the tensile strength σ is from 50 to 1000 MPa.

11. The preform according to claim 8, wherein the interlayer shear strength between the prepreg and a lamination unit adjacent to the prepreg is from 0 to 50 MPa.

12. The preform according to claim 8, wherein the thickness hpn (mm) of the prepreg at $(n \times 100)°$ C. is $hp0 \leqq hpn \leqq hp0 \times (2n+1)$ (hp0 (mm) is the thickness of the preform at 23° C., and n is at least one natural number selected from among 1, 2, 3, and 4).

13. A molded product produced by molding the prepreg according to claim 1 or the preform according to any claim 8.

14. The molded product according to claim 13, wherein $Ec^{1/3} \cdot \rho^{-1}$ is from 1.5 to 5, where the flexural modulus of the molded product is expressed by Ec and the specific gravity of the molded product is expressed by ρ.

15. The molded product according to claim 14, wherein the flexural modulus Ec satisfies $EcMax \leqq EcMin \times 2$ in a relationship between a maximum flexural modulus EcMax and a minimum flexural modulus EcMin each in the direction of measurement.

16. The molded product according to claim 13, wherein the maximum thickness thereof is 2 mm or less.

17. A method manufacturing the molded product according to claim 13, the method comprising press molding the prepreg or the preform.

18. The method for manufacturing the molded product according to claim 17, wherein in the press molding, the press molding is performed while the charge ratio of the prepreg or the preform is adjusted to larger than 100% relative to the total cavity area of a mold.

19. The method for manufacturing the molded product according to claim 17, wherein the press molding is performed by stamping molding by the use of a mold for cooling.

20. The prepreg according to claim 1, wherein the reinforcing fiber base material is one obtained by the following method a:
method a: a method for manufacturing a reinforcing fiber base material, the method comprising step (i) of charging a reinforcing fiber bundle to a dispersion medium, step (ii) of preparing a slurry in which reinforcing fibers forming the reinforcing fiber bundle are dispersed in the dispersion medium, step (iii) of transporting the slurry, and step (iv) of removing the dispersion medium from the slurry to produce a papermaking base material containing reinforcing fibers, wherein C1/C2 is from 0.8 to 1.2 where the mass content of the reinforcing fibers in the slurry prepared in the step (ii) is expressed by C1, and the mass content of the reinforcing fibers in the slurry at the time of the commencement of the step (iv) is expressed by C2.

21. The prepreg according to claim 1, wherein the reinforcing fiber base material is one obtained by the following method b:
method b: a method for manufacturing a reinforcing fiber base material, the method comprising step (i) of charging a reinforcing fiber bundle to a dispersion medium, step (ii) of preparing a slurry in which reinforcing fibers forming the reinforcing fiber bundle are dispersed in the dispersion medium, step (iii) of transporting the slurry, and step (iv) of removing the dispersion medium from the slurry to produce a papermaking base material containing reinforcing fibers, wherein the steps (i) to (iv) are carried out online and the level H1 of the surface of the slurry in the step (ii) is higher than the level H2 of the surface of the slurry in the step (iv).

22. The prepreg according to claim 1, wherein the reinforcing fiber base material is one obtained by the following method c:
method c: a method for manufacturing a reinforcing fiber base material, the method comprising step (i) of charging a reinforcing fiber bundle to a dispersion medium, step (ii) of preparing a slurry in which reinforcing fibers forming the reinforcing fiber bundle are dispersed in the dispersion medium, step (iii) of transporting the slurry, and step (iv) of removing the dispersion medium from the slurry to produce a reinforcing fiber base material, wherein the steps (i) and (ii) are carried out in a dispersion vessel, the step (iv) is carried out in a papermaking vessel, the step (iii) is carried out in a transport portion that connects the dispersion vessel and the papermaking vessel, and the slurry is transported in a laminar flow state or in a transition region state from a laminar flow to a turbulent flow in the transport portion.

23. The preform according to claim 8, wherein the reinforcing fiber base material is one obtained by the following method a:

method a: a method for manufacturing a reinforcing fiber base material, the method comprising step (i) of charging a reinforcing fiber bundle to a dispersion medium, step (ii) of preparing a slurry in which reinforcing fibers forming the reinforcing fiber bundle are dispersed in the dispersion medium, step (iii) of transporting the slurry, and step (iv) of removing the dispersion medium from the slurry to produce a papermaking base material containing reinforcing fibers, wherein C1/C2 is from 0.8 to 1.2 where the mass content of the reinforcing fibers in the slurry prepared in the step (ii) is expressed by C1, and the mass content of the reinforcing fibers in the slurry at the time of the commencement of the step (iv) is expressed by C2.

24. The preform according to claim 8, wherein the reinforcing fiber base material is one obtained by the following method b:

method b: a method for manufacturing a reinforcing fiber base material, the method comprising step (i) of charging a reinforcing fiber bundle to a dispersion medium, step (ii) of preparing a slurry in which reinforcing fibers forming the reinforcing fiber bundle are dispersed in the dispersion medium, step (iii) of transporting the slurry, and step (iv) of removing the dispersion medium from the slurry to produce a papermaking base material containing reinforcing fibers, wherein the steps (i) to (iv) are carried out online and the level H1 of the surface of the slurry in the step (ii) is higher than the level H2 of the surface of the slurry in the step (iv).

25. The preform according to claim 8, wherein the reinforcing fiber base material is one obtained by the following method c:

method c: a method for manufacturing a reinforcing fiber base material, the method comprising step (i) of charging a reinforcing fiber bundle to a dispersion medium, step (ii) of preparing a slurry in which reinforcing fibers forming the reinforcing fiber bundle are dispersed in the dispersion medium, step (iii) of transporting the slurry, and step (iv) of removing the dispersion medium from the slurry to produce a reinforcing fiber base material, wherein the steps (i) and (ii) are carried out in a dispersion vessel, the step (iv) is carried out in a papermaking vessel, the step (iii) is carried out in a transport portion that connects the dispersion vessel and the papermaking vessel, and the slurry is transported in a laminar flow state or in a transition region state from a laminar flow to a turbulent flow in the transport portion.

* * * * *